(12) United States Patent
Tunnell et al.

(10) Patent No.: US 10,461,396 B2
(45) Date of Patent: Oct. 29, 2019

(54) SYSTEM AND METHOD FOR LOW-POWER CLOSE-PROXIMITY COMMUNICATIONS AND ENERGY TRANSFER USING A MINIATURE MULTI-PURPOSE ANTENNA

(71) Applicant: Fit Pay, Inc., Carlsbad, CA (US)

(72) Inventors: David Tunnell, Palm Bay, FL (US); Jacob Zurasky, Orlando, FL (US); Brian Keen, Palm Bay, FL (US); John Camuso, Palm Bay, FL (US); Trevor Parker, Melbourne, FL (US)

(73) Assignee: Fit Pay, Inc., Carlsbad, CA (US)

( * ) Notice: Subject to any disclaimer, the term of this patent is extended or adjusted under 35 U.S.C. 154(b) by 607 days.

(21) Appl. No.: 15/089,826

(22) Filed: Apr. 4, 2016

(65) Prior Publication Data
US 2016/0292669 A1    Oct. 6, 2016

Related U.S. Application Data

(60) Provisional application No. 62/143,028, filed on Apr. 3, 2015.

(51) Int. Cl.
*H01Q 1/22* (2006.01)
*G06Q 20/32* (2012.01)
(Continued)

(52) U.S. Cl.
CPC .......... *H01Q 1/2216* (2013.01); *G06Q 20/325* (2013.01); *G06Q 20/327* (2013.01); *G06Q 20/3278* (2013.01); *G06Q 20/382* (2013.01); *G06Q 20/385* (2013.01); *H01Q 1/38* (2013.01); *H01Q 1/48* (2013.01); *H01Q 5/10* (2015.01); *H01Q 7/08* (2013.01); *H01Q 9/04* (2013.01); *H01Q 15/0053* (2013.01); *H04B 5/0031* (2013.01); *H04B 5/0037* (2013.01); *H04B 5/0056* (2013.01); *H04W 4/70* (2018.02);
(Continued)

(58) Field of Classification Search
CPC ............ G06Q 20/32; H01Q 9/04; H01Q 1/22; H04W 12/06; H04W 52/02; H04W 4/00; H04B 5/00
USPC ................................................. 340/10.1–10.5
See application file for complete search history.

(56) References Cited

U.S. PATENT DOCUMENTS

| | | | |
|---|---|---|---|
| 4,513,293 A | 4/1985 | Stephens | |
| 4,701,601 A | 10/1987 | Francini | |

(Continued)

FOREIGN PATENT DOCUMENTS

| | | |
|---|---|---|
| WO | WO1996026500 | 8/1996 |
| WO | WO2002047019 | 6/2002 |

(Continued)

*Primary Examiner* — Nam V Nguyen
(74) *Attorney, Agent, or Firm* — Samuel M. Korte; Max M. Ali

(57) ABSTRACT

A system for providing information to a magnetic card reader. The system comprises an antenna (in one embodiment comprising a multi-purpose antenna or an antenna module) and a microprocessor for applying a differential signal to the antenna. The differential signal represents data stored in a memory segment of the microprocessor or in a memory connected to the microprocessor. The antenna transmits an alternating magnetic field representing the information the alternating magnetic field is responsive to the differential signal and received by the magnetic card reader.

47 Claims, 61 Drawing Sheets

(51) Int. Cl.
  *H01Q 9/04* (2006.01)
  *H04B 5/00* (2006.01)
  *H04W 52/02* (2009.01)
  *H04W 12/06* (2009.01)
  *H01Q 5/10* (2015.01)
  *H01Q 1/38* (2006.01)
  *H01Q 7/08* (2006.01)
  *H01Q 15/00* (2006.01)
  *H01Q 1/48* (2006.01)
  *G06Q 20/38* (2012.01)
  *H04W 4/70* (2018.01)
  *H04W 4/80* (2018.01)

(52) U.S. Cl.
  CPC ............ *H04W 4/80* (2018.02); *H04W 12/06* (2013.01); *H04W 52/0254* (2013.01); *Y02D 70/00* (2018.01); *Y02D 70/142* (2018.01); *Y02D 70/144* (2018.01); *Y02D 70/166* (2018.01); *Y02D 70/26* (2018.01); *Y02D 70/42* (2018.01)

(56) References Cited

U.S. PATENT DOCUMENTS

| | | | |
|---|---|---|---|
| 4,791,283 A | 12/1988 | Burkhardt | |
| 5,220,339 A | 6/1993 | Matsushita | |
| 5,608,413 A | 3/1997 | MacDonald | |
| 5,917,458 A | 6/1999 | Son | |
| 6,064,351 A * | 5/2000 | Mandai | H01Q 1/36 343/700 MS |
| 6,147,572 A | 11/2000 | Kaminski | |
| 6,161,762 A * | 12/2000 | Bashan | G06K 19/0723 235/380 |
| 6,167,094 A * | 12/2000 | Reiner | H04B 5/00 235/492 |
| 6,181,001 B1 * | 1/2001 | Ikefuji | G06K 19/07749 257/678 |
| 6,206,293 B1 * | 3/2001 | Gutman | G06K 7/084 235/380 |
| 6,545,645 B1 | 4/2003 | Wu | |
| 6,717,551 B1 | 4/2004 | Declos | |
| 6,784,785 B1 * | 8/2004 | Wuidart | G06K 7/0008 340/10.1 |
| 6,943,730 B2 | 9/2005 | Poilasne | |
| 6,991,155 B2 * | 1/2006 | Burchette, Jr. | G06Q 20/341 235/379 |
| 7,053,844 B2 | 5/2006 | Gaucher | |
| 7,170,453 B2 * | 1/2007 | Noguchi | H01Q 1/362 343/702 |
| 7,173,577 B2 | 2/2007 | Brown | |
| 7,319,986 B2 | 1/2008 | Praisner | |
| 7,394,437 B1 | 7/2008 | Loyet | |
| 7,432,873 B2 | 10/2008 | Brachat | |
| 7,453,412 B2 | 11/2008 | Murali | |
| 7,576,696 B2 | 8/2009 | Walton | |
| 7,580,898 B2 * | 8/2009 | Brown | G06Q 20/341 705/50 |
| 7,714,794 B2 | 5/2010 | Hozouri | |
| 8,103,881 B2 * | 1/2012 | Doughty | G06Q 20/327 257/678 |
| 8,231,061 B2 * | 7/2012 | Narendra | G06K 19/07749 235/487 |
| 8,317,103 B1 | 11/2012 | Foo | |
| 8,382,000 B2 | 2/2013 | Mullen | |
| 8,413,892 B2 | 4/2013 | Mullen | |
| 8,424,773 B2 | 4/2013 | Mullen | |
| 8,517,276 B2 | 8/2013 | Mullen | |
| 8,594,730 B2 | 11/2013 | Bona | |
| 8,608,083 B2 | 12/2013 | Mullen | |
| 8,690,059 B1 * | 4/2014 | Wallner | G06K 7/08 235/380 |
| 8,812,614 B2 | 8/2014 | Wlingkar | |
| 8,814,052 B2 | 8/2014 | Bona | |
| 9,147,295 B2 * | 9/2015 | Cox | G07C 9/00111 |
| 9,178,572 B1 * | 11/2015 | Zhang | H01Q 1/44 |
| 9,191,072 B2 * | 11/2015 | Finocchiaro | H04B 5/00 |
| 9,311,585 B1 * | 4/2016 | Steshenko | G06K 19/06206 |
| 9,316,674 B2 * | 4/2016 | Baldischweiler | G01R 29/10 |
| 2004/0222936 A1 | 11/2004 | Hung | |
| 2005/0179614 A1 | 8/2005 | Nagy | |
| 2005/0228994 A1 | 10/2005 | Kasais | |
| 2007/0188399 A1 | 8/2007 | Rickenbrock | |
| 2008/0007461 A1 | 1/2008 | Su | |
| 2009/0278758 A1 | 11/2009 | Zhoa | |
| 2010/0231461 A1 | 9/2010 | Tran | |
| 2010/0283688 A1 | 11/2010 | Kinezos | |
| 2011/0014879 A1 * | 1/2011 | Alberth | H01Q 1/242 455/75 |
| 2012/0231750 A1 | 9/2012 | Nanbo | |
| 2013/0010959 A1 | 1/2013 | Shih | |
| 2013/0145447 A1 | 6/2013 | Maron | |
| 2013/0237155 A1 | 9/2013 | Kim | |
| 2013/0288615 A1 * | 10/2013 | Anand | H01Q 1/241 455/77 |
| 2014/0122432 A1 | 5/2014 | Morgan | |

FOREIGN PATENT DOCUMENTS

| | | |
|---|---|---|
| WO | WO2005059691 | 6/2005 |
| WO | WO2007028634 | 3/2007 |
| WO | WO066806 | 6/2016 |

* cited by examiner

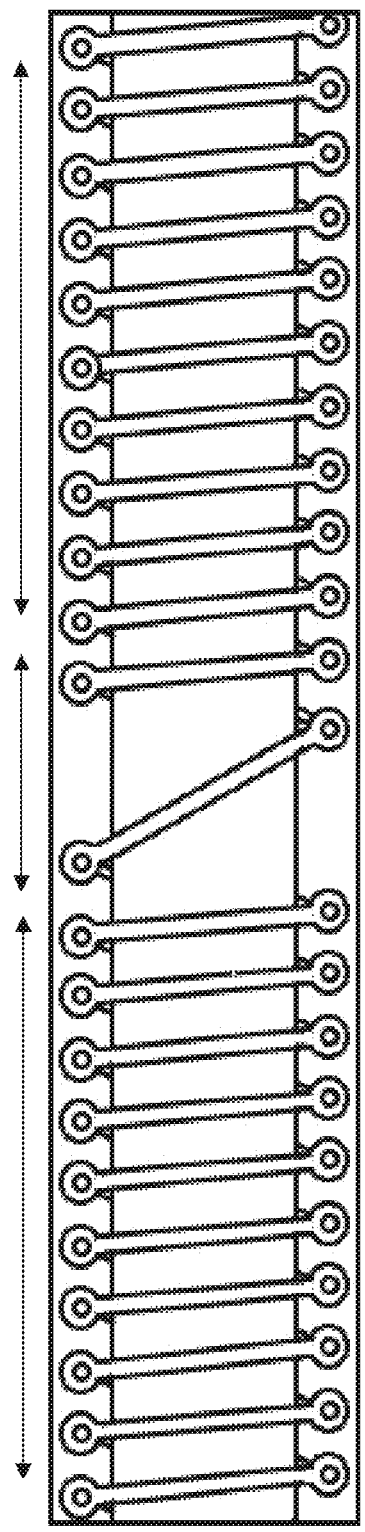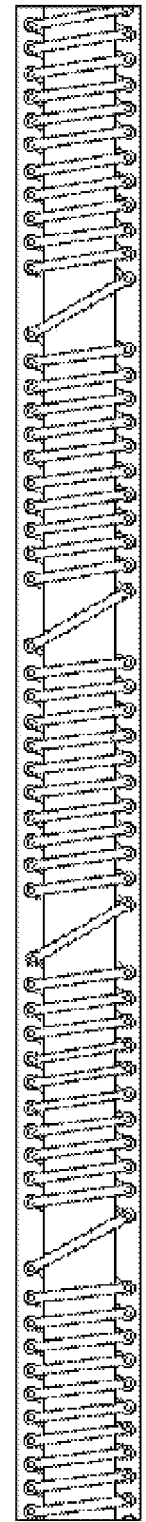
FIG. 25A
FIG. 25B

SYSTEM AND METHOD FOR LOW-POWER CLOSE-PROXIMITY COMMUNICATIONS AND ENERGY TRANSFER USING A MINIATURE MULTI-PURPOSE ANTENNA

CROSS REFERENCE TO RELATED APPLICATIONS

This patent application claims priority to a provisional patent application filed Apr. 3, 2015 and assigned Application No. 62/143,028, which is incorporated herein in its entirety.

FIELD OF THE INVENTION

The present invention relates to the general field of miniature multi-purpose antennas, specifically antenna structures, methods and systems that support information transactions, such as payments, authentication, identification and general data exchange, that are performed between devices placed in close proximity. The devices can also perform other functions such as wake-up, communications, proximity detection, reader-type detection, adaptive response transmissions, energy harvesting, and battery recharging.

BACKGROUND OF THE INVENTION

Close-Proximity Applications

Close-proximity communications are used in a variety of applications that promote identification, authentication, payment, tolls, various logistics and the like to establish and manage the "internet-of-things." RFID (Radio Frequency Identification) close-proximity applications include: low frequency (LF) applications, such as animal identification, that utilize frequencies between 120 and 150 kHz, high frequency (HF) applications, such as smart cards that frequently use frequencies at 13.56 MHz, ultra high frequency (UHF) applications, such as active tags, that use a frequency of 433 MHz, other ultra high frequency (UHF) applications, such as passive toll tags that utilize ISM (Industrial, Scientific and Medical) frequency bands with frequencies from 865 to 928 MHz, microwave frequencies, such as 2.45 to 5.8 GHz, and ultra wideband (UWB) frequencies from 3.1 to 11 GHz. Other close-proximity standards include the WiFi® (IEEE 802.11) bands at 2.4 GHz and 5 GHz and the Bluetooth® band at 2.4 GHz. Emerging standards such as NFC (near-field communication) have also become popular for transferring data from NFC-enabled devices to close-proximity readers using 13.56 MHz as a carrier frequency.

Miniature Tunable Antennas

Consumer demand for smaller wireless devices is pushing for smaller compact antennas. As the antenna size is reduced, the bandwidth and number of frequency bands a compact antenna can support becomes more challenging. A number of approaches have been attempted to make antennas tiny and tunable over multiple frequencies. Since mobile devices are typically small in size, keeping antennas sensitive at small apertures is a challenge. Typical miniature antennas include loop and dipole spiral antennas and variations thereof.

U.S. Pat. No. 7,714,794 describes a folded dipole spiral antenna with a loop section for RFID applications.

Approaches to make antennas tunable over multiple frequencies include published US patent application 2012/0231750, which describes a loop antenna formed from portions of a conductive bezel and a ground plane. Prior art references such as these attempt to make the antenna structure tunable using variable capacitors and inductive elements across the antenna feed terminals or across antenna structural components.

Other representative sample prior art references include U.S. published patent application 2010/0283688 that discloses a multiband folded dipole transmission line antenna including a plurality of concentric-like loops, wherein each loop comprises at least one transmission line element, and other antenna elements.

US published application 2010/0231461 discloses a modified monopole antenna electrically connected to multiple discrete antenna loading elements that are variably selectable through a switch to tune the antenna between operative frequency bands.

U.S. Pat. No. 7,576,696 discloses the use of multiple assemblies consisting of arrays of discrete antenna elements to form an antenna system that selectively filters electromagnetic bands.

US published patent application 2009/0278758 discloses a multiband folded dipole structure containing two electrically interconnected radiating elements wherein one of the radiating elements has capacitor pads that couple with currents from the other radiating element to produce the "slow-wave effect".

US published patent application 2008/0007461 discloses a U-shaped multiband antenna that has internal reactance consisting of a ceramic or multilayer ceramic substrate.

US published patent application number 2007/0188399 discloses a selective frequency dipole antenna consisting of a radiator comprising conductor regions that have alternating shapes (zig-zag or square meander lines) with an interleaving straight line conductor section, as well as a multiband antenna dipole antenna consisting of a plurality of radiators so constructed, which may be deployed with and without coupling to capacitive or inductive loads.

U.S. Pat. No. 7,394,437 discloses the use of multiple microstrip dipole antennas that resonate at multiple frequencies due to "a microstrip island" inserted within the antenna array.

U.S. Pat. No. 7,432,873 discloses the use of a plurality of printed dipole antenna elements to selectively filter multiple frequency bands.

U.S. Pat. No. 7,173,577 discloses dynamically changing the composition of a fluidic dielectric contained within a substrate cavity to change the permittivity and/or permeability of the fluidic dielectric to selectively alter the frequency response of a phased array antenna on the substrate surface.

U.S. Pat. No. 7,053,844 discloses a multiband dipole antenna element that contains radiator branches.

US published patent application 2005/0179614 discloses the use of a microprocessor controlled adaptable frequency-selective surface that is responsive to operating characteristics of at least one antenna element, including a dipole antenna element.

U.S. Pat. No. 6,943,730 discloses the use of one or more capacitively loaded antenna elements wherein capacitive coupling between two parallel plates and the parallel plates and a ground plane and inductive coupling generated by loop currents circulating between the parallel plates and the ground plane is adjusted to cause the capacitively loaded antenna element to be resonant at a particular frequency band and multiple capacitively loaded antenna elements are added to make the antenna system receptive to multiple frequency bands.

U.S. Pat. No. 6,717,551 discloses the use of one or more U-shaped antenna elements wherein capacitive coupling within a U-shaped antenna element and inductive coupling between the U-shaped antenna element and a ground plane is adjusted to cause said U-shaped antenna element to be resonant at a particular frequency band and multiple U-shaped elements are added to make the antenna system receptive to multiple frequency bands.

US published patent application 2004/0222936 discloses a multi-band dipole antenna element that consists of metallic plate or metal film formed on an insulating substrate that comprises slots in the metal with an "L-shaped" conductor material located within the slot that causes the dipole to be resonant at certain select frequency bands.

U.S. Pat. No. 6,545,645 discloses the use of optical interference between reflective antenna surfaces to select specific frequencies within a range of electromagnetic frequencies.

U.S. Pat. No. 6,147,572 discloses the use of a micro-strip antenna element co-located within a cavity to form a device that selective filters frequencies from a range of electromagnetic frequencies.

U.S. Pat. No. 5,917,458 discloses a frequency selective dipole antenna that has frequency selectivity by virtue of being integrated upon the substrate that is designed to operate as a frequency selective substrate.

U.S. Pat. No. 5,608,413 discloses an antenna formed using co-located slot and patch radiators to select frequencies and alter the polarization of radiation emissions.

U.S. Pat. No. 4,513,293 discloses an antenna comprising a plurality of parabolic sections in the form of concentric rings or segments that allow the antenna to use mechanical means to select specific frequencies within a range of electromagnetic frequencies.

Other approaches such as U.S. Pat. No. 5,220,339 involve using materials such as amorphous metal as a core with an electric conductive material wound around the length of the antenna element in order to receive VHF and UHF frequencies.

Close-Proximity Devices with a Magnetic Stripe

Similar to RF based close-proximity communications, magnetic stripe technology is a popular method to embed information onto a device and transfer data to another device via a close-proximity magnetic card reader or magnetic stripe reader, collectively called "magnetic card reader" hereafter. Governed by ISO/IEC (International Organization for Standardization and the International Electrotechnical Commission) standards such as 7810, 7811, and 7813, various types of information can be such as bank information, identity information, or other account information can be programmed or written onto a magnetic stripe by alternating the orientation of magnetic particles on a magnetic stripe. As the card is swiped, one or more heads on a magnetic card reader receives the alternating polarity of the magnetic field from the programmed magnetic stripe on the card. Magnetic stripe technology has been widely accepted in a broad number of markets including payment, identity, authentication, loyalty/reward, hotel/motel, and other industries due in part to its reliability, ease-of-use, its relative low expense to manufacture to size of a thin card.

Dynamic Magnetic Stripe Emulation

Several approaches have attempted to replicate information stored on common magnetic stripe and transmit this data to a magnetic card reader which then receives the data just as it would from a traditional magnetic stripe card. These methods are often referred to as dynamic magnetic stripe, or magnetic stripe emulation. Most of these approaches involve coils that send information collected from a magnetic stripe card in a manner that duplicates the alternating polarity of the magnetic field that magnetic card readers receive from a typical magnetic stripe card moving through the reader.

One of the earliest prior art that investigated methods to emulate information stored on a common magnetic stripe readable by existing card readers is described in U.S. Pat. No. 4,701,601 (1987). This patent describes a transaction card having a magnetic stripe emulator where the emulator may be a transducer defined by one electromagnetic coil.

Another example of early prior art is U.S. Pat. No. 4,791,283 (1988), which describes a card using magnetic material to couple the magnetic field from a coil where a diamagnetic gap in the magnetic material causes the magnetic field lines across the gap to extend the field from the card, further improving the transmission of the magnetic field.

U.S. Pat. No. 8,690,059 describes yet another coil based magnetic stripe emulation device consisting of a rectangular wound coil acting as an open air core inductor along with a driver that receives signals from an external source, conditions and amplifies the power of the electrical information so that it can be transmitted magnetically from a cell phone.

Other prior art includes "payment cards" that comprise a common coil. U.S. Pat. No. 8,608,083 (2013) is an example of several patents that describe payment cards that use various coils to emulate the magnetic stripe, as do patent applications WO 2007/028634 A1, and WO 2002/047019 A1.

U.S. Pat. No. 8,302,871 (2012) describes yet another payment card that uses coils of ferromagnetic core to emulate two tracks of a magnetic stripe.

Patent application WO 1996/026500 A1 describes a magnetic stripe card simulation means with at least one electrical coil, but where that coil is wound around a u-shaped core.

Wake-Up Methods

Many RFID applications such as tolls and NFC utilize antennas matched to a specific resonant frequency to detect a close-proximity reader and activate a circuit in response. These circuits are considered to be passive, or semi-passive if a battery then takes over powering the circuit after initial wake-up. An issue with these approaches is that any signal received at a resonant frequency of the antenna will activate the circuit. For other close-proximity applications such as magnetic stripe, the reader can be detected and the speed of swiping a card a magnetic stripe can be determined using methods involving phase and/or capacitive sensing as described in U.S. Pat. No. 8,317,103.

Battery Charging

Other prior art references describe methods to perform inductive charging of batteries, although these methods are typically employ dedicated apparatuses defined inductive power standards such as Qi.

SUMMARY OF THE INVENTION

No devices or methods are known that combine multiple functions of one or more remote wake-up, communications, reader detection, reader-type detection, variable bit rate, variable bit order, variable power transmission, energy harvesting, and battery recharging over a single, compact, antenna within the size constraints of ISO dimensions to support magnetic stripe as well as other RF-based close proximity communications so that each of these functions may be performed at a lower power and with a smaller size element as is required for smart and/or powered cards, and/or mobile, portable or wearable device applications.

The present invention thus relates to devices, systems and methods that provide functionality using miniature, multi-purpose antenna structures, methods and systems that reduce power, space/size and cost within the constraints of powered or smart cards, and/or portable, mobile or wearable electronic devices. Moreover, the present invention provides methods and systems of remote wake-up, proximity detection, user authentication, data transfer (communications including RF (radio frequency), magnetic, electromagnetic, and/or energy transfer (energy harvesting and charging) within a multi-purpose antenna structure and/or module.

In some embodiments, the invention comprises a microprocessor (in certain applications a secure microprocessor or a secure element may be preferred, that is, a microprocessor that incorporates sophisticated security features including an array of mechanisms designed to resist all levels of threat, including observation, analysis, and physical attack), a microcontroller, ASIC (Application Specific Integrated Circuit), System on Chip (SOC) or the like, called "processing components" hereafter, connected to an antenna to form an antenna module. In such embodiments, the microprocessor or processing component applies a differential signal (in one embodiment) to the antenna to generate an alternating magnetic field representing data stored in a memory segment of the microprocessor or memory connected to the microprocessor. One or more general purpose input output (GPIO) connected from the microprocessor or the processing unit to the unique antenna structure control various parameters including but not limited to the timing of transmission, delays, power, pulse width, bit rate, bit order, bit direction, data, operational frequency, location, orientation and/or combinations. The alternating magnetic fields are received by a magnetic card reader.

In some embodiments, the multi-purpose antenna may also serve as a multi-band antenna to serve close-proximity sensors operating from DC to 11 GHz. In other embodiments, the multi-purpose antenna may also serve as a magnetic stripe transmitter (electromagnet) that enables reception of a magnetic signal by a wide range of magnetic card readers.

In one embodiment, the antenna or antenna module is of a sufficiently thin dimension to fit within a card that conforms to ISO standards to enable functions, such as non-limiting examples of payment cards, loyalty cards, identity cards and the like, where it can also serve to interact using multi-rate and/or multi-power electromagnetic field transmissions. In another embodiment, the antenna may be embedded into portable and/or wearable electronic devices such as non-limiting examples of phones, cards, jewelry, watches, watch bands, rings, wallets and the like, where it can also serve to interact wirelessly with close-proximity sensors and/or readers.

In yet other embodiments, an antenna on a first device, such as but not limited to a smart wallet or a phone, may interact with an antenna on a second device, such as but not limited to a smart card, to perform any or all of the multiple functions described. Within this configuration, card information may be secured within a personal electronic vault, such as a smart wallet or phone, from a card reader attached to directly the device, and then wake-up and pass encrypted data to a powered card that then can decrypt data for normal magnetic stripe communications, or alternatively, provide a dynamically paired code, a one-time-passcode (OTP) or token, relating to a person and his or her account to protect information as it is transmitted through a typical payment system.

BRIEF DESCRIPTION OF THE DRAWINGS

The forgoing and other features of the present invention will be apparent to one skilled in the art to which the present invention relates upon consideration of the description of the invention with reference to the accompanying drawings, herein:

FIGS. 25A and 25B illustrate two views of an accordion antenna structure with a diagonal pattern and gaps between sections of windings.

DETAILED DESCRIPTION OF THE PREFERRED EMBODIMENTS

Figure 1:
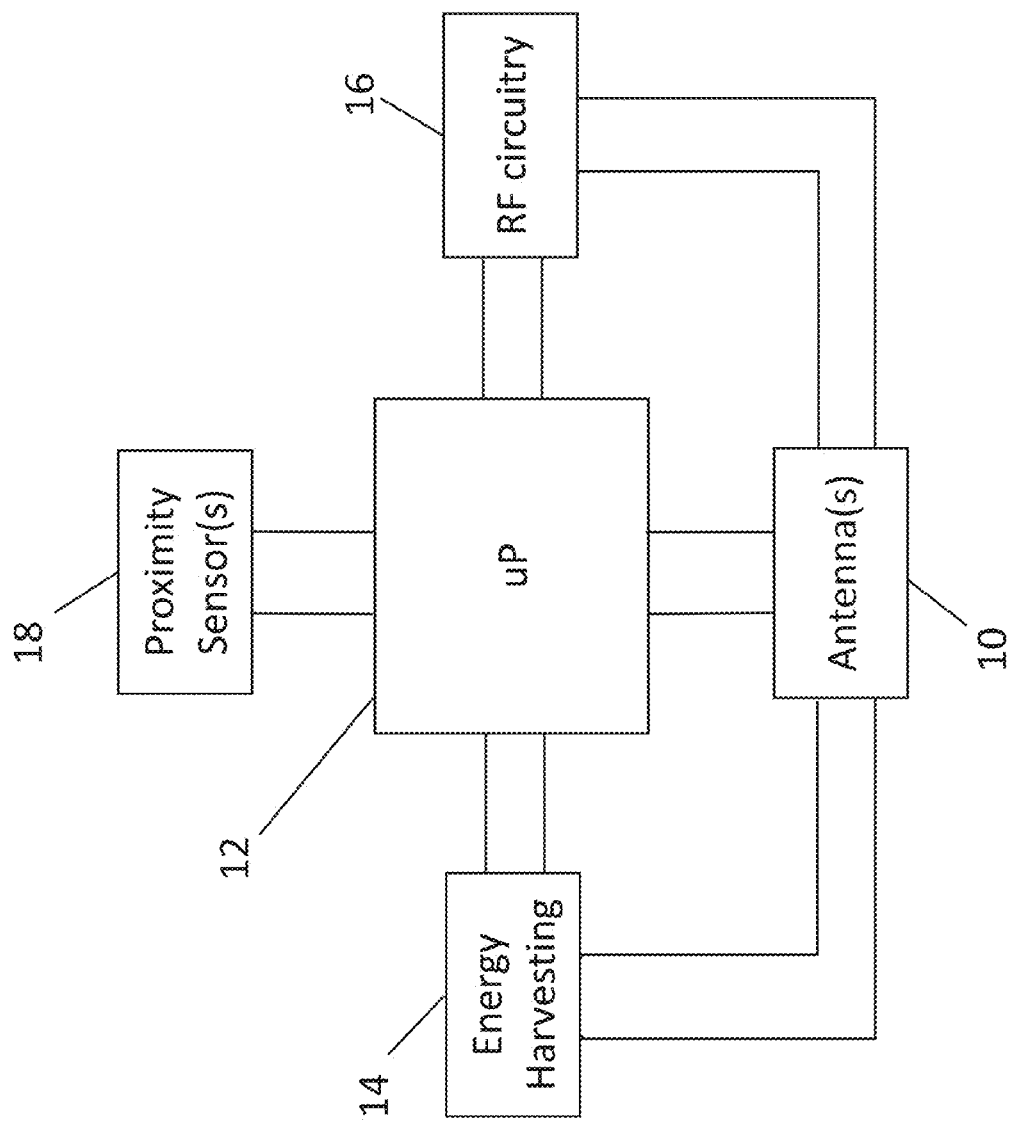
FIG. 1 describes an example block diagram for connectivity of a microprocessor with a multi-purpose antenna, where multiple functions are integrated with the multi-purpose antenna.

Before describing in detail the particular methods and apparatuses related to a multi-purpose antenna for low-power close-proximity communications and energy transfer, it should be observed that the embodiments of the present invention reside primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the embodiments. The presented embodiments are not intended to define limits as to the structures, elements or methods of the inventions, but only to provide exemplary constructions. The embodiments are permissive rather than mandatory and illustrative rather than exhaustive.

Overview

The disclosed invention consists of miniature, multi-purpose antenna or antenna module methods and systems for low-power, close-proximity communication and energy transfer applications. In various embodiments, one or more antenna structures or modules may be utilized individually or in combination with one another of a sufficiently small size and low-power consumption to enable applications employing tiny electronics components, including but not limited to powered and/or smart cards, and/or portable, mobile or wearable devices.

A "card" may be a powered or smart cards containing electronics within the card with lamination or other processes to encapsulate the electronics. Some powered or smart cards have primary or rechargeable batteries, or other power sources such as but not limited to super-capacitors to power circuitry within the card.

Portables may include but are not limited to wallets, smart wallets, key chains, accessories, glasses, FOBs, pens, and the like.

Mobile devices may include but are not limited to phones, tablets, laptops, and the like.

Wearables may include but are not limited to watches, bands, jewelry, shirts, pants, belts, belt buckles, buttons and the like. Jewelry could include but is not limited to rings, bracelets, anklets, necklaces, ear rings, nose rings, cuff links and the like.

In some embodiments, one or more of these innovative antenna structures, referenced as "antennas" collectively hereafter, may be combined with associated electronics and/or software to form miniature, multi-purpose antenna modules, referenced as "antenna modules" hereafter. Antenna modules are defined by a multi-purpose antenna connected to some circuitry, which may include but is not limited to microcontroller (MCU, μC, uC or MC), microprocessors (uP), ASIC (Application Specific Integrated Circuit), System on Chip (SOC) connected to an antenna to form an antenna module. a secure microprocessor or "secure element", that is, a microprocessor that incorporates sophisticated security features including an array of mechanisms, designed to resist all levels of threat including observation, analysis and physical attack or the like, or other electronic components providing similar functionality, called "processing components" hereafter. Such embodiments utilize antenna modules to achieve more functions and higher performance than can be achieved with an antenna structure alone.

Multiple Functions Supported

Under various embodiments, a multi-purpose antenna and/or antenna module may support one or combinations of the following functions:

Wake-up a microprocessor from a passive state or a low-powered sleep state;

Receive data from another remote device to wake-up circuitry;

Bring a microprocessor out of a very low power sleep state by detecting the presence of a close-proximity sensor and/or magnetic card reader;

Transmit information sent to the antenna structure from a microprocessor or another device;

Detect the specific RF frequency and/or type of a proximity sensor;

Transmit at the specific frequency of the proximity sensor, and/or at DC (direct current) or "baseband" in the case of magnetic card readers;

Vary the number, interval and timing of the transmissions, delays, power, pulse width, bit rate, bit order, bit direction, data, operational frequency, location and orientation of the signal, collectively called "parameters" hereafter, to ensure an improved reception of the signal by a reader;

Detect and route charging power to a power source recharging and/or energy harvesting circuitry;

Detect a low battery condition and charge a power source.

Circuitry to Support Multiple Functions

Some of these functions may be accomplished individually with an antenna structure alone in certain targeted applications, or in combination with software and external circuitry to switch between functions within the same invention. Circuitry to support combining functions includes but is not limited to couplers, resistors, capacitors, inductors, varactors, tunable RF capacitors, switches, and the like that may be discrete in some embodiments, or within the same semiconductor using ASIC (application-specific integrated circuit), SoC (system on chip) and/or general purpose RF, controller and processing technologies in other embodiments to take advantage of the unique attributes of the antenna structure.

In some embodiments, the invention comprises processing components hereafter, connected to an antenna to form an antenna module. In such embodiments, the microprocessor or processing component applies a signal or a differential signal to the antenna to generate an alternating magnetic field representing data stored in a memory segment of the microprocessor or memory connected to the microprocessor. One or more general purpose input output (GPIO) connected from the microprocessor or processing unit to the unique antenna structure control various parameters including but not limited to the timing of the transmission, delays, power, pulse width, bit rate, bit order, bit direction, data, operational frequency, location and orientation of the signal, especially with respect to the location and orientation of the device for receiving the alternating magnetic fields. Typically, the alternating magnetic fields are received by a magnetic card reader.

FIG. 1 illustrates a functional block diagram of one such non-limiting example where one or more miniature multi-purpose antennas 10 may be connected directly to a microprocessor 12, an energy harvesting/recharge circuit 14, which is also connected to a battery, and/or one or more RF circuit(s) 16. The microprocessor 12 may also be connected to a close-proximity sensor detection circuit 18 in some embodiments.

In some embodiments, the processing unit is the same microprocessor or equivalent processing unit that is used to perform other functions within a common device, such as but not limited to a cell phone device. Under such embodiments, the antenna is directly controlled by the microprocessor or equivalent processing unit within the powered and/or smart cards, and/or portable, mobile or wearable devices.

Figure 2:
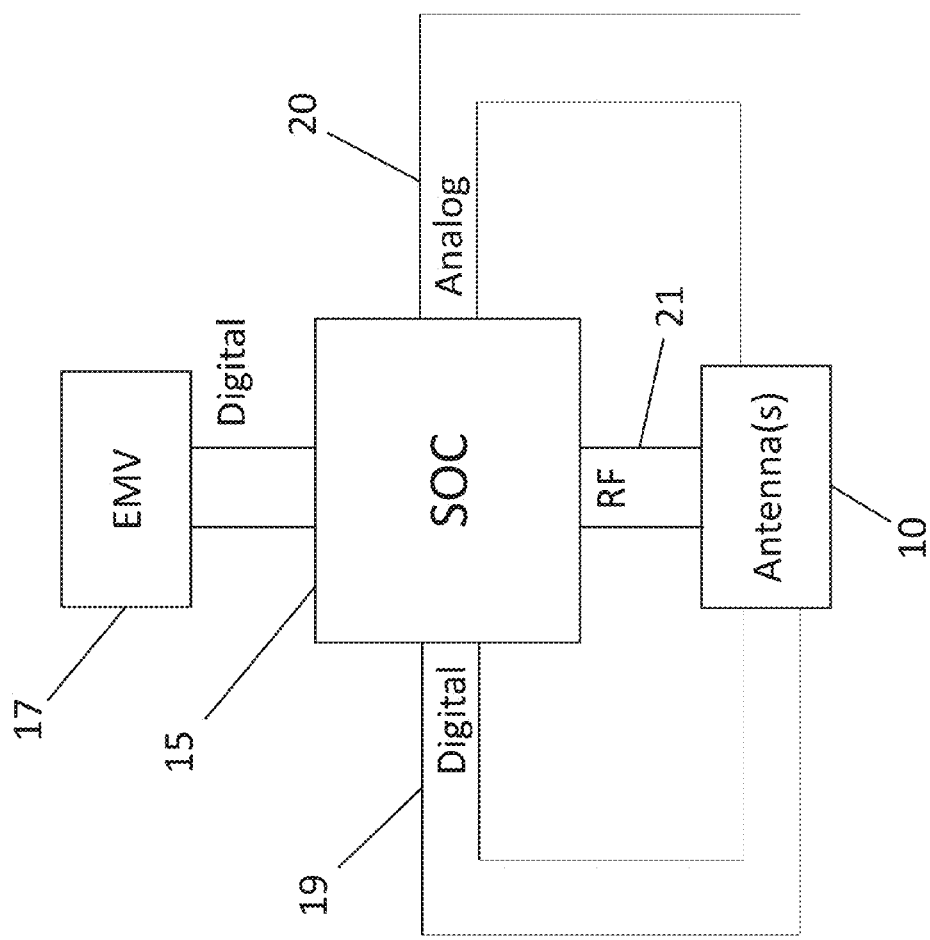
FIG. 2 illustrates an example block diagram for connectivity of an ASIC or SOC with a multi-purpose antenna, where external circuitry is replaced by circuitry internal to the ASIC or SOC connected directly the multi-purpose antenna by one or more General Purpose Input Output (GPIO) replace external.

FIG. 2 illustrates a similar functional block diagram as FIG. 1, but with one or more of the external circuits present within an ASIC or SOC or secure processor or secure element, shown collectively as SOC 15 in FIG. 2. Herein, the processing unit may share one or more General Purpose Input Output (GPIO) with a single antenna or with multiple antenna to perform multiple functions with the same antenna or with different antennas. One or more radio interfaces may also be present on the processing. These radio interfaces provide a signal according to various communications protocols for supplying a signal. In some embodiments, these GPIO contacts may also be used to communicate or perform transactions over physical contacts, such as but not limited to an EMV interface 17.

For any of these module configurations, the processing components may configure one or more general purpose input output (GPIO) pins to operate as an analog 18, or a digital 19, or an RF 20 input or output connected to one or more antenna 10 for generating the transaction signal comprising one or more of a radio frequency signals, a near field communications signal, a Bluetooth signal, a Bluetooth Low Energy (BLE) signal, or an EMV (Europay MasterCard Visa) signal or alternating magnetic fields, the transaction signal representing data stored in a memory segment of the microprocessor or memory connected to the microprocessor, wherein the transaction signal is received by a point-of-sale reader or magnetic card reader. The GPIO control various signal parameters including but not limited to signal power. Under certain embodiments, the processing component may execute the transaction responsive to a trigger signal, the trigger signal provided by one or more sensors connected to the processing component, which in turn supplies a transaction signal to one or more of an EMV (Europay, MasterCard Visa) interface, or a Bluetooth radio interface, a Bluetooth Low Energy (BLE) radio interface, a WiFi radio interface, a Near Field Communications (NFC) radio interface or other radio interface interfaces for executing a financial transaction. A trigger signal may be provided by user operation of a mechanical or electrical switch, or by one or more sensors responsive to a triggering event, such as but not limited to detection of a reader or interface.

Antenna Structures

In one embodiment, the invention consists of unique and non-obvious methods and systems that utilize one or more antenna structures that may be used individually or in combination with one another to serve as miniature, multi-purpose antenna for close-proximity applications, close-proximity as defined as less than 300 meters between any 2 devices.

Figure 3:
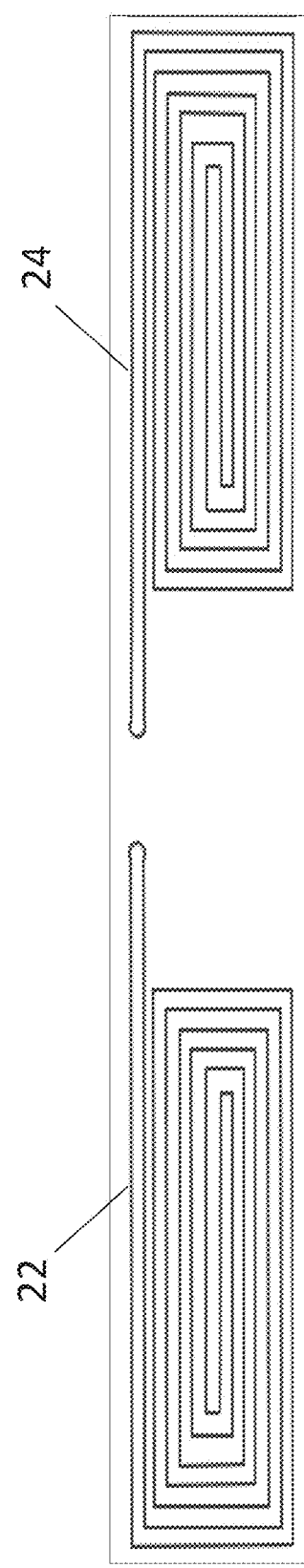
FIG. 3 illustrates a spiral dipole antenna structure.

Several antenna structures may be utilized to form a multi-purpose antenna. As illustrated in FIG. 3, two or more multiple spirals elements 22 and 24 may be configured similar to a dipole but small enough to fit within a powered card to support multiple functions such as but not limited to radio frequency (RF) propagation, an electromagnet, and/or a power transfer apparatus.

Figure 4:
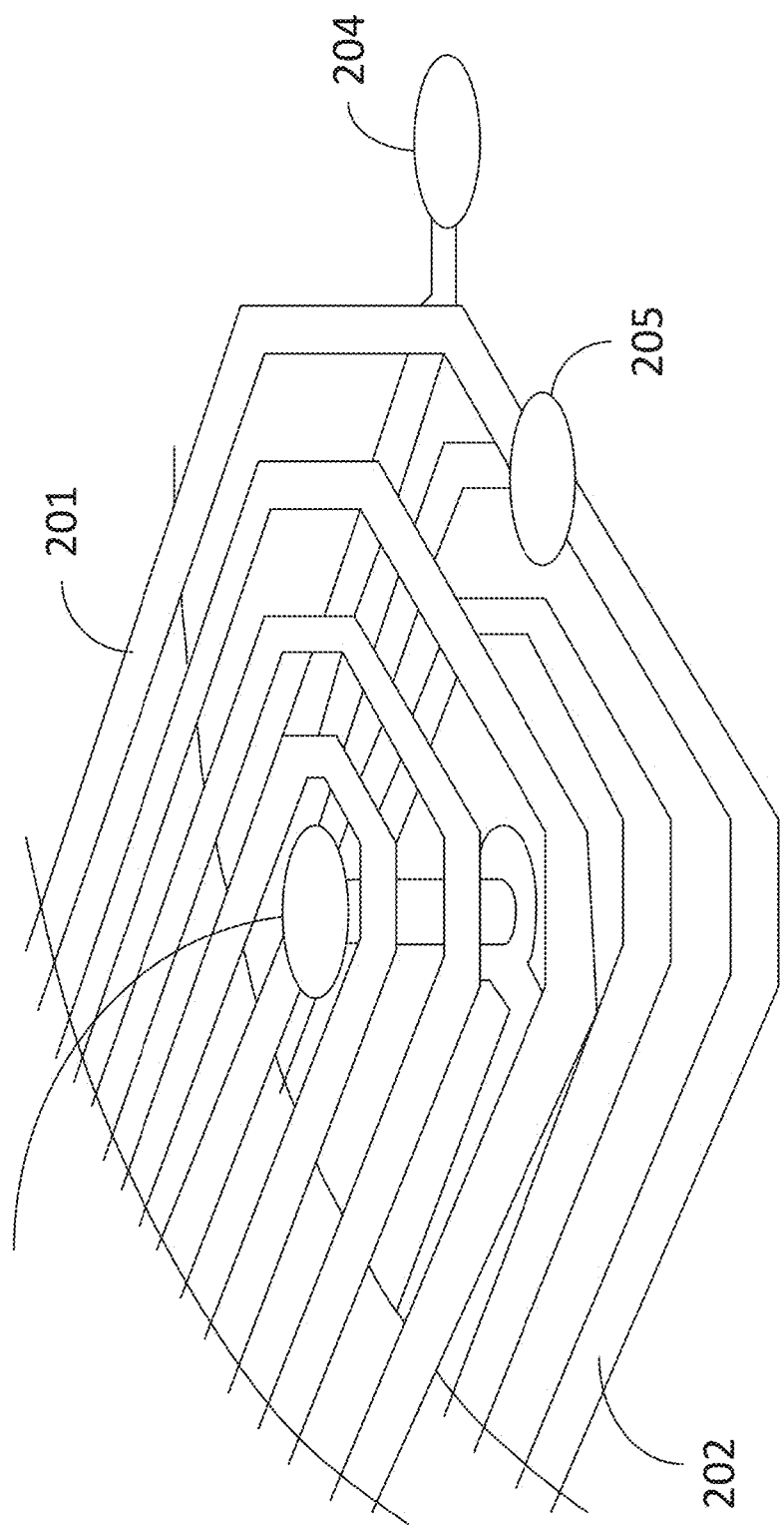
FIG. 4 illustrates two or more metal and/or other material with electromagnetic printed and/or cut into a spiral shape on the front and rear sides of a PC board and/or inlay.

One embodiment shown in FIG. 4 comprises one or more spiral-shaped radiator structures (two structures illustrated in FIG. 4 and denoted by reference characters 201 and 202) fabricated from a metal and/or another material having conductive or electromagnetic properties. The radiators can be printed, etched, and/or cut into a spiral shape on two opposing surfaces of a PC board and/or inlay. Variations of this structure include two radiators (denoted as front and rear planar spirals disposed on opposing surfaces of a PC board) connected at a center region 203 to form a multi-planar, multi-spiral, multi-purpose antenna. Via 204 and via 205 may be connected to a circuit that provides signal source and ground, or connected differentially to perform each of the close-proximity functions, or in some low power embodiments, directly to a microprocessor alleviating the need of more components or drivers.

Multi-Layer/Planar

Figure 5:
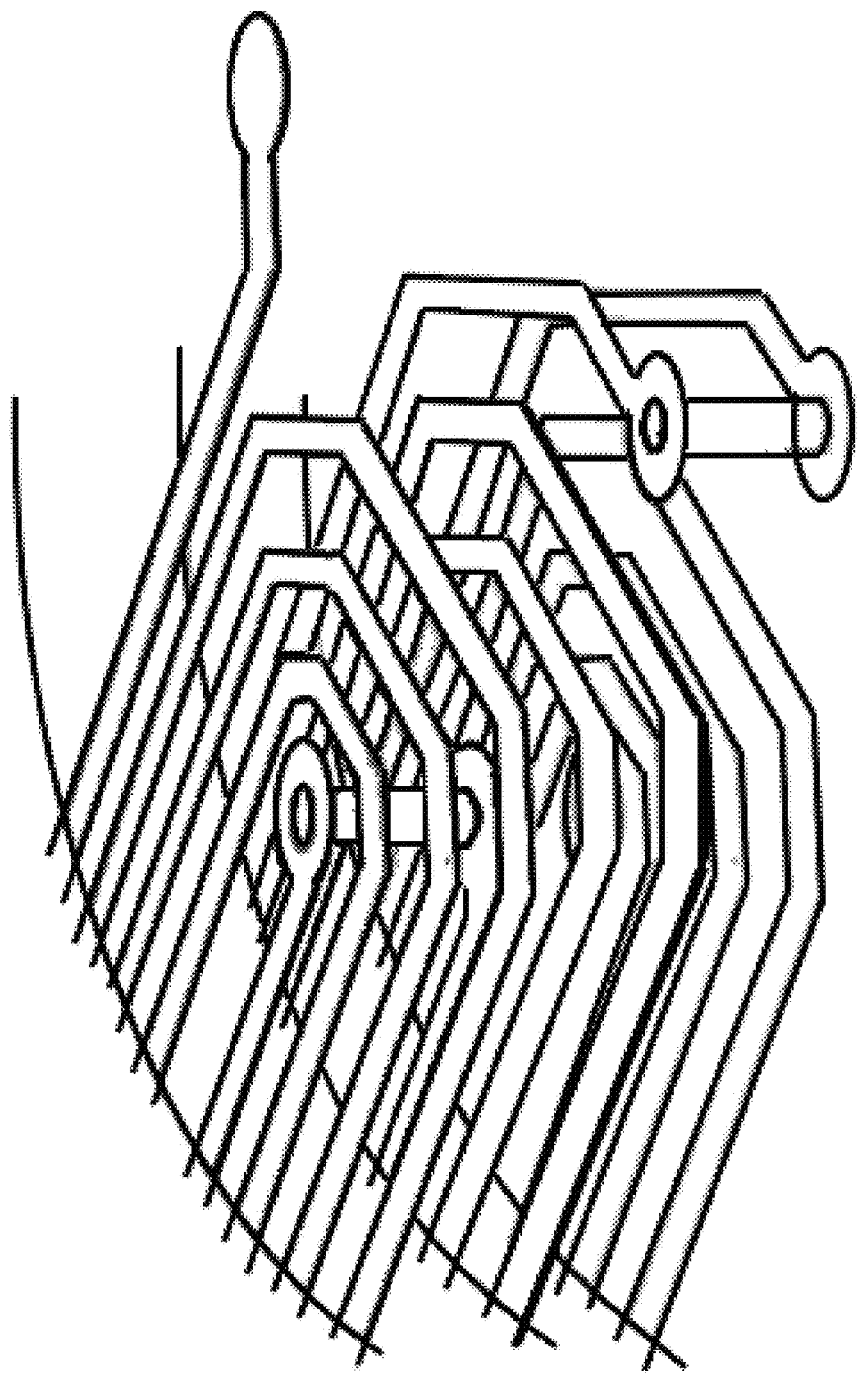
FIG. 5 provides an example of a multi-planar antenna folded atop within layers of a PCB.

In other embodiments, more spirals may be added by simply adding more layers of spirals connected at the end or middle as the three layer example shown in FIG. 5. Theoretically, any antenna type and/or shape may be combined into any number of different array configurations to improve performance beyond that available from a single antenna element.

Electrically coupled parallelism is one technique to extend antenna bandwidth. For a non-limiting example, combining two spiral antennas with different radiation zone radii yields a standing wave ratio (SWR) that can be kept low for a wide bandwidth, resulting in improved multi-purpose antenna performance for applications such as ultra wideband (UWB) transmissions.

Folded 3D Structures

Figure 6:
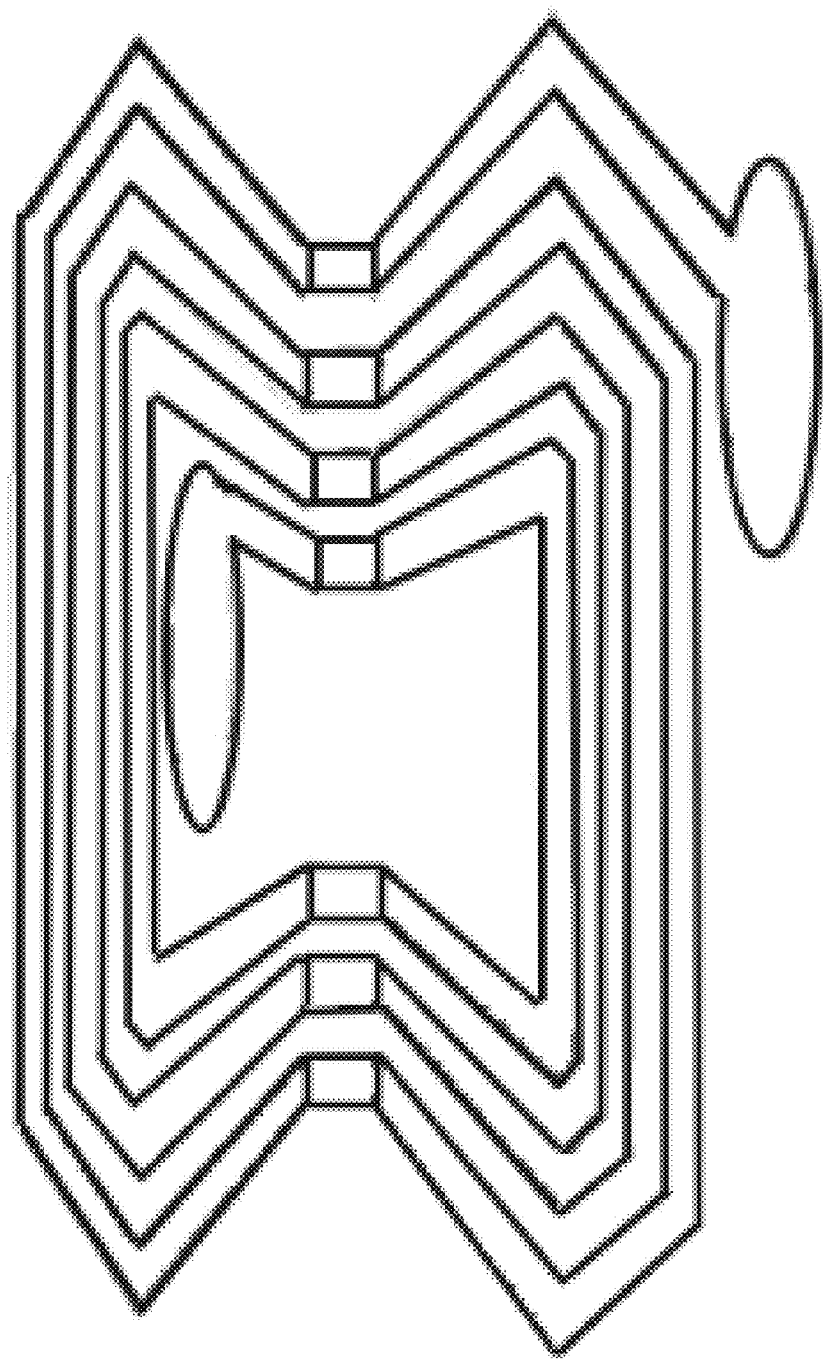
FIG. 6 illustrates a three spiral non-limiting example of adding spirals to more layers of within the antenna structure.

In yet other embodiments, the radiating structure may be folded to form a 3D structure as shown in FIG. 6. A key benefit of this folded 3D structure as well as multi-planar spiral structures is that the element is a balanced structure and does not require a ground reference.

Spiral and Loop Benefits

Figure 7:
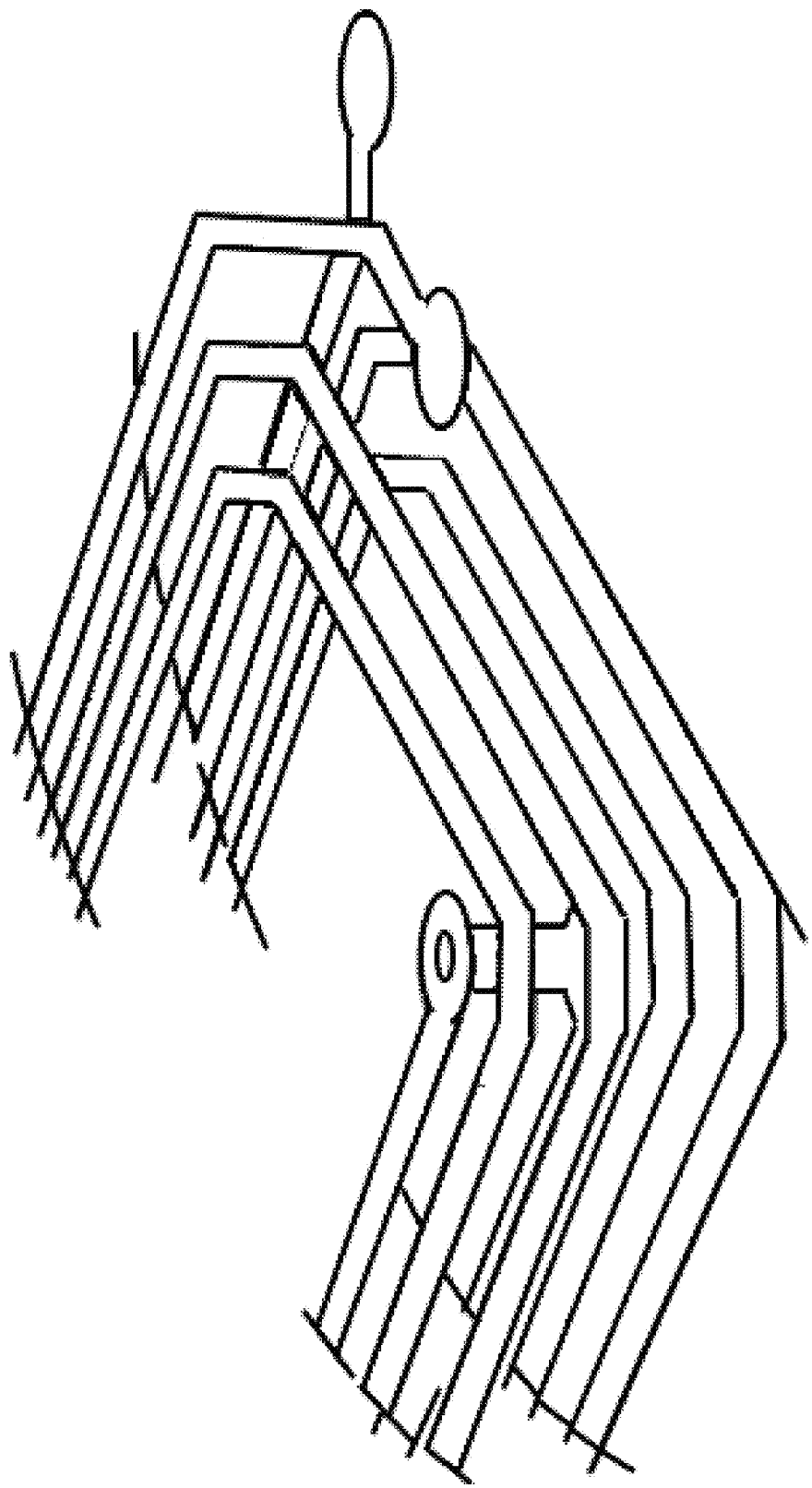
FIG. 7 illustrates an example of a multi-planar loop structure.
Figure 8:
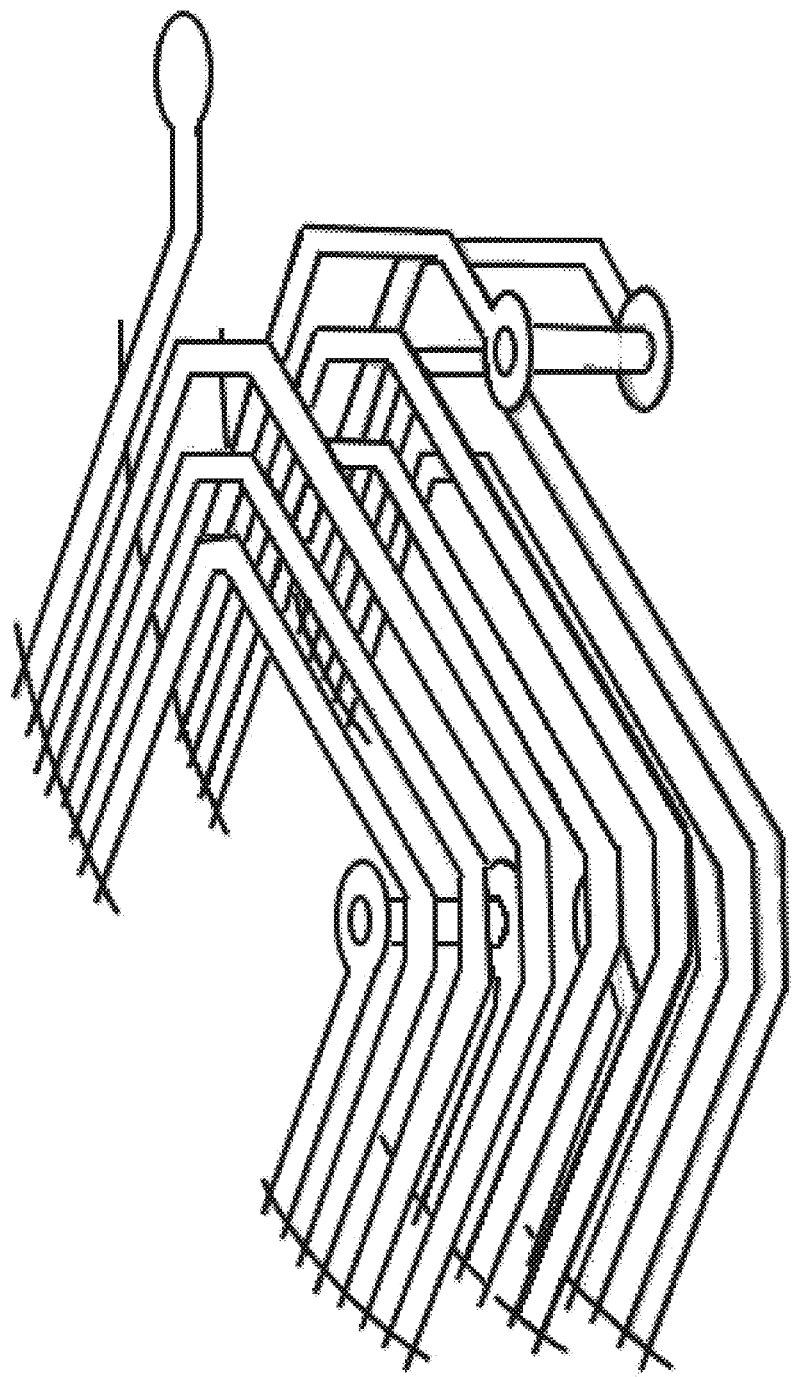
FIG. 8 illustrates a multi-layer loop example.

Like spiral structures, loop structures are balanced structures that do not require ground reference. FIG. 7 and FIG. 8 illustrate examples of multi-planar loop structures. In some embodiments, a miniature loop antenna structure may be reduced in size and tuned in the same manner as a spiral element to optimize performance and matching to specific close-proximity readers.

Reflectors and Directors

In one embodiment, placing a metallic object in close proximity to the antenna structure may enhance performance from an antenna structure. In other embodiments, reflectors or directors may be added to enhance the performance of the structure. In some embodiments, one or more cores 230 may be inserted to improve performance such as displayed in FIG. 9 and FIG. 10.

Spiral and Loop Resonant Structures

Figure 11B:
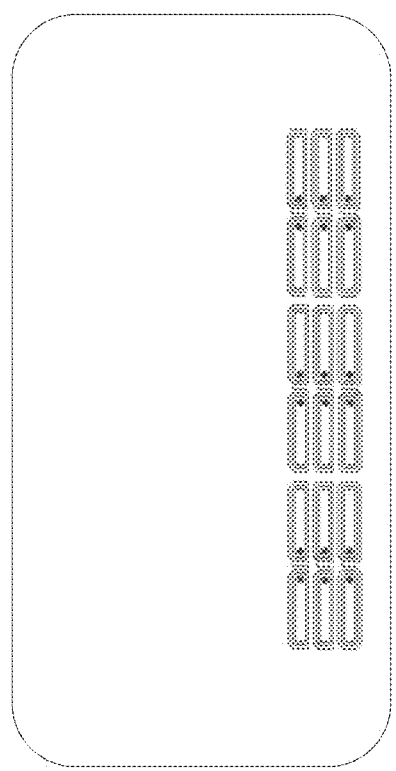
FIGS. 11A and 11B show respective front and rear views of multiple antenna structures daisy-chained together and aligned at the base of a magnetic stripe card in place of the magnetic stripe.
Figure 11A:
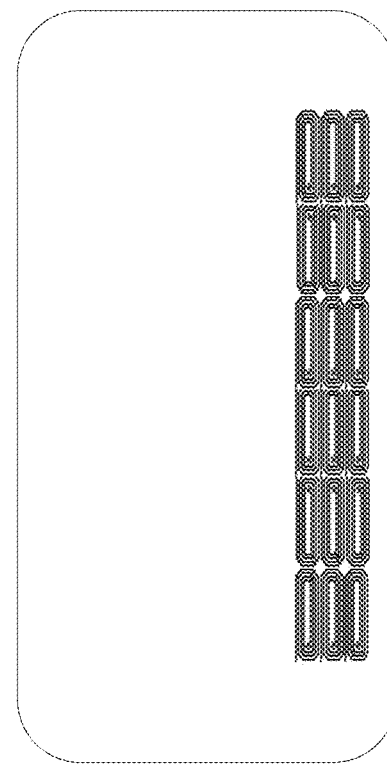

While a single monofilar spiral or loop structure may be tuned to a specific resonant frequency and having an input matched to optimize coupling and sensitivity in narrowband applications, a multi-planar antenna structure described herein may be expanded to broadband applications since it has higher spectral efficiency than other planar antennas and is more perfectly matched to higher frequencies, appearing to lower frequencies more like a patch antenna. Nevertheless, such "perfect" spectral efficiency is not required for close-proximity applications. Since spiral and loop structures are resonant electromagnetic structures, multiple purposes such as RF and magnetic stripe transmission may be achieved with a common antenna spiral structure by connecting multiple miniature spirals in parallel and/or in series to provide a longer magnetic field that is constant over larger area, including the dimensions of one or more tracks of a magnetic stripe, as shown in FIGS. 11A (front view) and 11B (rear view)

Core Based Structures

Figure 9:
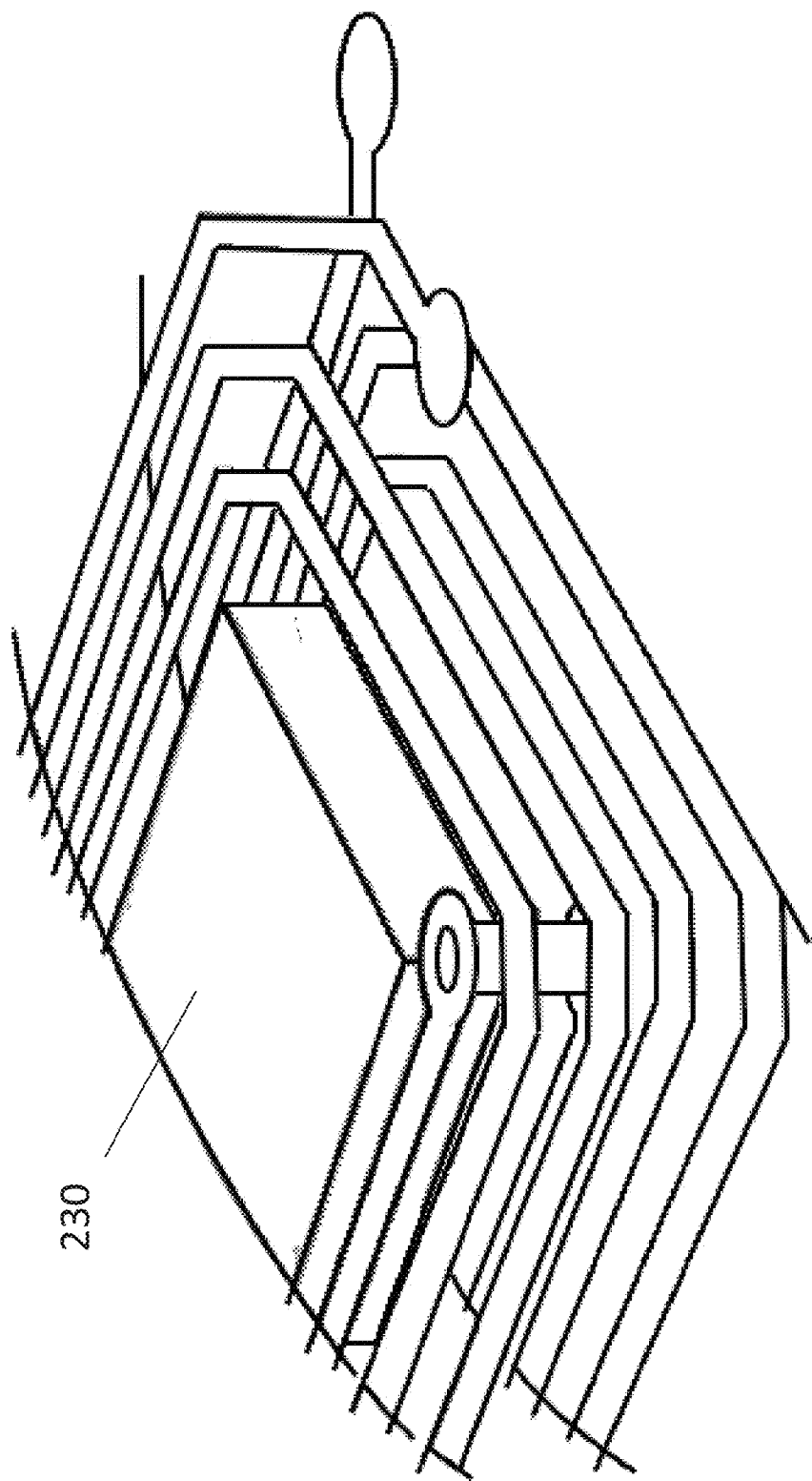
FIG. 9 illustrates an example of a multi-purpose loop antenna structure with a core.
Figure 10:
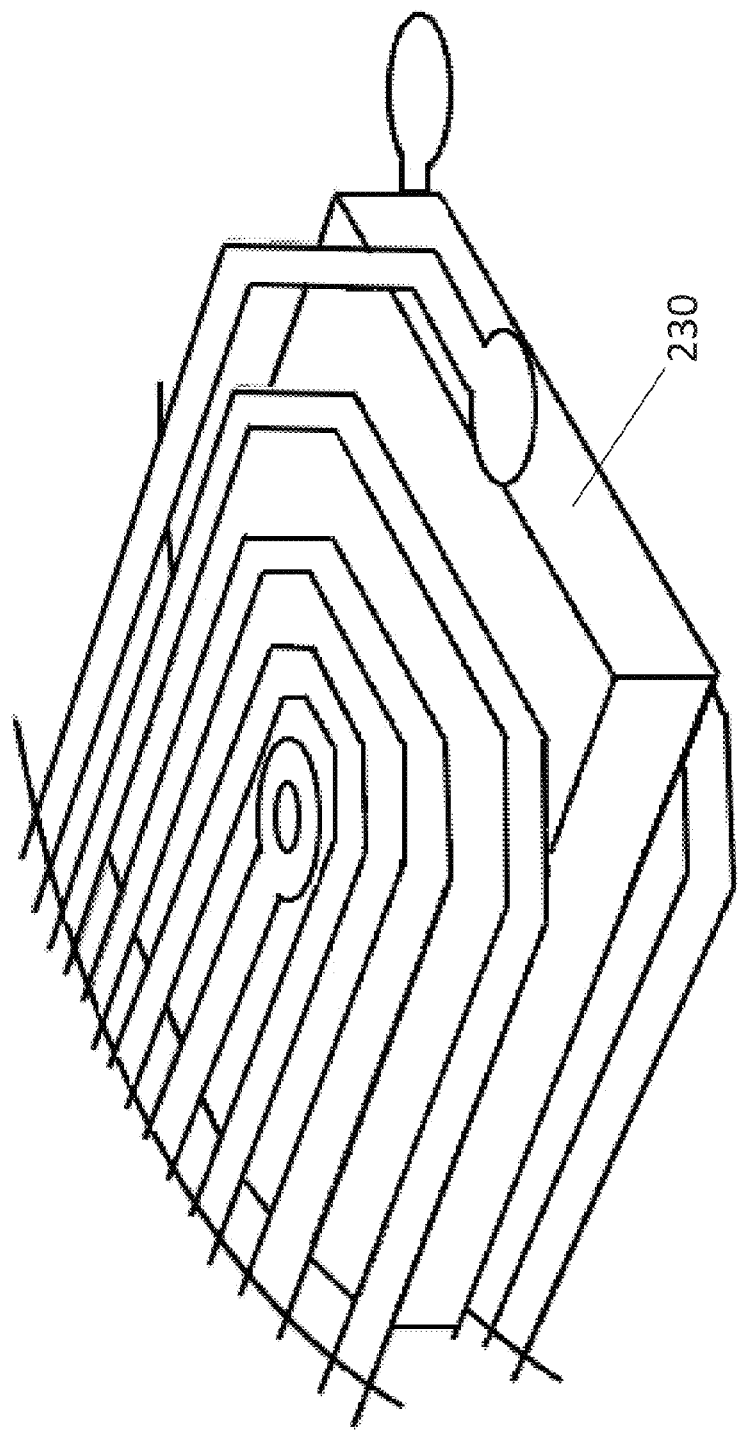
FIG. 10 illustrates an example of a of a multi-purpose spiral antenna structure with a core.

In yet another embodiment, core material may be placed between layers as illustrated in FIG. 9 and FIG. 10. Core material of sufficient permeability may be used to "load" one or more antenna elements to improve overall antenna performance.

Figure 12:
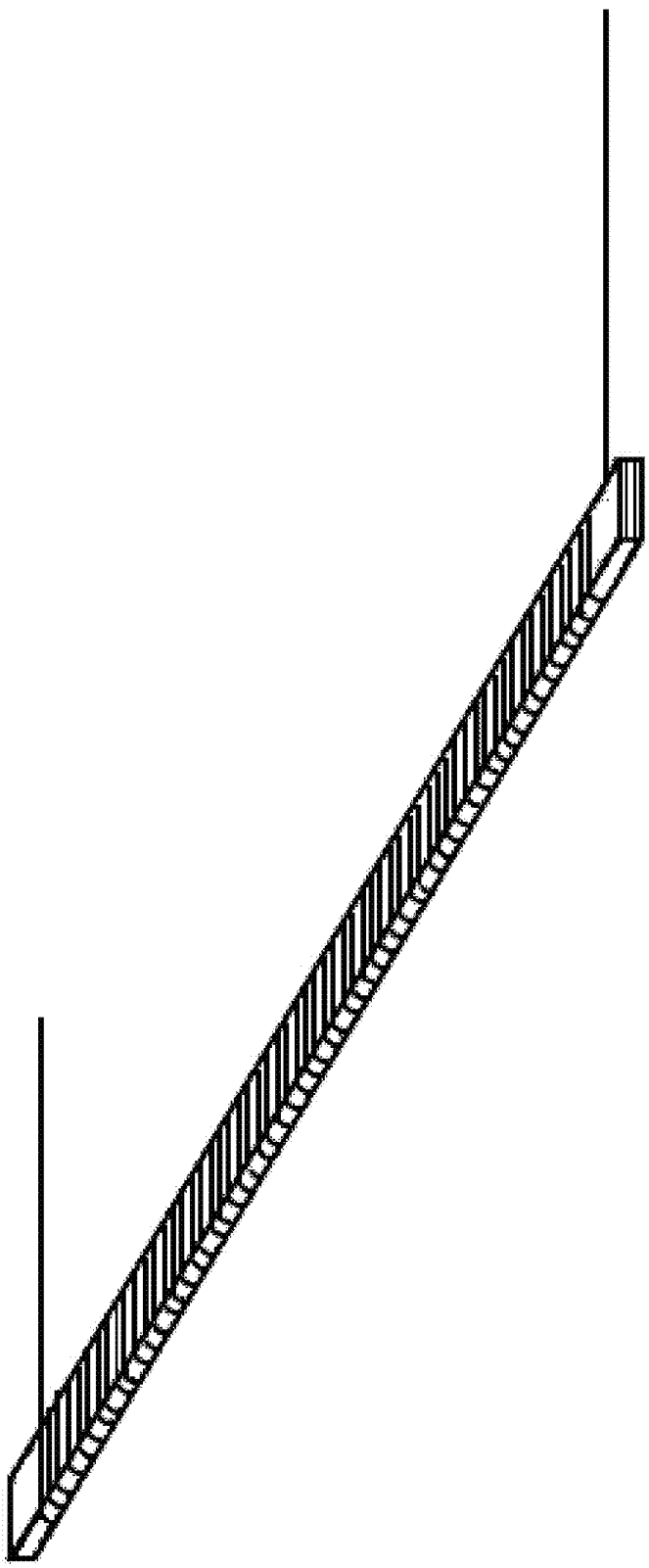
FIG. 12 illustrates a wire around one or more layers of core material to form a multi-purpose antenna.

In another aspect of the invention, a multi-purpose antenna structure consists of one or more antenna elements with wire wrapped around one or more layers of a core material as shown in FIG. 12. Windings may comprise any conductive material such as copper and configured to generate or receive a radiated field pattern.

Figure 13:
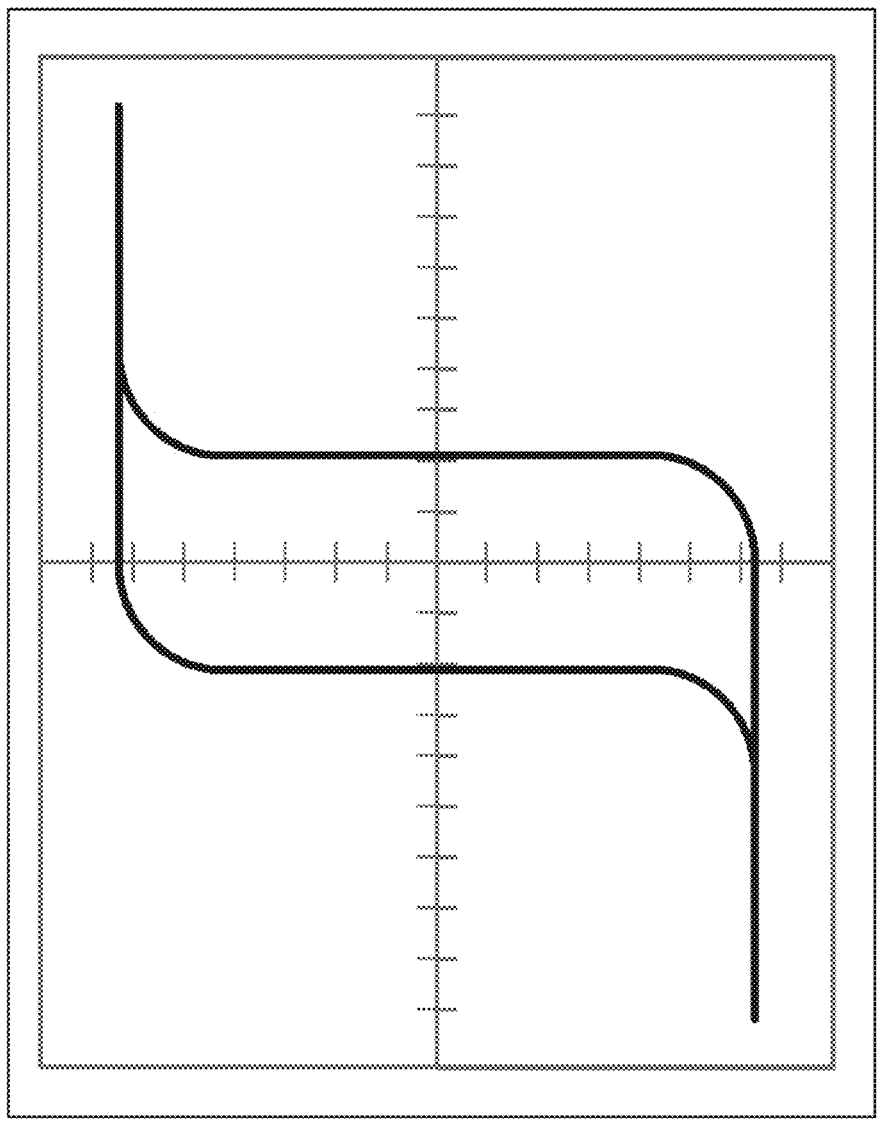
FIG. 13 illustrates an example of a DC (Direct Current) hysteresis loop.

The core material for these antenna structures must have sufficient permeability, low magnetostriction, and sufficient DC hysteresis loop (such as that shown in FIG. 13) to support rapid transient impulses for electromagnetic response within magnetic stripe applications, but with sufficient saturation for higher radio frequency (RF) applications.

Antenna Core Materials

Multi-purpose antennas are not limited to any one specific material. Under this invention, non-limiting examples of materials that can be used as a core include metals and/or alloys that are annealed or amorphous including such as but not limited to iron, ferrite, or nickel, or nanomaterials such as but not limited to nanocrystalline, powder or ink, or other materials or combinations of materials that provide high permeability with sharp DC hysteresis loop. In general, the higher the permeability, the better the electromagnetic performance, but there is a trade-off between permeability and saturation. Conversely, the higher the saturation and the smaller the magnetostriction and coercive force, the higher the magnitude of flux density can be achieved.

In addition, a sharp DC hysteresis loop provides better performance for antennas that are energized by abrupt transients, such as with electromagnetic transmission. Under this invention, a material with sufficient permeability and saturation, but with low magnetostriction and coercive force, and sharp DC hysteresis loop is chosen to optimize for power, electromagnetic and radio frequency transfers.

For this invention, a permeability between about 5,000 and about 350,000 H/m is desired. Annealing temperatures can range from 950 degrees Celsius to 1200 Degrees Celsius, with a cooling rate of 100 to 800 degrees Kelvin per hour.

Manufacturing of the Core Materials

Figure 14:
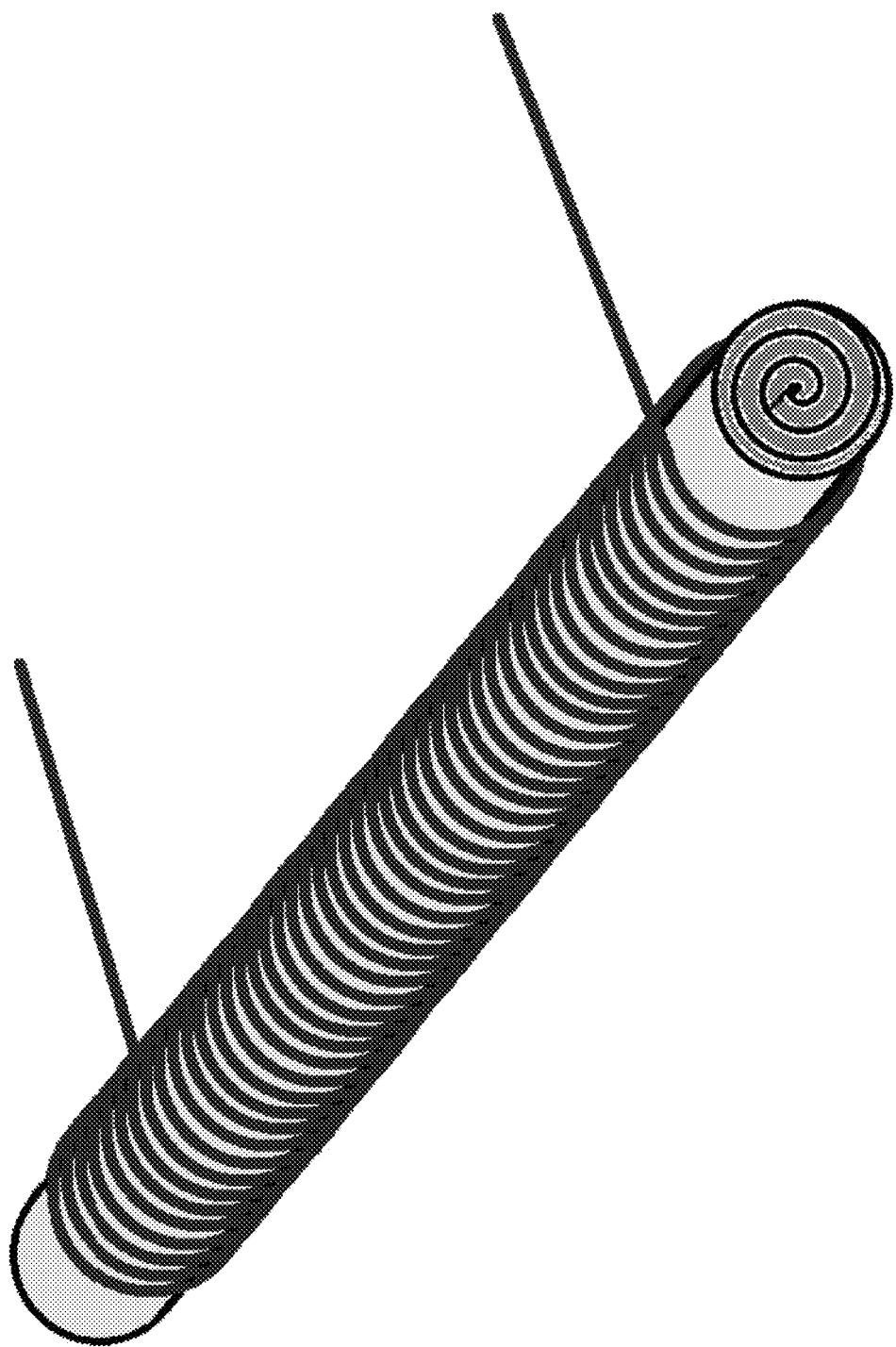
FIG. 14 illustrates an example of a conical or "rolled" core within a wire.

Core materials may be provided in many shapes and forms, such as but not limited to strips, fibers, power, and ink, or even circular cross-sectional shape as shown in FIG. 14. Although the shape is inconsequential for most applications, the shape may affect performance in some circumstances. In some embodiments, multiple layers of the core maybe be placed adjacent with one another, or in other embodiments adhered or "laminated" with one another using materials such as low-loss tape and/or adhesives, or in some embodiments, materials may also be low loss at RF frequencies from DC to 20 GHz. In other applications, a cylindrical shape provides better performance than layers or a single rectangular shaped core.

Fabrication Methods

The antenna structures described herein are not limited to any specific fabrication methods. Persons skilled in the art will appreciate that the antennas may be fabricated in a variety of methods including but not limited to wire winding around a core as shown in FIGS. 12 and 14, etching such as laser etching, die cut, printing on and/or beneath a surface of a printed circuit board (PCB) and/or flexible circuit (Flex-circuit) and/or device, and/or even printed using various metal, alloy and/or electronic and/or nano powder or ink.

Any fabrication method may yield a reliable multi-purpose antenna with enough electromagnetic (EMF) field and/or radio frequency (RF) field for use in close-proximity applications, but performance of an antenna may vary per the fabrication process or the orientation of the antenna within a card or device. The performance within a thickness that is less than 0.45 mm yields cards that conform to ISO standards, but makes certain fabrication methods more advantageous than others for thin applications, such as but not limited to powered card inlays and/or multi-layer lamination processes, such as but not limited to hot and/or cold lamination, or combinations of hot and cold lamination.

PCB Approach

Figure 15:
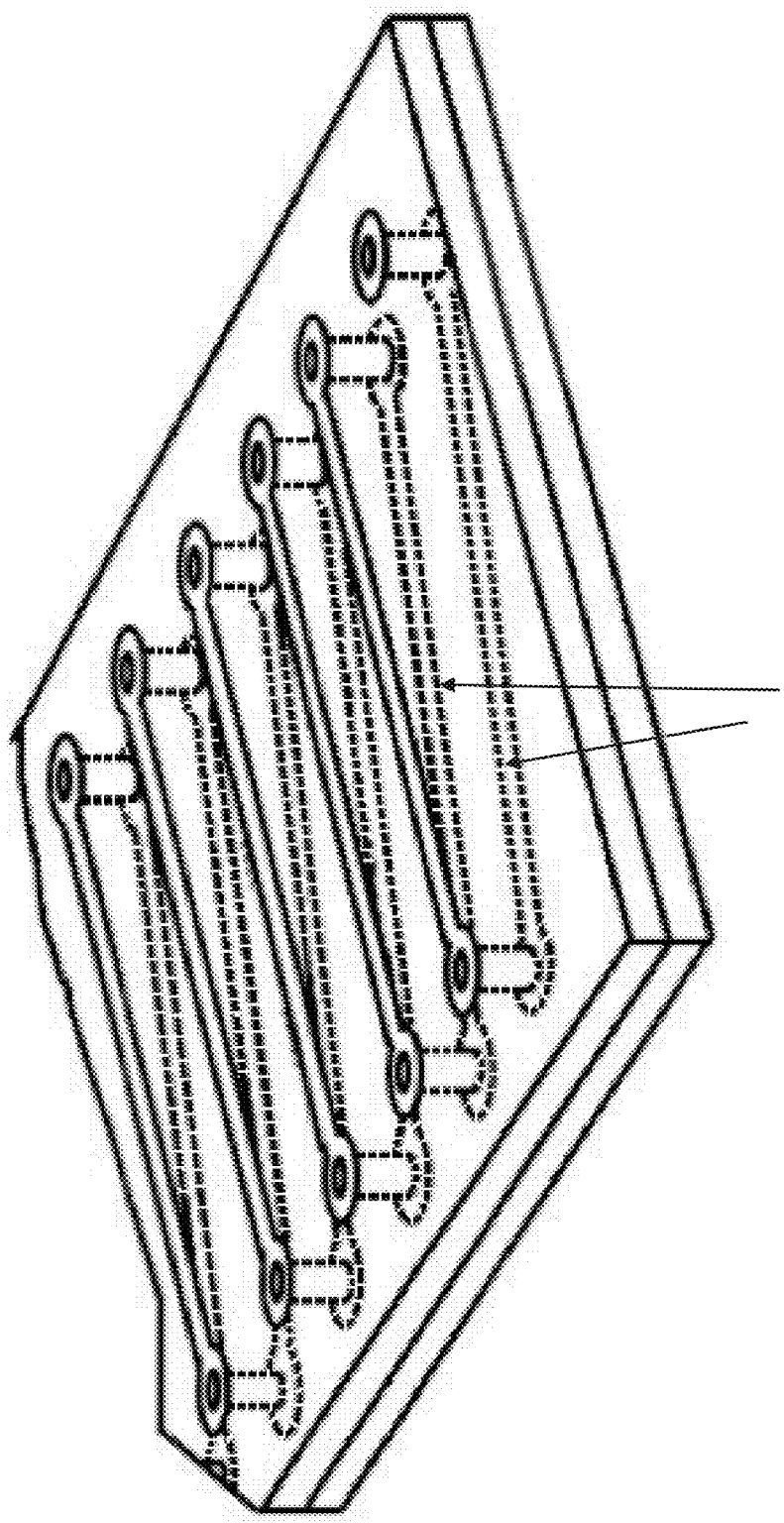
FIG. 15 illustrates a PCB (printed circuit board) method to fabricate a multi-purpose antenna.

Similar to a wire-wound approach, comparable antenna performance may be achieved via using printed circuit approaches such as that illustrated in FIG. 15.

Figure 16:
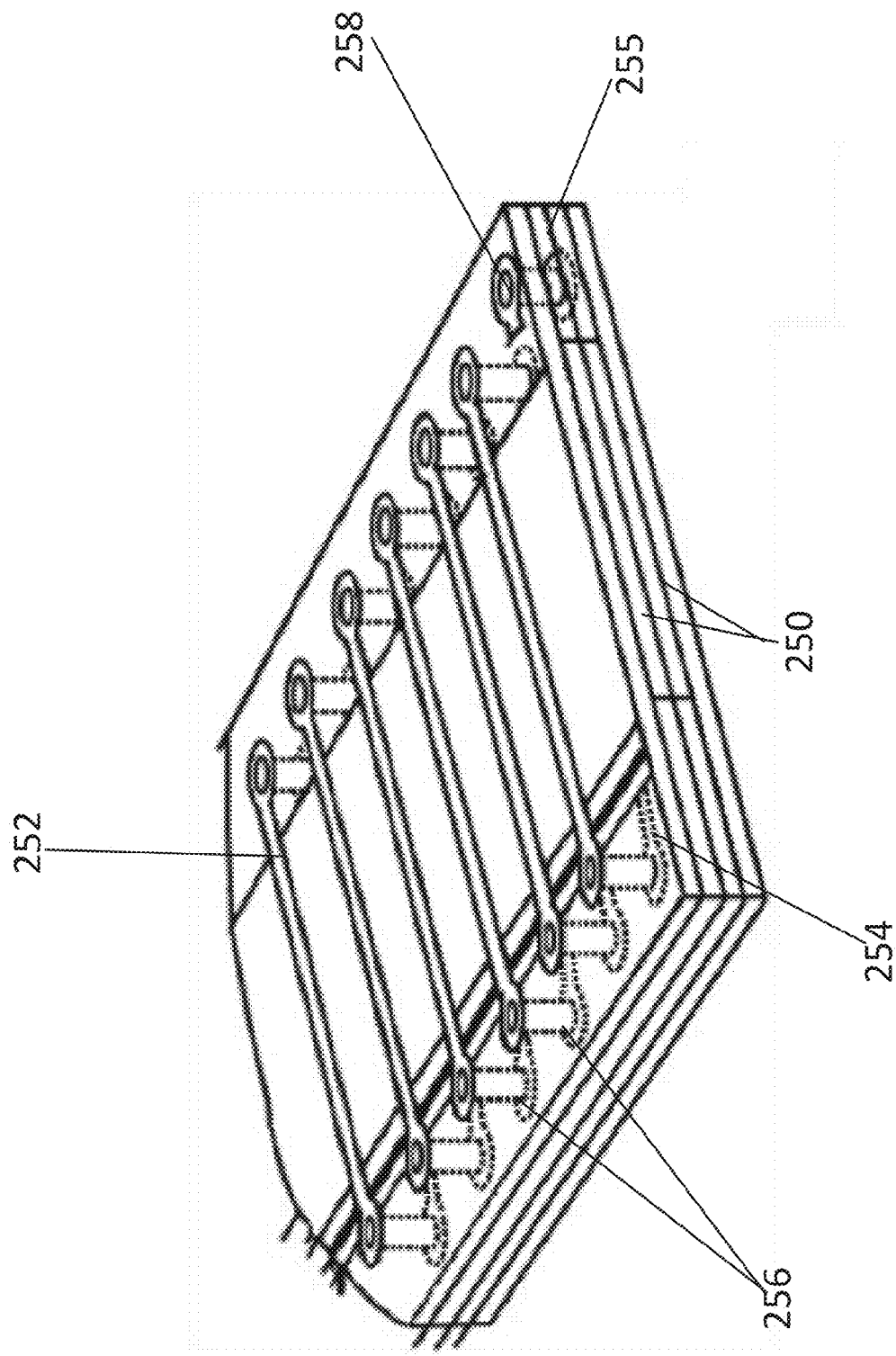
FIG. 16 illustrates a PCB method with core internal to the layers.

Another embodiment illustrated in FIG. 16 embeds one or more layers of core material 250 between conductive traces 252 and 254 on opposing surfaces of a printed circuit board/substrate 255 with the traces connected by vias 256. Terminals (one designated by reference character 258) for connection to external components are disposed on one or both surfaces.

Figure 17:
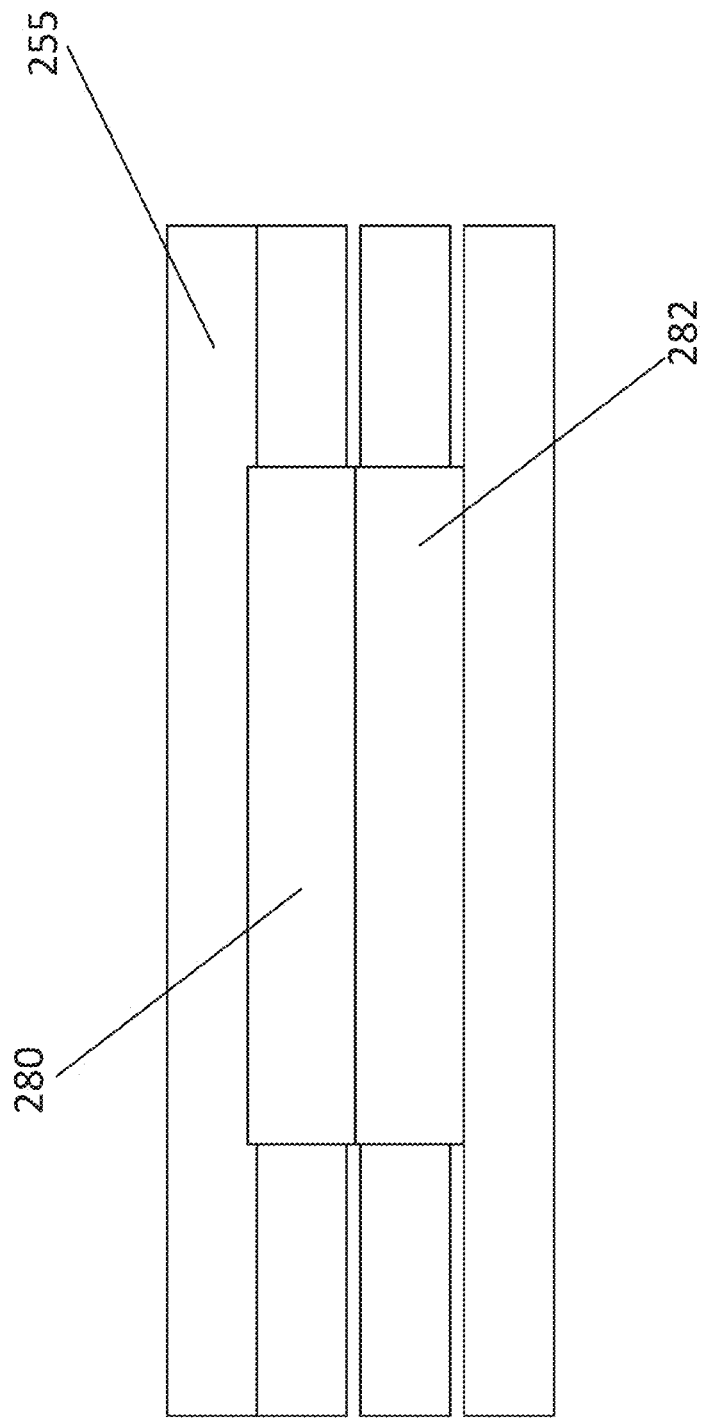
FIG. 17 illustrates a side view of core material within layers of a PCB antenna structure.
Figure 18:
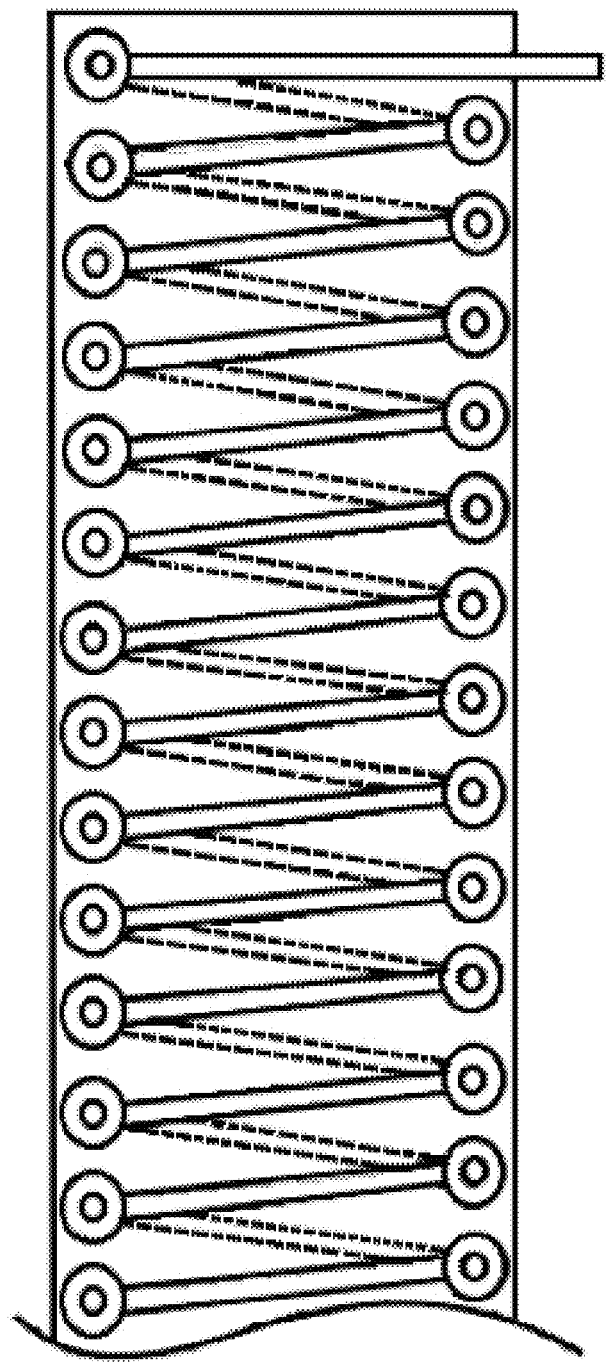
FIG. 18 illustrates a diagonal or "zig zag" pattern for the antenna structure.
Figure 19:
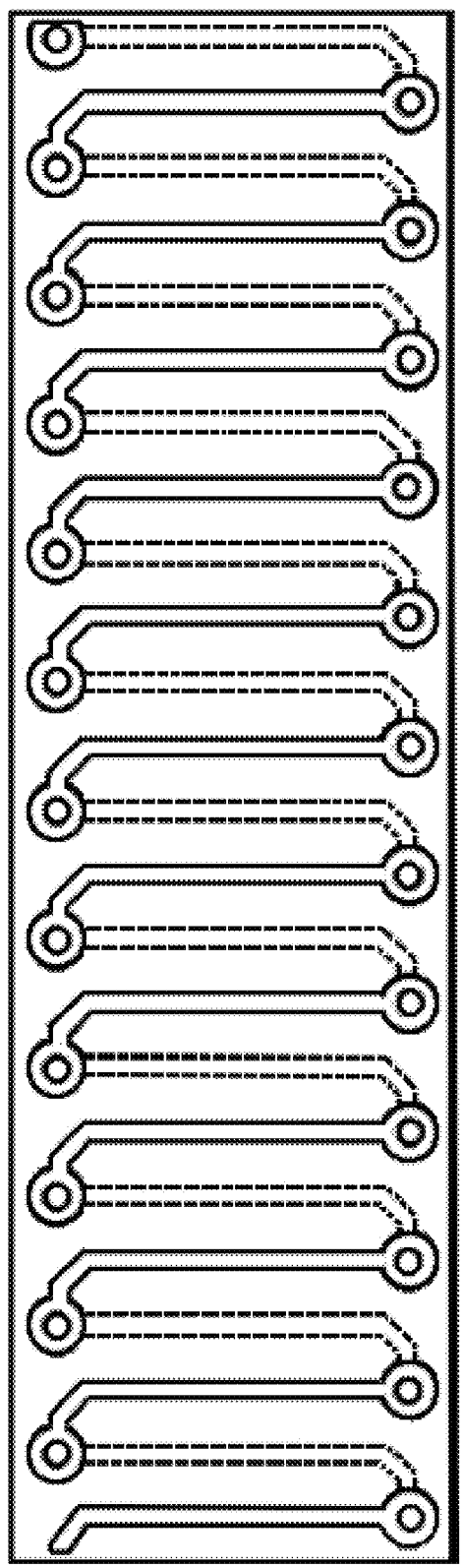
FIG. 19 illustrates a straight pattern for the antenna structure.
Figure 20:
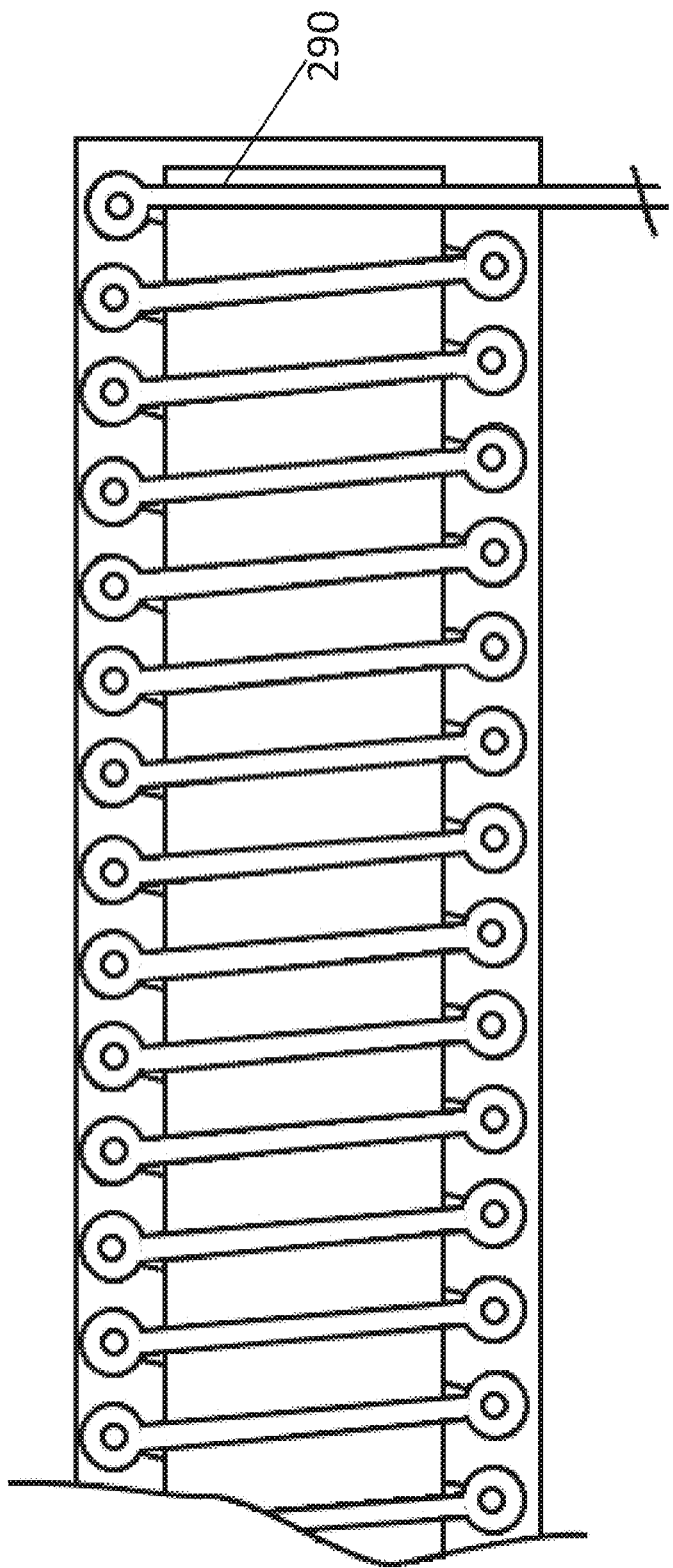
FIG. 20 illustrates a zig zag structure with core material embedded within the layers.

FIG. 17 illustrates a side view of the core layers 280 and 282 embedded within the substrate 255. The pattern and spacing of the traces has a direct effect on the quality of the signal that is emitted from an antenna. The traces according to this embodiment may be configured in a number of different ways, including but not limited to a diagonal "zig-zag" pattern as shown in FIG. 18 and/or a straight method shown in FIG. 19, as non-limiting examples. FIG. 20 illustrates a zig-zag trace pattern around a core material 290, which may be formed using a PCB manufacturing process.

Figure 21:
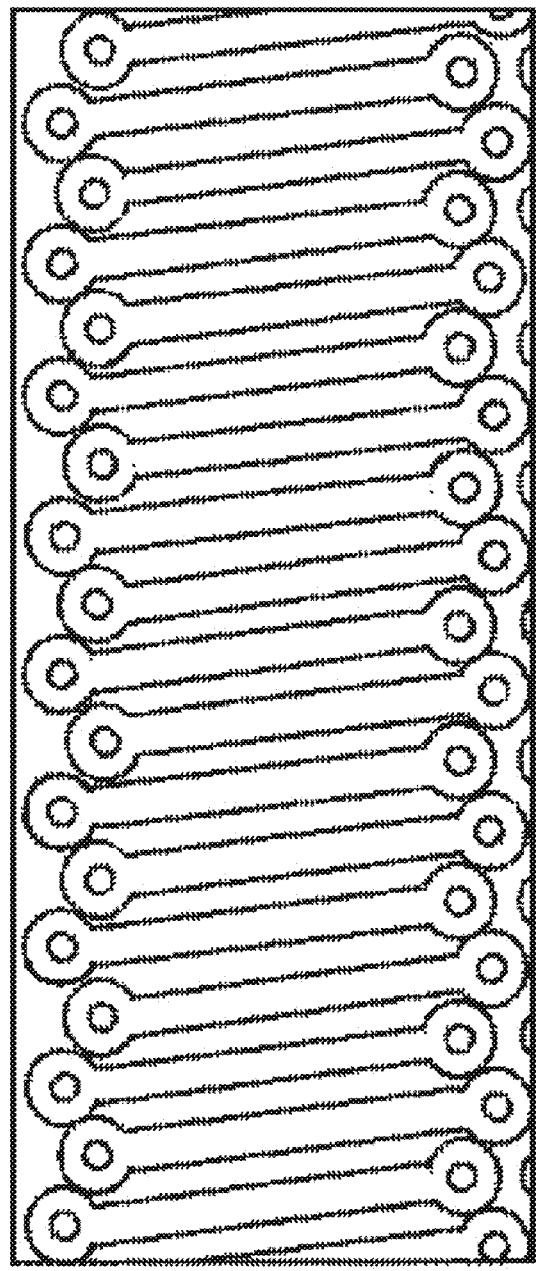
FIG. 21 illustrates an offset antenna design to increase the number of windings.

Other patterns that optimize the transmission and reception of RF frequencies as well as electromagnet pulses include the pattern shown in FIG. 21. Likewise, the connections between the traces that penetrate the layers surrounding the core may be minimized and the location of the connections may be offset to increase the number of windings using a "cross-stitch method". A cross-stitch orientation alternates the placement of the connections and length of each trace as shown in FIG. 21. Increasing the number of windings not only increases transmitted power, but it also increases resistance thereby reducing power consumption to yield a larger EMF while also providing greater latitude in "tuning" the antenna structure for a specific resonant frequency. Under this embodiment, multi-purpose antennas are designed for specific frequencies within a smaller size by calculating the optimum number of turns for a given core dimension and bit rate and/or frequency of transmission. Thus, any antenna may be optimized for a specific size, frequency, bit rate, bit width and power consumption by controlling the number of turns and core characteristics.

Printing the Core

The method of inserting core materials within a printed circuit may vary, but include non-limiting methods to insert the materials within a cavity on an inner layer with vias on either side, and applying a top and bottom later of traces to connect the vias. Other methods etch and/or cut away the inner core layers and/or top and bottom antenna patterns. Other methods build up layers around the core material utilizing 3D printing techniques. In some embodiments, both the core and the windings may be printed on to common substrate materials such as FR4 and/or polyimide (also known as FPC or "flex"). Printing the core may be achieved with materials such as but not limited to nano-ink or powder, which contain nano-particles that exhibit the high permeability desired for both data and energy transfer applications.

Making the Antenna "Tunable"

In some embodiments, the wire may be insulated and wrapped around one or more layers of the core material in a manner that optimizes for specific resonant frequencies such as but not limited to 13.56 MHz (NFC), 2.45 GHz (BLE), WiFi or other RFID and/or RF frequencies as shown with three spiral antenna structures, each tuned to different resonant frequencies.

Figure 22:
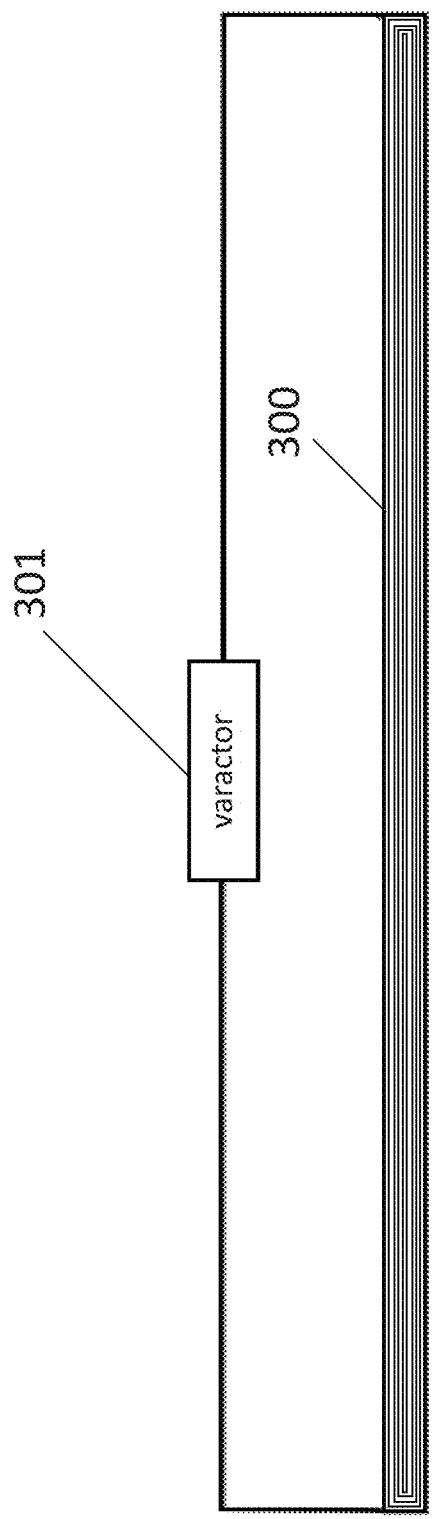
FIG. 22 illustrates a "tunable" multi-purpose antenna using a varactor as a non-limiting example.

In other embodiments, the antenna is turned from passive structure to an active "tunable" structure by adding passive devices such as but not limited to variable capacitors and/or active components that enable the antenna to be tuned to different frequencies, changing the overall characteristics of the structure to optimize to specific frequencies in real-time as illustrated in FIG. 22, illustrating an antenna 300 and a varactor 301.

Wide Band Dynamically Tuned Antennas Through the Use of Varactor Diodes

Antennas used for transmission of magnetic stripe data may also be used for transmission and reception of typical radio frequency signals. Under this embodiment, varactor diodes (also called varicap or tuning diodes) may be implemented within the antenna structure to electrically control the characteristics of the antenna determining its resonant frequency. Varactor diodes act as variable capacitors when the reverse voltage across the device is varied. In this way, the capacitor can act as a switch or as a tuning capacitor. Voltage and/or current injected into the antenna structure controls the varicap diode. Each antenna structure may have a combination of series or parallel varactor diodes, depending on the antenna topology used. Depending where the varicap diode or similar tuning device is located within the antenna, it can control the antenna resonant frequency as well as support input matching.

Limitations of Coils and Inductors for Use with Magnetic Stripes

Efficiency of the antenna to support RF and/or magnetic wake-up, communications applications and/or energy transfer applications requires a balanced multi-purpose antenna structure with a good clean response. For electromagnet transmission or magnetic stripe emulator particularly, previous prior art references that depend on a coil or inductor may exhibit challenges that include power consumption and extra circuitry required to receive information from another device, as well as extra circuitry to amplify or "drive" the coil or inductor at sufficient enough power to emit an electromagnetic field (EMF) with enough magnitude and flux quality for a magnetic card reader to receive the magnetic signal. A limiting factor for such implementations is that power must be increased in order to increase the output power of the transmission from a coil. Increasing power consumption to overcome gaps in EMF coverage is counterproductive, since this approach may overdrive the close-proximity reader, not to mention the increased power consumption by the device. Other issues with these approaches that still can affect performance include variability in flux magnitude, polarity, signal quality, bit rate and bit width. These and other issues may require more active components, such as active drivers or components, to receive the information from another device, and amplify and shape the EMF.

Antenna Optimization Techniques

This multi-purpose antenna invention resolves these and other issues for a magnetic stripe transmission function in a variety of ways including but not limited to utilizing core material with higher permeability, increasing the area of the core, increasing the number of turns, as previously discussed, making the turns tighter, and software techniques that alleviate the need for a separate driver described collectively hereafter as "antenna optimization techniques".

Figure 23:
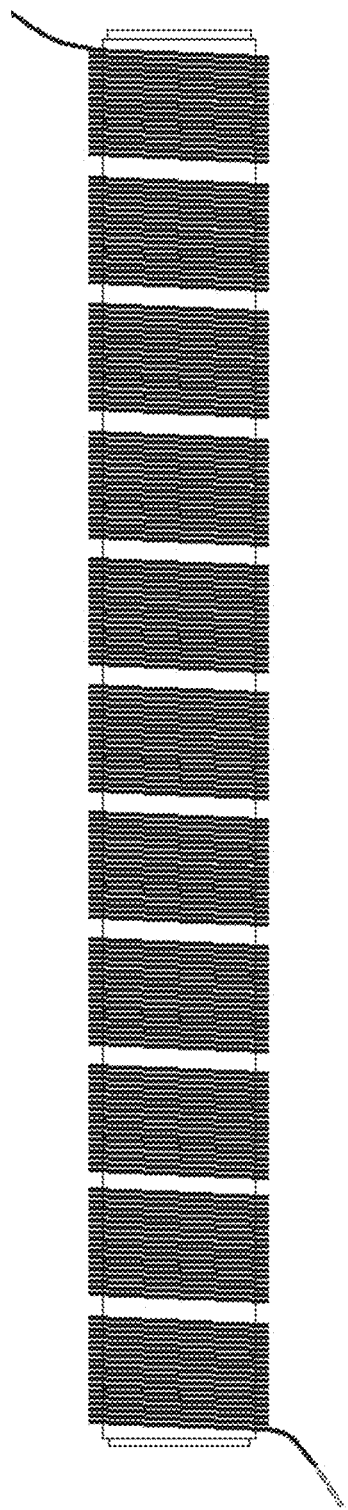
FIG. 23 illustrates an example of an accordion antenna

Uniformity of the magnitude of the flux across the antenna is dependent upon a number of factors including but not limited to controlling tolerances for spacing between layers of the core, and the core and winding during manufacture of the antenna. One solution to reducing the effects of variations or "gaps" in amplitude across the antenna is to tightly control the spacing between the layers of the core, and the spacing of the core to the windings as shown in FIG. 23. In other embodiments, gaps are achieved by tightly controlling the windings using the aforementioned printed circuit board (PCB) techniques.

Higher Amplitude at the Ends of the Antenna=Directional Wireless

Figure 24:
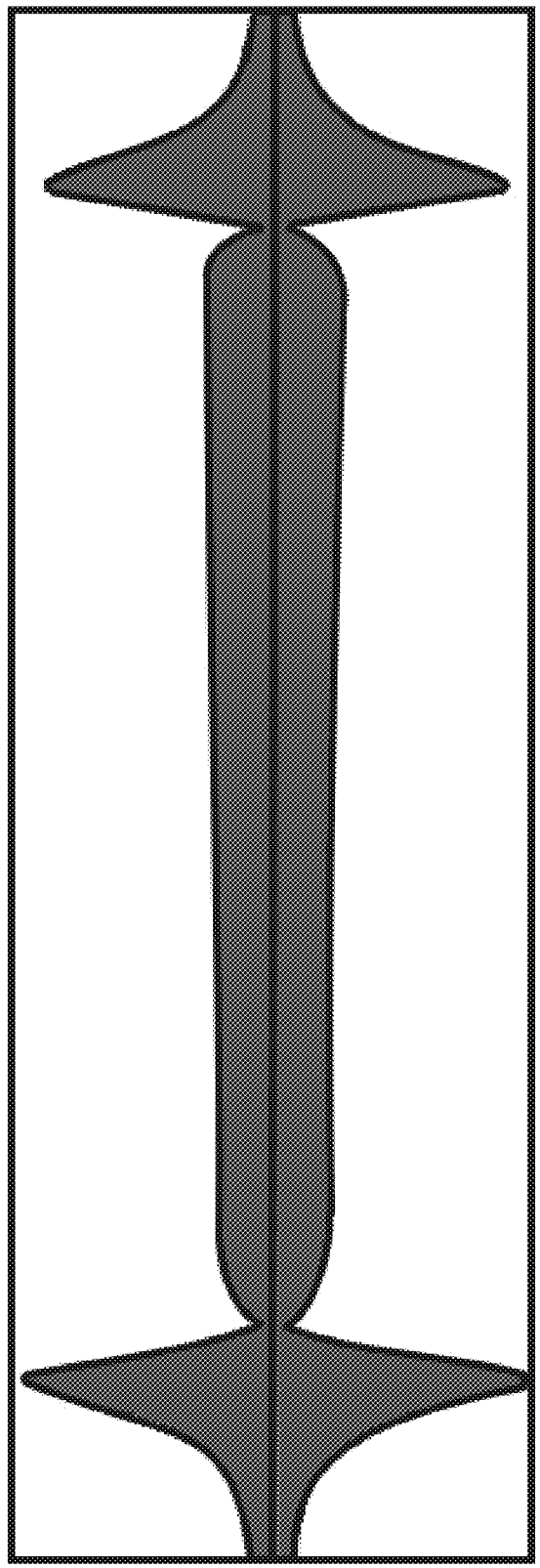
FIG. 24 illustrates an example of a waveform with higher amplitude or "horns" at the ends of the antenna structure.

The wire wound and PCB antenna structures described herein provides larger amplitude at the ends of the antenna than along the middle of the antenna as shown in the signal plot of FIG. 24. These larger "horns" may be controlled within the design of the antenna structure to provide balanced amplitude across the area of the antenna that is large enough to be received by the heads on a magnetic stripe card reader without inserting the antenna within the slot in the reader. Thus, directing the multi-purpose antenna structures described herein achieves wireless transmission of magnetic stripe data at lower power consumption and variable miniature form factors. This method of transmitting data over a multiple purpose antenna is called "wireless magnetic stripe" or simply "Wi-Mag" hereafter.

Dual Use

Varying the power of the transmission over the antenna enables dual use, where the antenna structure may be used to perform traditional swipes within a traditional magnetic stripe card reader, but also wireless transmission where a signal from an antenna external to the magnetic card reader may be received from a transmission from a multi-purpose antenna. Furthermore, the nature of the multi-purpose antenna structure is such that the EMF can be somewhat directed by orientating the antenna to maximize readability by the magnetic stripe card reader in the direction of the EMV, not transmitting over a larger area, in hopes that the reader might pick up the signal. This method of varying the power of the transmission to achieve traditional and wireless magnetic stripes is called "multi-use wireless magnetic stripe" hereafter. Other parameters described herein may also be dynamic, such as but not limited to power, which enables the antenna structure to transmit at an appropriate power when placed into a card reader slot, as well as transmission during swiping or wireless transmission where the card reader receives the signal from a transmission external to the reader. These dynamic parameters such as power further enhance the performance of the wireless magnetic stripe embodiments.

Accordion or Segmented Antenna

Figure 26A:
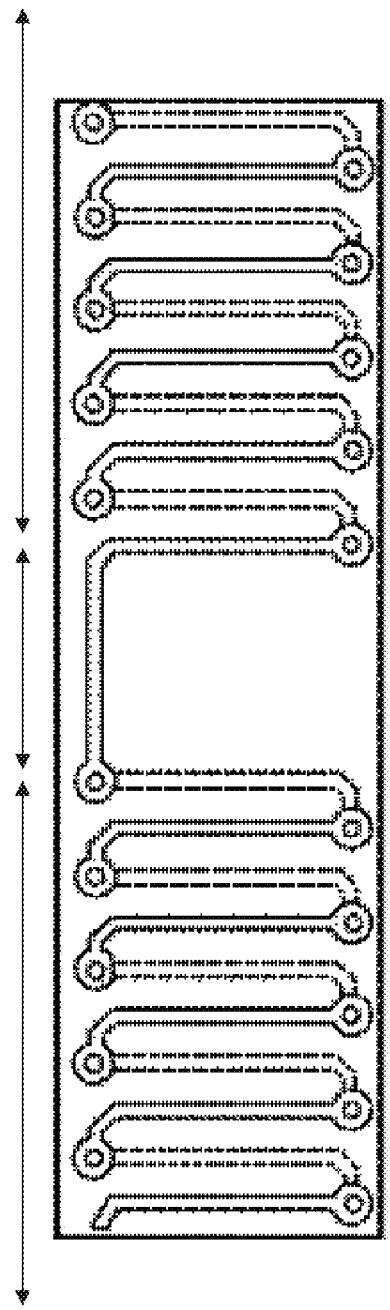
FIGS. 26A and 26B illustrate two views of an accordion antenna structure with a straight pattern and gaps between sections of windings.
Figure 26B:
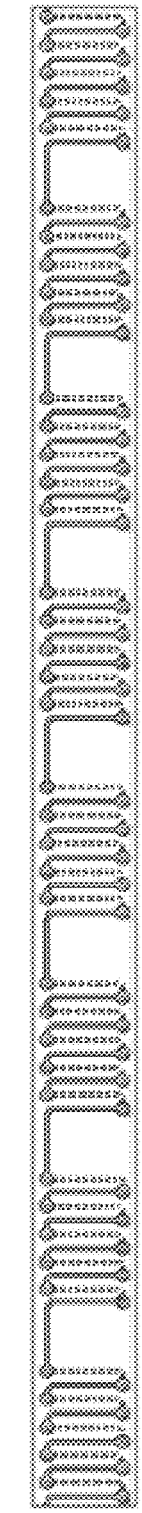

In another embodiment, the antenna is broken up into sections of windings that create "gaps" in spacing between groups of windings as shown with a "zig zag" winding pattern in FIG. 25A and the close-up view of FIG. 25B, and a straight winding pattern in FIG. 26A and the close-up view of FIG. 26B. Under these embodiments, the gaps in EMF across the entire antenna structure are effectively reduced and consistency is improved by increasing the amplitude at the ends of each of the groups of windings.

Figure 27:
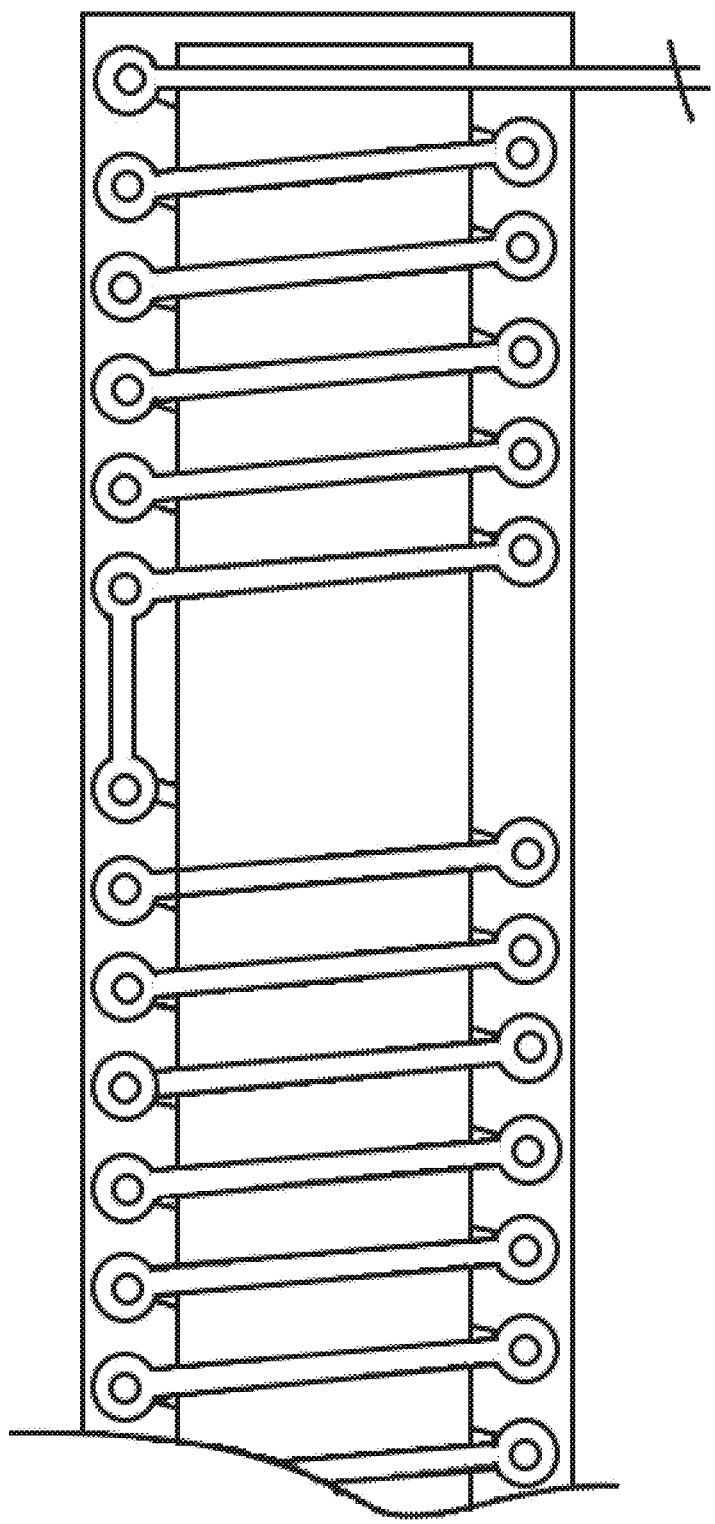
FIG. 27 illustrates an accordion antenna structure with a core.

Another embodiment of this antenna structure is illustrated in FIG. 27, with one or more continuous layers of permeable material acting as a core. This technique of segmenting the antenna into groups of windings that are connected with a continuous conductor is referenced as the "accordion antenna" hereafter.

Accordion Antenna Defined

An accordion antenna, outlined herein under this embodiment, consists of a contiguous antenna core of one or more layers of permeable material with gaps in groups of windings strategically placed along the length of the antenna structure. Each section of the antenna emits its own EMF at higher amplitude than an antenna having continuous spacing between windings, while also achieving a larger EMF across the entire length of a core. Since the entire accordion antenna is a continuous structure, current is balanced across the entire structure, providing magnetic fields that are additive, complimentary and in phase in the desired direction.

Figure 28:
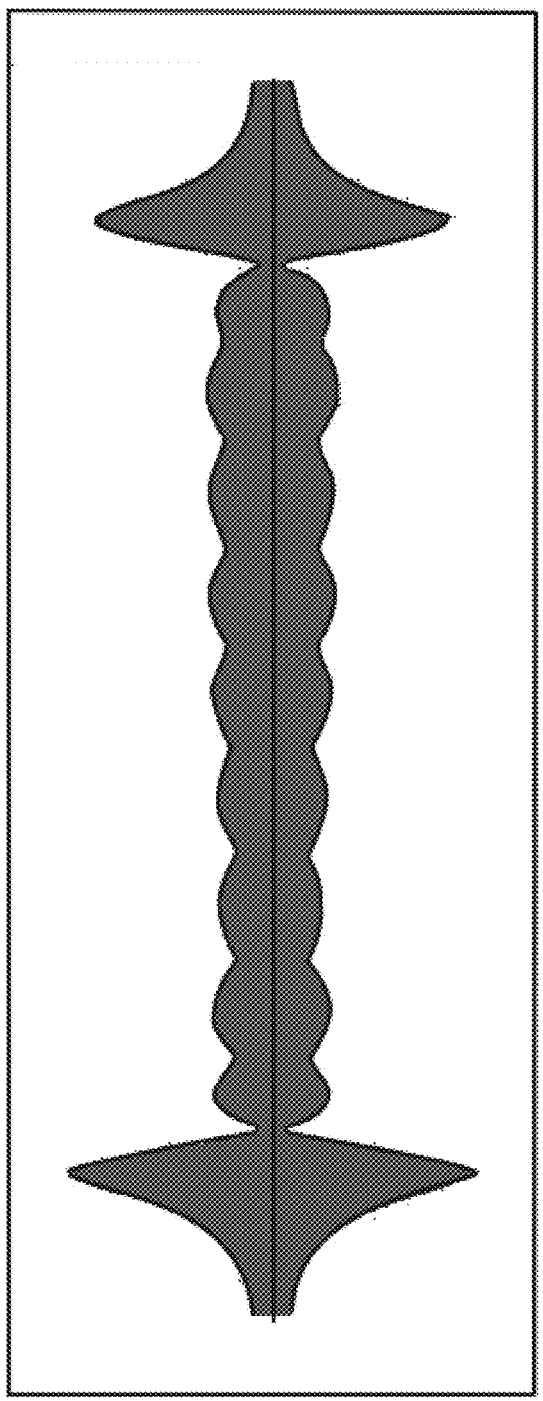
FIG. 28 illustrates the wavy pattern of the balanced EMF (electromagnetic field) generated by an accordion antenna structure.

Thus, this method provides a consistent magnetic field, albeit a wavy antenna pattern as shown in FIG. 28, over the entire antenna with less power consumption while also enabling wireless magnetic stripe over any location of the antenna structure. In one embodiment the gaps are about 0.1 to 2.5 mm with segments of about 5 to 40 turns.

"Horn" Phenomenon

The aforementioned "horns" at the end of the wire wound antenna structure provide not only unique high amplitude, but also very clean signal. These spikes in flux amplitude occur in free space off the ends of the antenna, where no core is present.

Although they exhibit higher amplitude at these locations at the ends of the antenna, another phenomenon specific to these "horns" is that they do not bleed over or "cross talk" to adjacent tracks. One approach is to increase the number of "horns" across the antenna by segmenting the core.

Segmented Antenna Structure—Segmented Core

Figure 29:
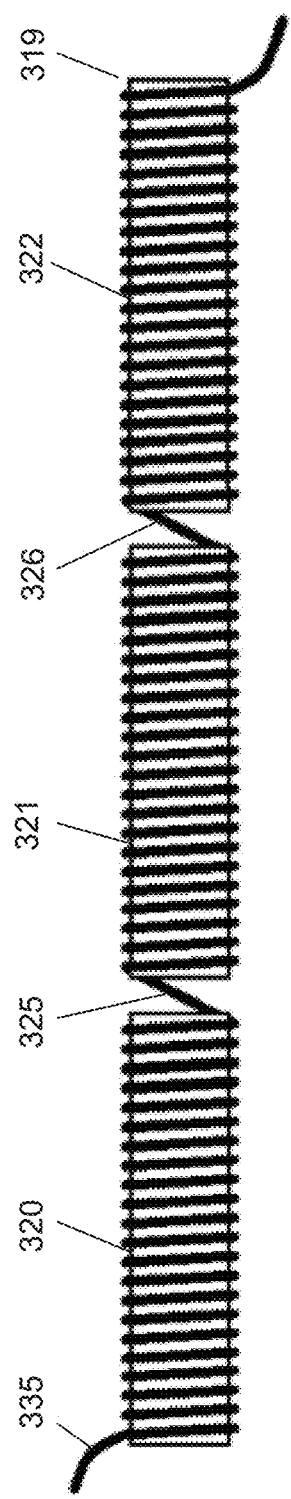
FIG. 29 illustrates a non-limiting example of a segmented antenna structure.
Figure 30:
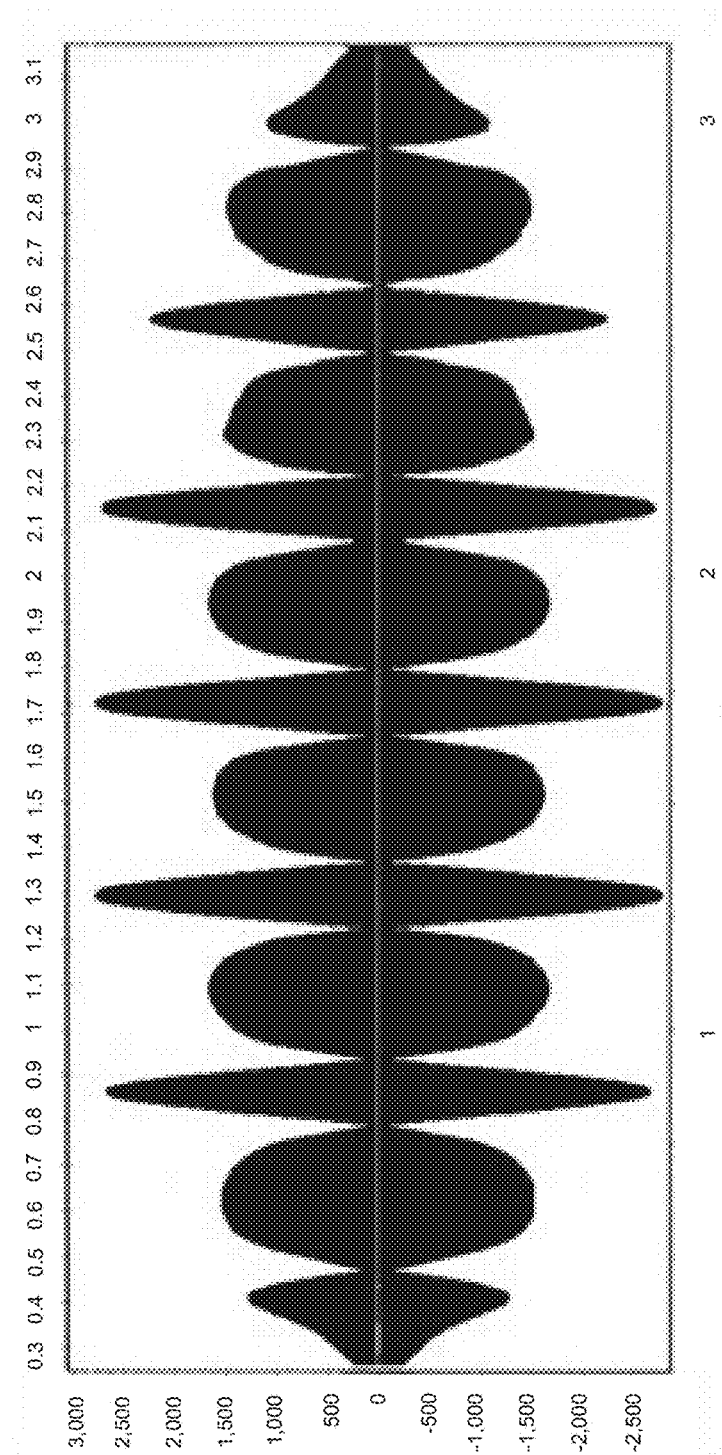
FIG. 30 illustrates the pattern of the EMF from a segmented antenna structure.

A variation of the accordion antenna 319 is to segment the core (segments 320, 321 and 322) with gaps 325 and 326 between core segments, while keeping the segmented windings 330 continuous across the antenna as shown in FIG. 29. A winding 335 is continuous across the segments. This "segmented antenna structure" increases the amplitude and flux density of the "horns" at more locations across the entire antenna where the gaps are located, and provides extremely clean signal to noise (SNR) ratio albeit varied as shown in the field plot FIG. 30.

One disadvantage of this segmented antenna structure is that adjacent field horns are out of phase with one another, causing challenges with a swipe configuration. However, this antenna works well with wireless and new "no swipe magnetic stripe" configurations, where the card is left stationary in the middle of the reader rather than swiped. Multi-purpose antenna structures with segmented cores are referenced as "segmented antennas" hereafter.

Variations and Other Antenna Structures

Figure 31:
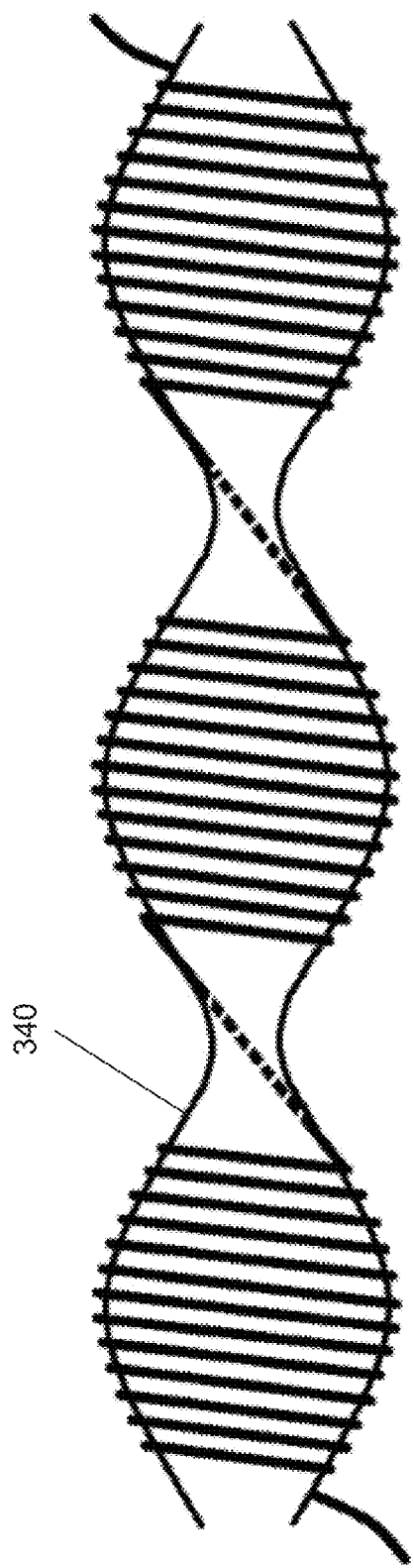
FIG. 31 illustrates an example of a unique core pattern, in this case a wavy or "worm" design.

Another variation of the accordion antenna is to utilize a different shape of a core 340 as shown in FIG. 31. This embodiment consists of a core with a variable width that varies from wide to narrow sections of the core. The shape of the core is non-limiting to this invention. Some windings are disposed at the wider areas, while others are at narrower areas achieving a "varying width antenna" structure.

Multi-Band Antenna Features

An advantage of each of the multi-purpose antenna structures described herein is that they may receive signals based on the overall length of the structure as well as transmit electromagnetic energy. For the application of dynamic magnetic stripe cards, multiple antennas may be utilized to transmit multiple tracks of data, one for each of the three tracks on a typical magnetic stripe as shown in FIG. 32.

Three separate antennas for three separate magnetic stripe tracks introduce another embodiment where each antenna can be optimized to a specific resonant frequency. As a non-limiting example, as shown in FIG. 32, antenna A1 305 may be optimized for NFC tuned to a resonate frequency of 13.56 MHz, while antenna A2 306 may be optimized for Bluetooth tuned to a resonant frequency of 2.4 GHz or antenna A3 307 tuned to another resonant frequency for RFID (120 and 150 kHz or 865 to 928 MHz, as non-limiting examples). This enables each antenna to transmit magnetic fields for communication with magnetic card readers, while in another configuration allowing each antenna to transmit and receive data over RF frequencies specific to the optimization of each antenna, forming a "multi-band antenna system."

Variable Length Antenna Structure

Figure 32:
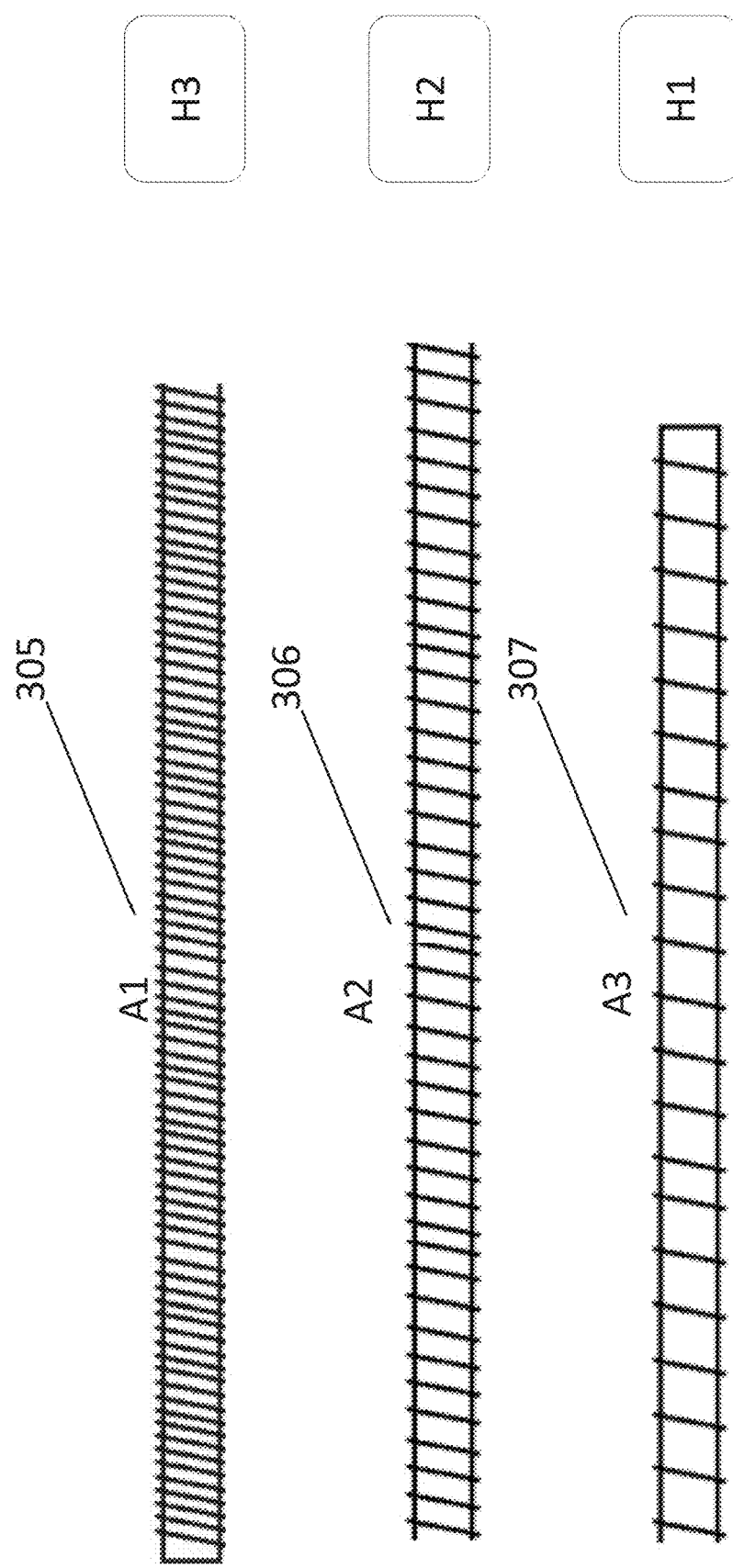
FIG. 32 illustrates three antennas aligned with 3 read heads of a magnetic stripe reader for transmitting magnetic fields, wherein each antenna is also tuned for a specific resonant radio frequency.

Likewise, it may be possible, in some embodiments, to group windings to a specific length in order to optimize the resonant frequency of a section or entire length of antenna to a specific wavelength as shown in FIG. 32. Varying the length of the multi-purpose antenna also enables various other features. For instance, the length and number of turns of a section or the antenna as a whole may be specific to a resonant frequency to optimize that antenna or that section for a specific purpose.

Figure 33:
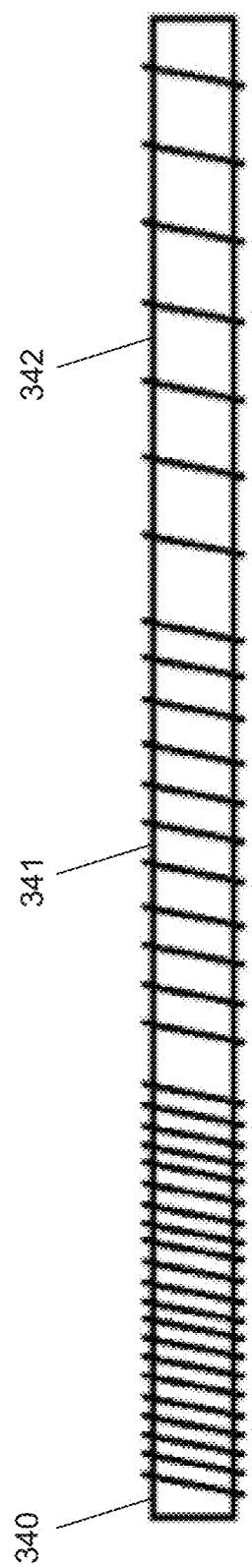
FIG. 33 illustrates a single antenna is optimized to more than one frequency.

Likewise, one or more other antenna elements might be specified to another resonant frequency so that a single antenna is optimized to more than one frequency as shown in FIG. 33 where three antenna segments 340, 341 and 342 have different winding spacing.

In yet another embodiment, multiple structures may work together to support multiple RF frequencies as well as multiple tracks of a magnetic stripe transmitter that conform to the three tracks with spacing that support the ISO standards for magnetic stripe cards.

Multiband, Multi-Tap Accordion

Another embodiment of this invention utilizes a variation of the accordion antenna where one or more sections of the antenna may have entirely separate taps. In this embodiment, the taps or wires of separate sections of the antenna connect to different circuits and thus each segment operates as the radiator for the circuit to which it is connected. The number of windings is governed by the function of that section. For instance, a non-limiting example might have one section of the antenna connected to NFC circuitry while another section of the antenna is used for magnetic transmission. NFC antennas may require different electrical characteristics than other antennas. This is resolved by controlling the number of turns for specific antenna elements. Under this embodiment, a common core is shared between two or more antenna elements.

Figure 34:
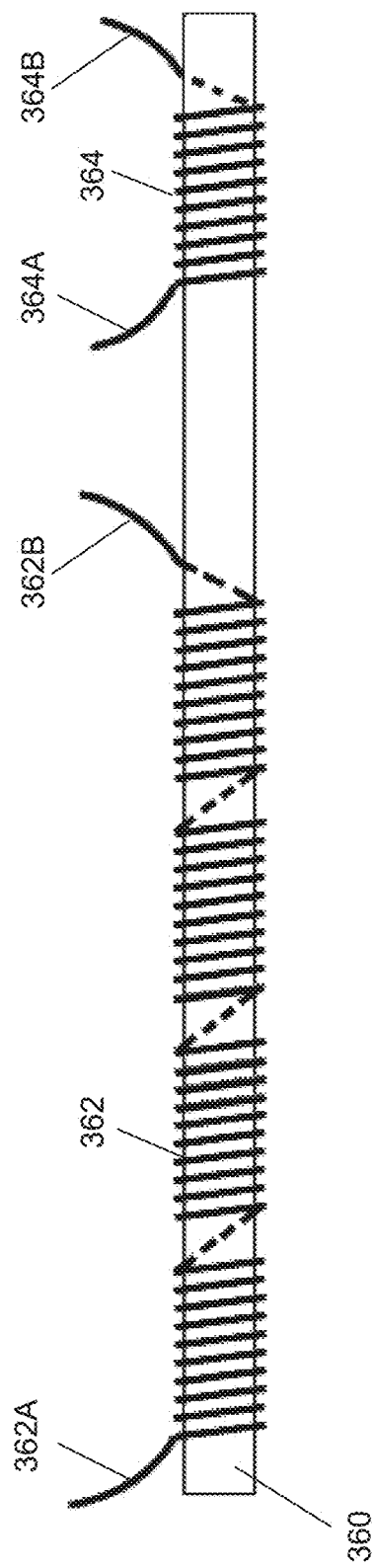
FIG. 34 illustrates common core is shared between two or more antenna elements with multiple taps on the same antenna structure.

FIG. 34 illustrates one such embodiment having a common core 360 and distinct and separated winding segments 362 (with winding taps 362A and 362B) and 364 (with winding taps 364A and 364B). In other embodiments the core may also be segmented.

Under these "multi-tap antenna" embodiments, sections remain part of the same overall antenna structure to reduce size and cost. This method of combining multiple purposes by using multiple taps on the same antenna structure is referenced as "multi-tap antennas" hereafter.

Round or Rectangular Antenna

In one embodiment, the antenna is a round or rectangular shape with windings all a single plane, but with a core of permeable material in a separate plane as a backing. Cores may consist of metals and/or alloys that are annealed or amorphous including such as but not limited to iron, ferrite, or nickel, or nanomaterials such as but not limited to nanocrystalline, powder or ink, or other materials or combinations of materials that provide high permeability with sharp DC hysteresis loop.

Applications Due to Three Track and Thinness

In one embodiment, the antenna or antenna module is of sufficiently thin dimensions to fit within a card that conforms to ISO (International Standards Organization) standards for enabling functions such as non-limiting examples of payment cards, loyalty cards, identity cards and the like. One or more antennas or antenna modules are located within the card dimensionally such that the magnetic field engages at least one read head of a magnetic card reader as the card is inserted or swiped into the slot of the magnetic card reader.

In yet another embodiment, multiple antenna structures may work together to support multiple RF frequencies as well as multiple tracks of a magnetic transmitter that conform to the three tracks with spacing that support ISO standards for magnetic stripe cards.

Figure 35:
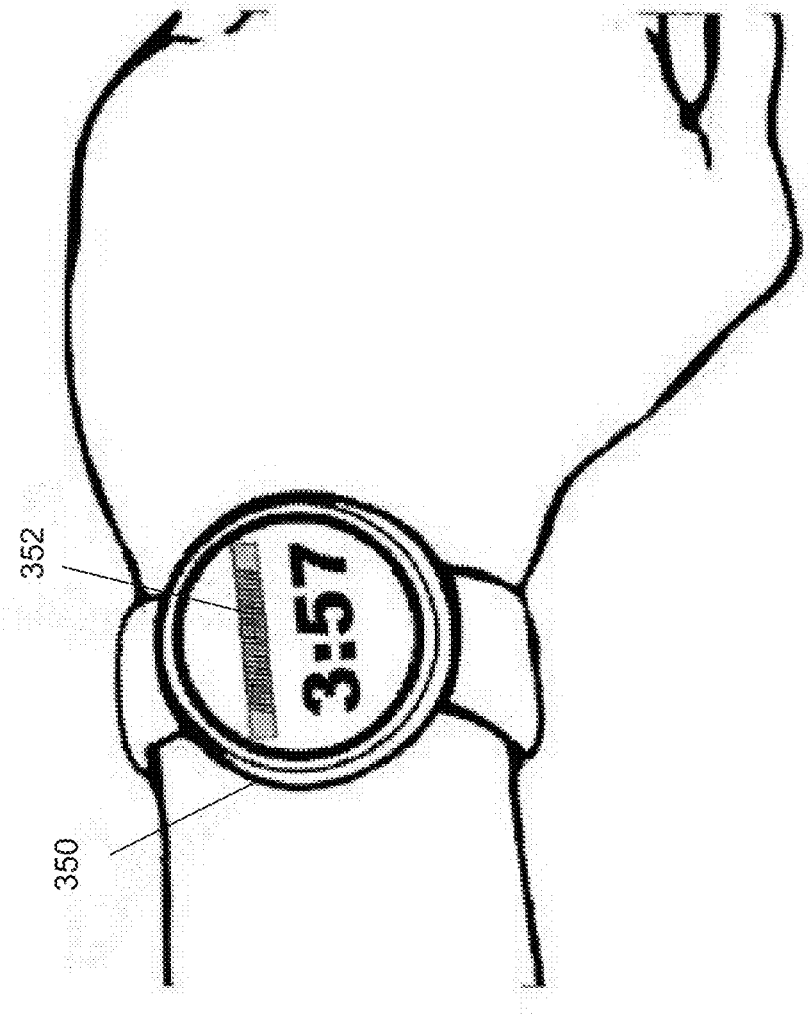
FIG. 35 illustrates a non-limiting example of a multi-purpose antenna within a wearable device.
Figure 36:
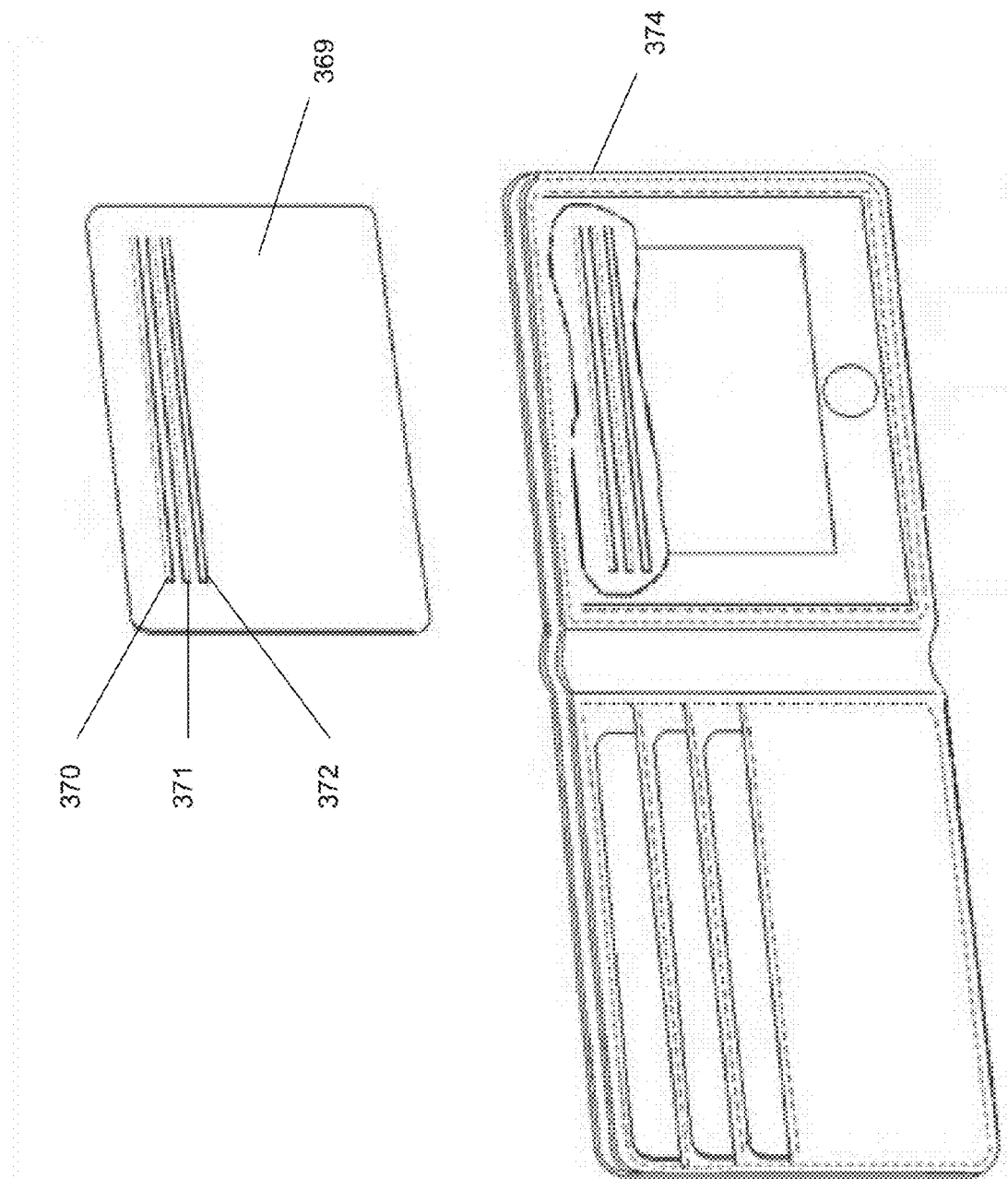
FIG. 36 illustrates an antenna in both a card and wearable smart wallet as non-limiting examples of the antenna used to communication and/or pass energy between devices.

In one embodiment, the antenna is small enough to be embedded into smaller electronics device such as but not limited to smart cards that swipe within a magnetic card reader. In other embodiments, the antenna is small enough to fit into mobile and wearable devices such as watches, watch bands, bands, bracelets, anklets, rings, necklaces, neck bands, ear rings, buttons or other wearable, mobile devices or the like. FIG. 35 illustrates a watch 350 with an antenna 352 disposed thereon. In yet other embodiments, the antenna may be embedded within both a card and a portable or wearable electronic device to perform any or all of the multiple functions between the card and device as shown in FIG. 36 wherein an antenna 369 (comprising three rows of coils 370, 371, and 372 is disposed in a wallet 374.

Super Thin Antennas Operation on Two Sides of a Card

The use of multi-purpose antennas enables the antennas to function on either side of a typical ISO standard card. Since in one embodiment the antenna pattern is elliptical about the length of the core of the antenna, it is advantageous to orient the multi-purpose antenna along an edge of a device in order to maximize the opportunity for the signal and/or pulses from the antenna to be received by close-proximity sensors.

Position of Antennas on a Card

Figure 37:
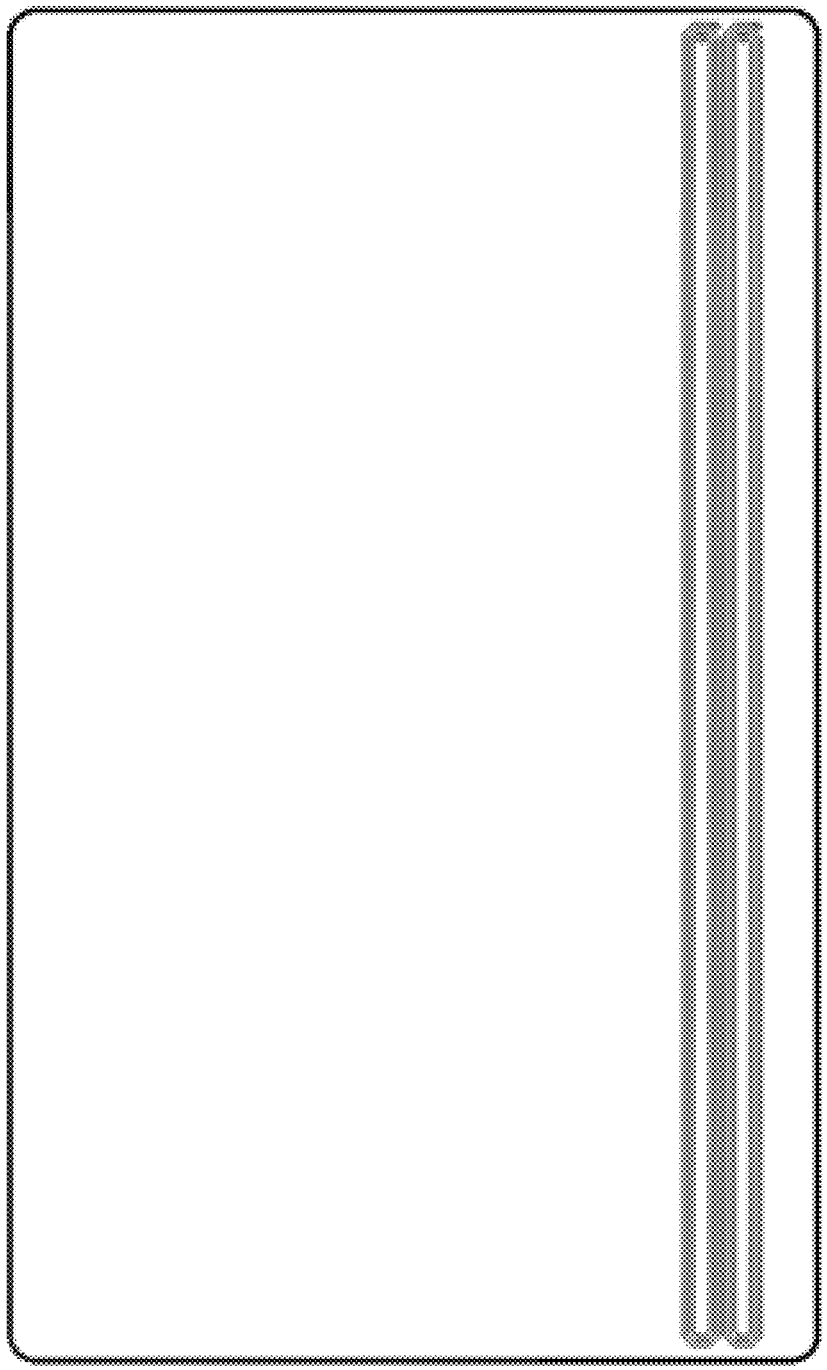
FIG. 37 illustrates two antennas positioned at the location of a magnetic stripe on a magnetic stripe card.
Figure 38:
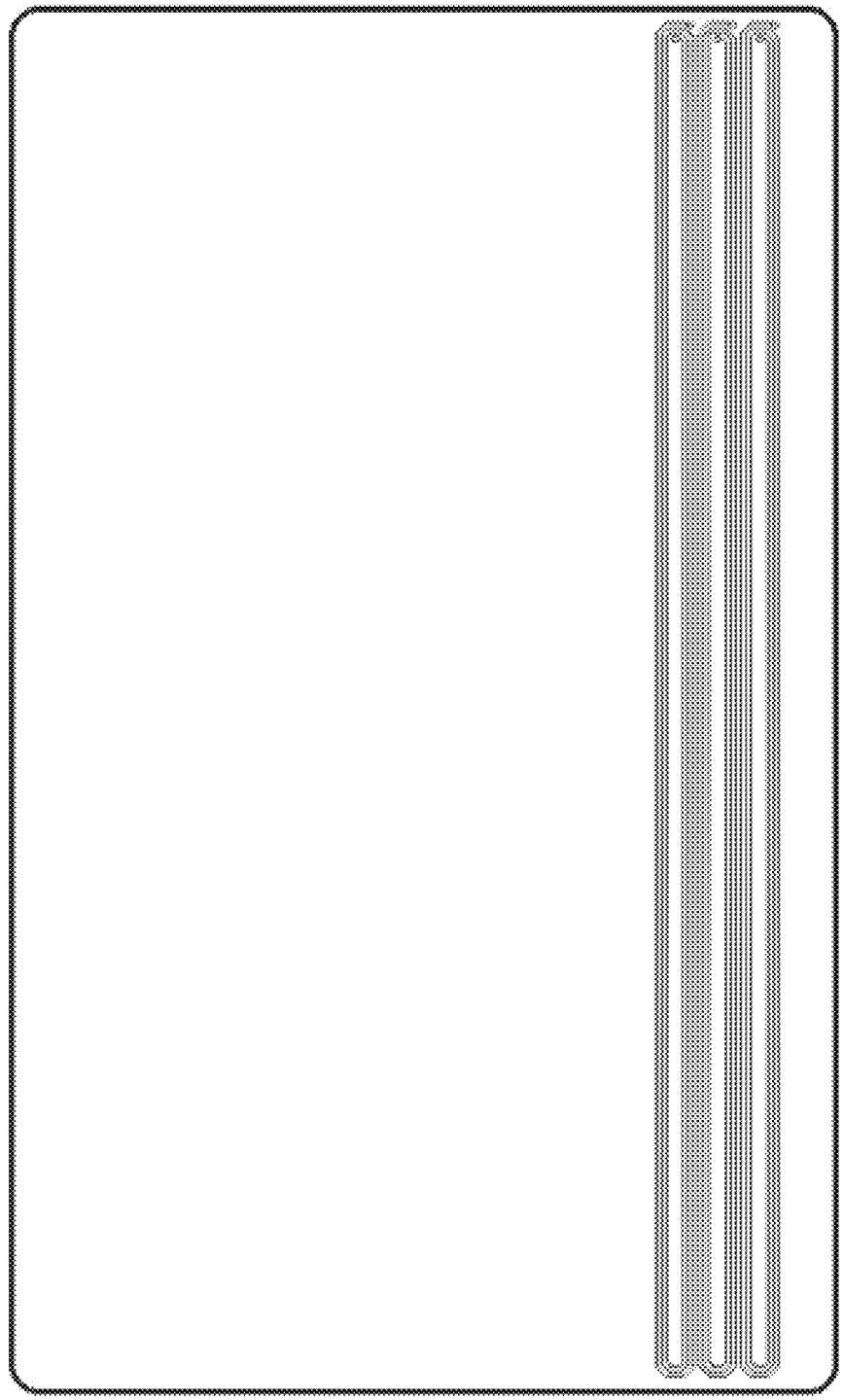
FIG. 38 illustrates three antennas positioned at the location of a magnetic stripe on a magnetic stripe card.
Figure 39:
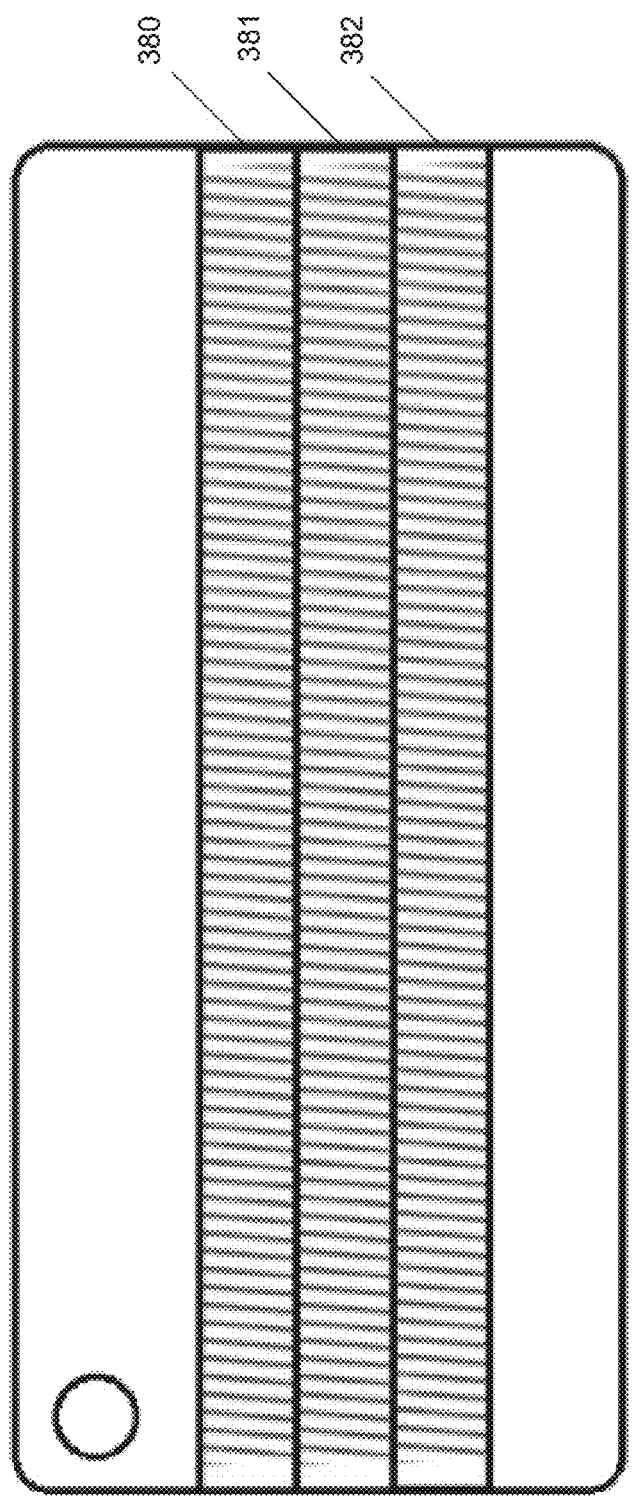
FIG. 39 illustrates a non-limiting example of one or more multi-purpose antennas located on a reward card.

In embodiments specific to magnetic stripe cards, the antenna may be installed at one or more track locations of a standard ISO compliant magnetic stripe as shown with two antenna elements in FIG. 37; and three antenna elements in FIG. 38. The same methodology of placement of the antennas also applies to smaller cards, such as loyalty, reward and/or other small cards that utilize magnetic stripe technology. FIG. 39 illustrates placement of radiators 380, 381, and 382 on a card having smaller length and width dimensions that other cards described herein.

Figure 40:
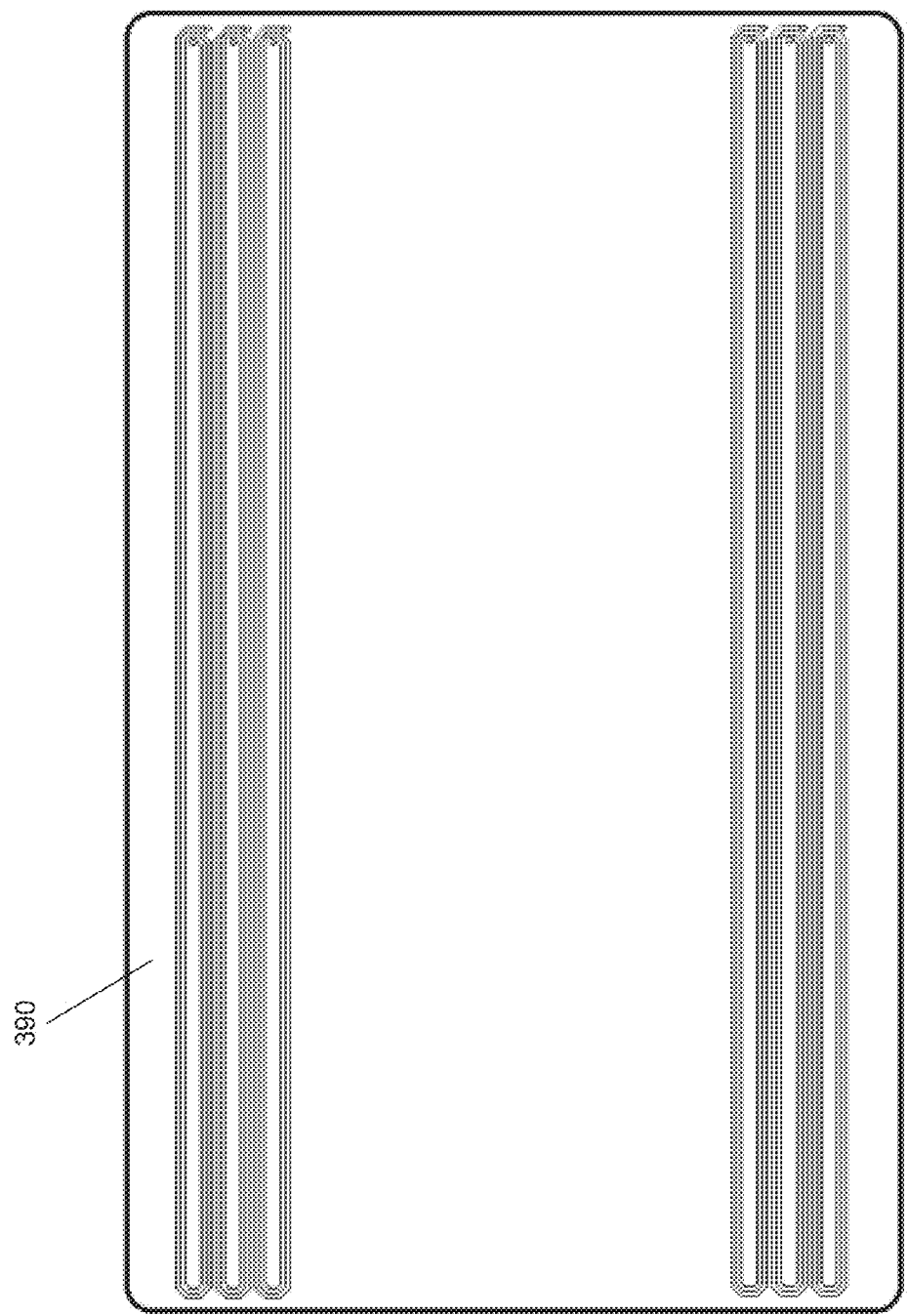
FIG. 40 illustrates multi-purpose antennas positioned at both the top and bottom of a powered card aligned where a magnetic stripe would be on magnetic stripe card.
Figure 41:
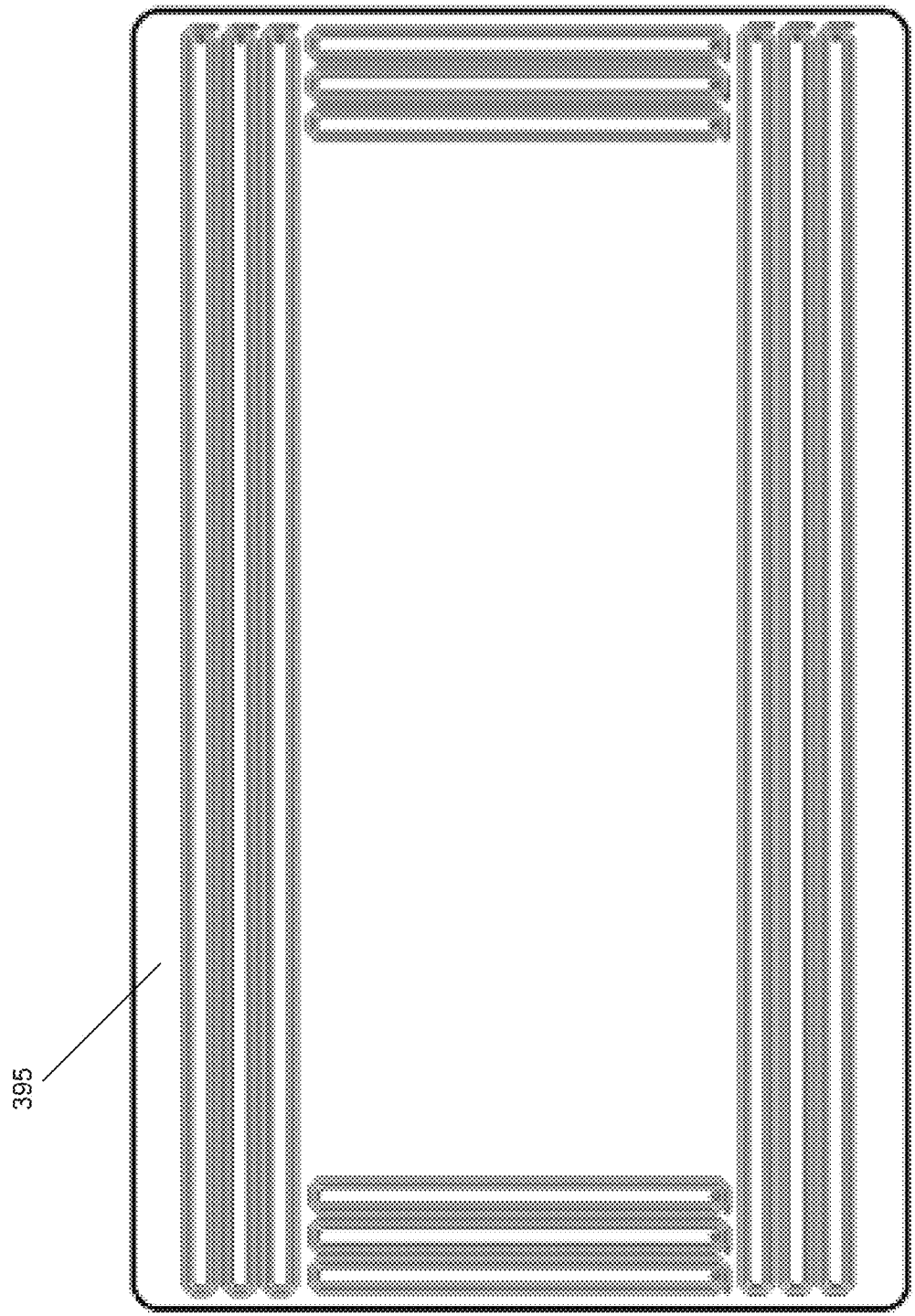
FIG. 41 illustrates multi-purpose antennas positioned at all sides of a powered card, top, bottom and sides.
Figure 42:
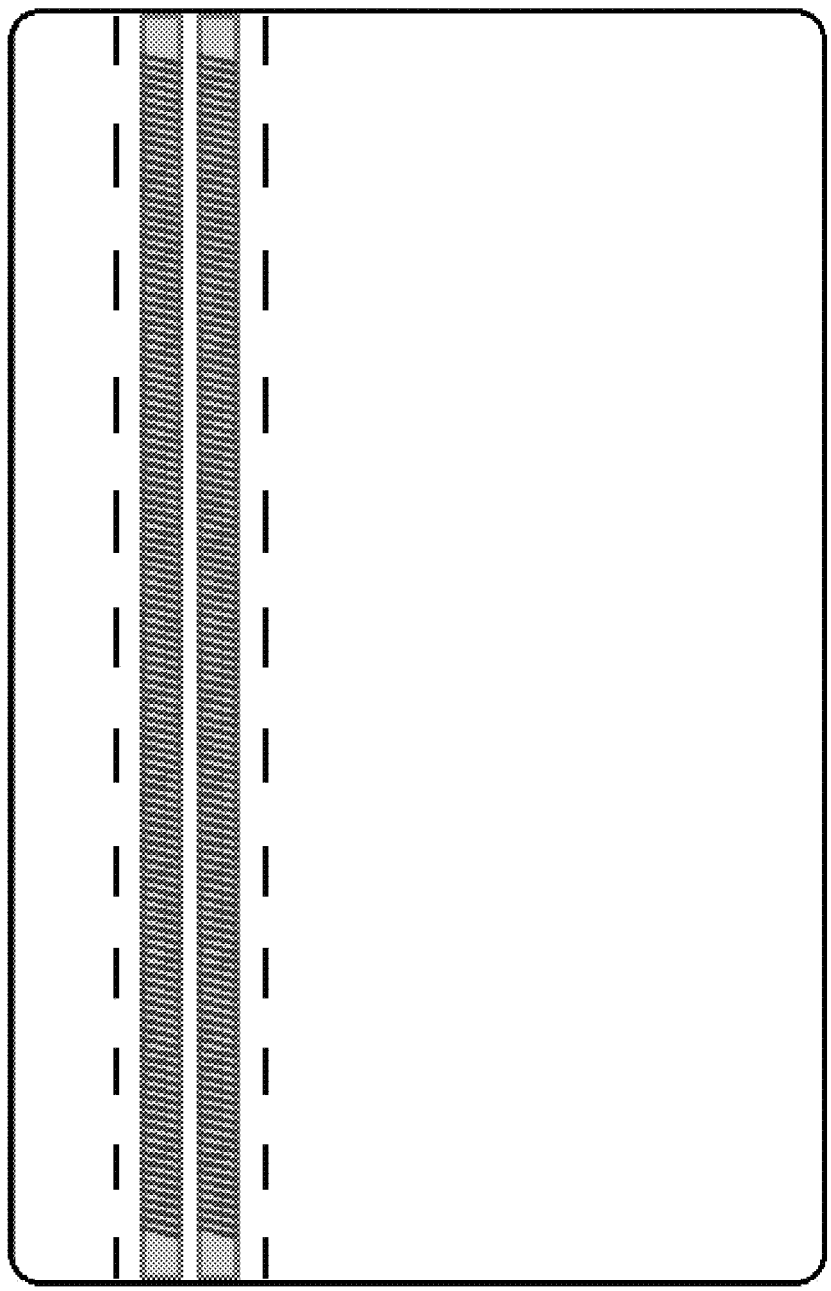
FIG. 42 illustrates one or more antennas positioned between the tracks of an ISO compliant magnetic stripe location on a powered card.

In yet another embodiment involving magnetic strip emulation, antennas are positioned at one or more tracks at both an upper and lower region of a card 390 as shown in FIG. 40. FIG. 41 illustrates radiators on one or more or all sides of a card 395. The card 395 can be swiped in any orientation while maintaining very low power consumption for close-proximity communications. Other card configurations include but are not limited to one or more antennas, such as illustrated in FIG. 42, that are placed between tracks or across portions of tracks such that the emitted EMF may be detected by one or both of the proximity readers.

Wireless Magnetic Stripe Transmission Method

Figure 43:
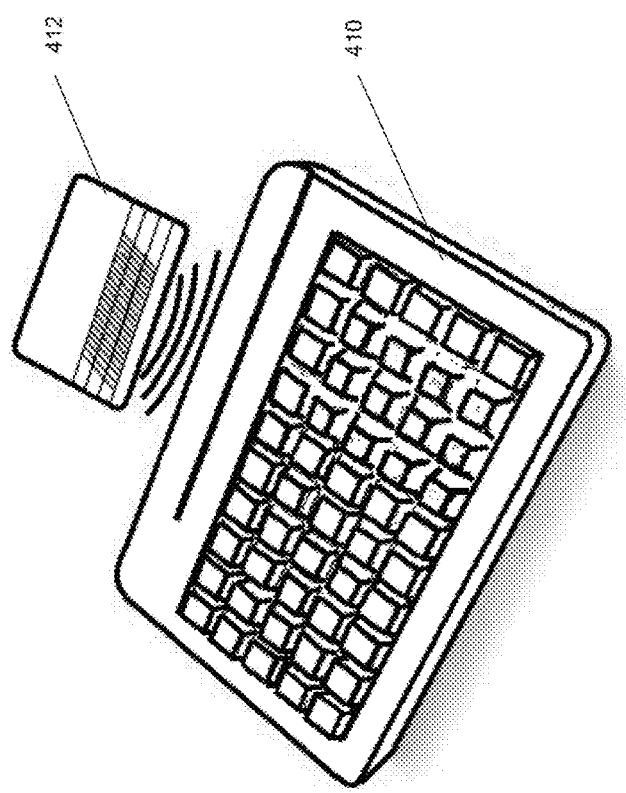
FIG. 43 illustrates the multi-purpose antenna enabling a wireless magnetic stripe transaction.

The multi-purpose antenna structures described herein are able to successfully transmit data within low-power consumption configurations. In fact, for certain low-power embodiments, the multi-purpose antenna radiates energy for a magnetic card reader in close-proximity to the antenna to receive the magnetic field wirelessly. See FIG. 43 where a reader 410 is responsive to a magnetic field propagated from a card 412.

In order to limit the broadcast of data in all directions (or confine the radiated energy to desired directions), potentially radiating the human user with the EMF, albeit at very low power levels, this invention controls the variability of the power to accommodate wireless transmission within a wide range of applications including wearables and mobile devices. Furthermore, the position and orientation of the antenna may be located such that the antenna pattern is directed toward an area of the device that will be pointed toward the read head of the magnetic card reader and away from the human user.

In some configurations, the longer edge of the antenna is parallel to the reader slot for receiving the card during the swiping action. See FIG. 43. This edge is of sufficient length so that the magnetic field transmitted from the antenna can wirelessly transmit information to the card reader, while still achieving low-power consumption.

Lower Duty Cycle Method for Reducing Antenna Power Consumption

To further reduce power consumption when the multipurpose antenna functions as an electromagnet, data can be transmitted to optimize efficiency without a noticeable drop in performance or transmission range. Traditional magnetic stripe data is encoded by alternating patterns of magnetic fields representing '0' or '1' bits of data. These alternating patterns of magnetic fields can be transmitted through the use of an antenna that can alternate the direction of an electro-magnetic field (EMF) electronically. Prior art consists of brute force techniques that continuously drive a coil or inductor in a continuous direction to "emulate" a desired magnetic field.

Under this invention, power consumption may be reduced by activating a multipurpose antenna to a point of saturation where the electromagnetic field (EMF) no longer increases in strength. At this point, the antenna may be disconnected from its circuitry until the next change or reversal of the electromagnetic field. When this change/reversal occurs, the antenna is re-connected to the circuitry until the antenna again reaches a saturated state. This feature of connecting the antenna with a lower duty cycle driving current, results in a significant reduction in current consumption while maintaining strong magnetic power from the antenna sufficient for the magnetic card reader to receive and process the signal from either swiping or insertion, or wireless transmission external from the transmitting device to the magnetic card reader.

"Driverless" by Connecting the Antenna Directly to the Microprocessor

Unlike other implementations that require active drivers and components to drive the antenna, the antenna or the antenna module, as appropriate, within this invention is entirely passive and as such, does not require active drivers or associated components for most applications since the power requirements of the antenna are minimal. In order to maximize power transfer to a magnetic card reader in close-proximity to the multiple purpose antenna, the magnetic card reader must be able to receive a change in magnetic field or "alternating polarity", which correlates with a change in current. Alternating polarity may be achieved on the antenna by switching one side of the antenna to a voltage, such as a battery voltage, in some embodiments.

Other embodiments of this invention require only ports or "GPIO" (general purpose input output) pins connected from the multi-purpose antenna to a microprocessor, or equivalent processing component as defined previously, further reducing complexity and size of the antenna module by alleviating the need for costly power consuming active components. In these embodiments, software within the microprocessor controls both sides or terminals of the antenna by connecting one or more GPIO to the antenna or antenna module differentially. To generate one polarity, one side of the antenna may be controlled as a source while setting the other side connected to GPIO as a sink, switching the source and sink GPIO ports to generate the other polarity.

Figure 44:
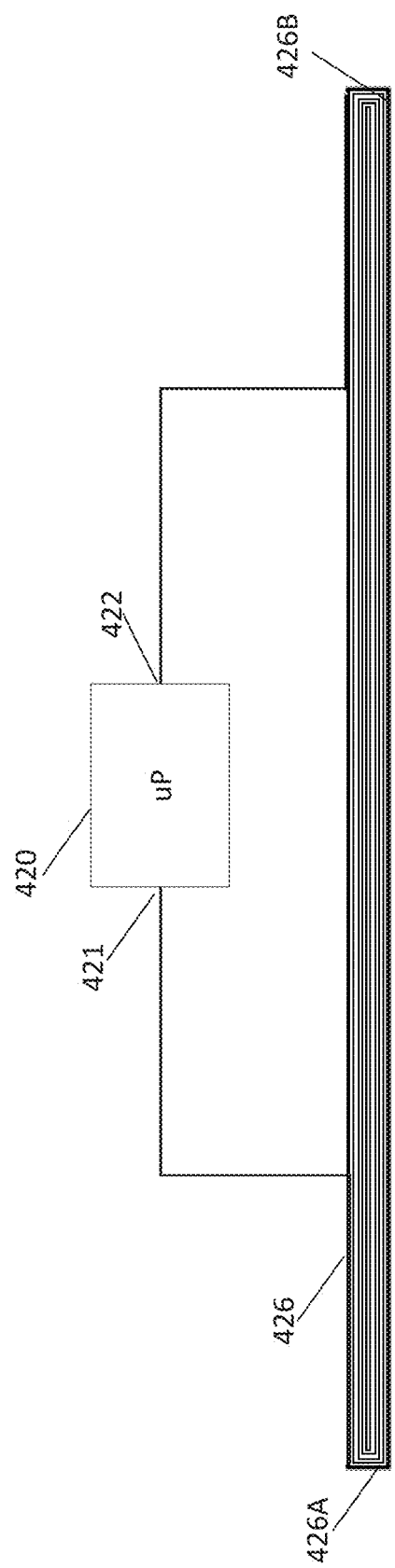
FIG. 44 illustrates a microprocessor (uP) connected differentially to a antenna.

FIG. 44 illustrates a microprocessor or processing component 420 having terminals 421 and 422 connected to opposing ends 426A and 426B of an antenna 426. This method of connecting the multi-purpose antenna differentially to GPIO pins on a microprocessor and switching the antenna by alternating source/sink on the GPIO pins following a push/pull approach is referred to as "driverless magnetic stripe transmission" hereafter.

Alternatively, other differential sources, in lieu of the microprocessor or processing component 420, may be used to generate alternating polarity signals for driving the multi-purpose antenna 426.

Improved Timing Control

Proper timing of the magnetic pulses is critical for a magnetic card reader to properly receive and interpret the magnetic data transmitted from an antenna. Variances in pulses or "bit jitter" are a common issue with magnetic stripe technology. Pre-calculating the bit stream prior to transmission from the antenna can more tightly control bit jitter. This pre-calculation method enables private information to be saved as bits or bit values within a table, rather than encoding or saving an actual card number, thereby increasing security and accuracy, as well as improving the timing and power required for a microprocessor to replicate a bit stream of the data from a magnetic stripe card. The precision of this "table driven magnetic stripe transmission" method is controlled by the speed and precision of the clock supporting the microprocessor.

Improved Dampening

Figure 45:
FIG. 45 illustrates dampening oscillations common with overshoot with electromagnets.

Like bit jitter, noise can also significantly affect the ability of a magnetic card reader to read magnetic stripe data generated from an antenna. Dampening oscillations are a frequent source of noise in electromagnets. As shown in the plot of FIG. 45, dampening oscillations are fluctuations in magnetic flux amplitude typically caused by overshoot or "rebound" as the antenna settles to a steady state after being charged and discharged. Since timing of the pulses may be controlled by a microprocessor controlling one or more GPIO pins in some embodiments, no external driver is required to control the timing. Under such embodiments, the antenna module may be balanced by matching the antenna and filtering the rise and fall time either external to the GPIO pins or within the microprocessor to ensure the structure is critically damped, not under-damped or over-damped.

Filtering

Figure 46:
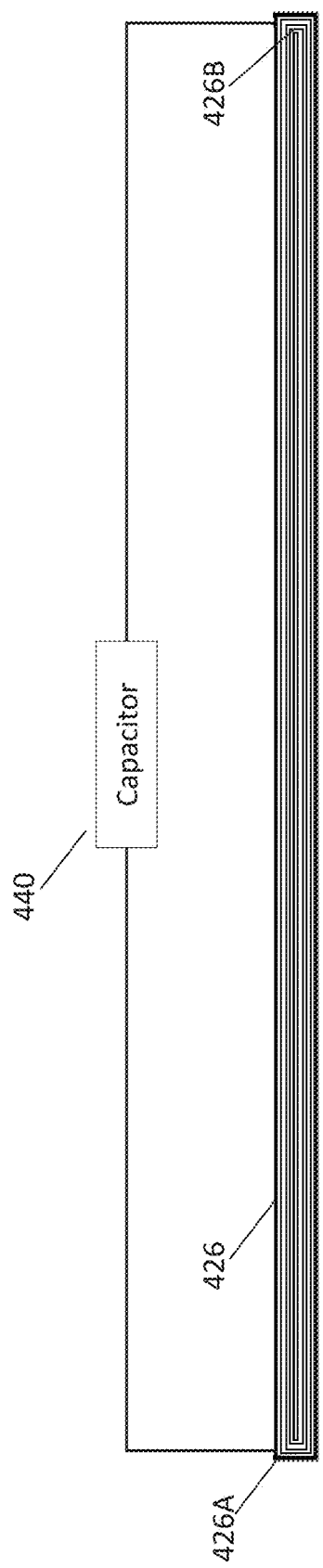
FIG. 46 illustrates a non-limiting example of filtering of the antenna structure.

Filtering of the signal prior to reaching the antenna, is one technique for improving signal quality. In some embodiments, capacitors or resistor-capacitor combinations may be applied to one or both ends of the antenna structure and connected to ground, or in other embodiments connected across the antenna. See FIG. 46 where a capacitor 440 is connected across antenna terminals 426A and 426B.

Covering the Antenna

In one embodiment, an amorphous metal is laid atop the antenna, producing a cleaner signal, but decreasing signal amplitude. This method of filtering yields very good SNR (signal-to-noise ratio) for transient pulsed-based applications such as the electromagnet.

Reduce Cross-Talk and Shape the EMF

Figure 47:
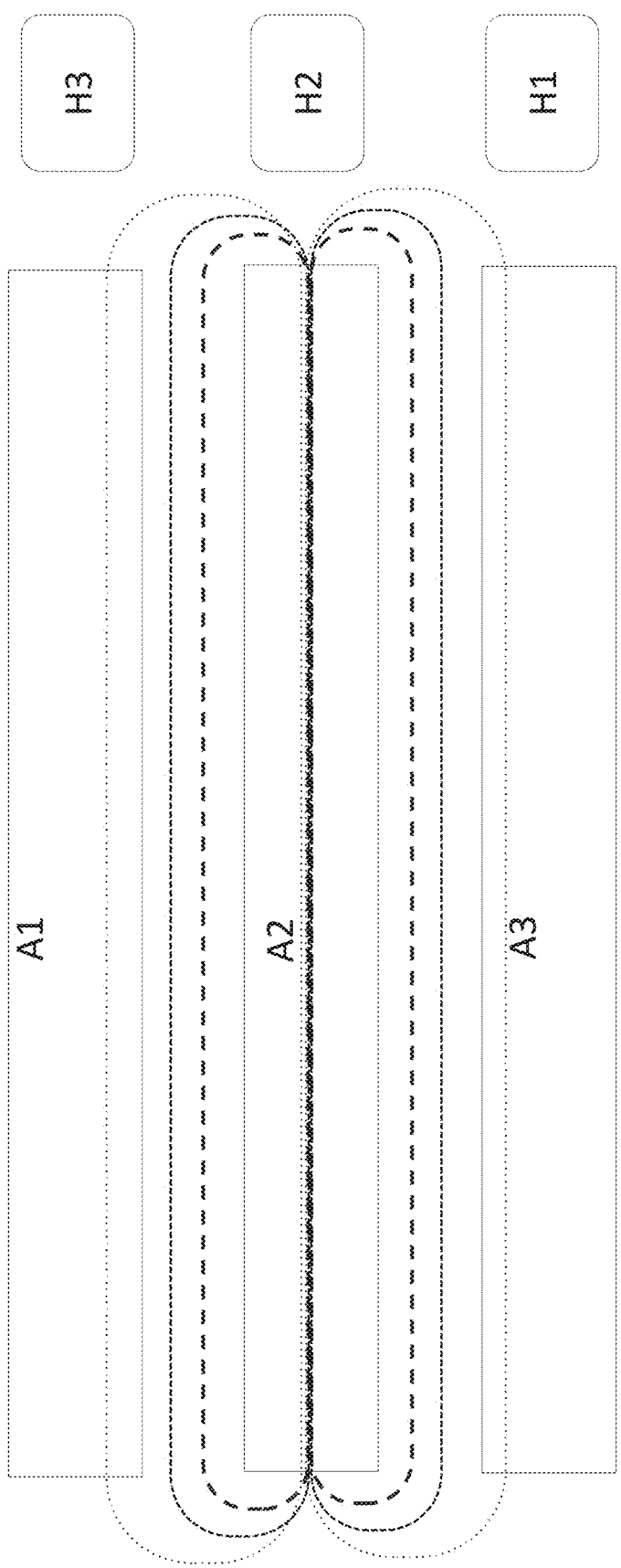
FIG. 47 illustrates the EMF around the second antenna (A2) corresponding with read head 2 (H2) of a magnetic card reader.

Another source of noise includes signals received by one read head, denoted as H1 or H3 in FIG. 47, from transmission from an antenna, denoted as A1 through A3, on an adjacent track or read head, demoted as H1 through H3. Multi-purpose antennas are typically aligned within a card to the position of a specific sensor on a magnetic stripe read head. However, if the amplitude and antenna pattern is large enough, it can interfere with the sensor on an adjacent track.

Figure 48:
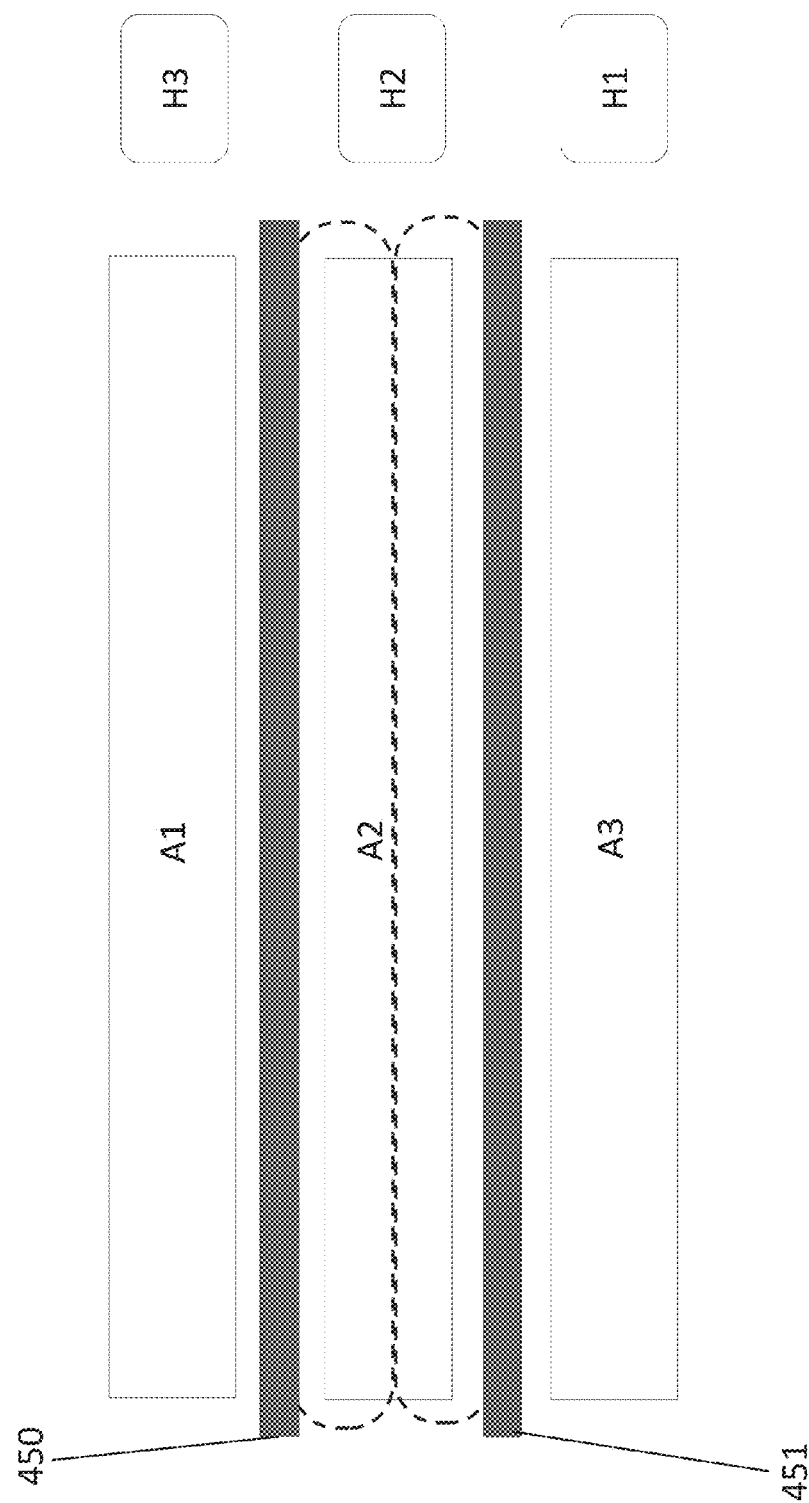
FIG. 48 illustrates a non-limiting example of blocking methods to block the EMF from one antenna (A2) from interfering with another read head from adjacent tracks (H1 or H2).

One method to mitigate this problem provides blocking material such as diamagnetic, amorphous metal and/or equivalent EMF blocking material around or in specific locations near each antenna to block and/or shunt the radiated energy from reaching the adjacent sensor on read head. FIG. 48 illustrates such blocking material slabs 450 and 451.

Figure 49:
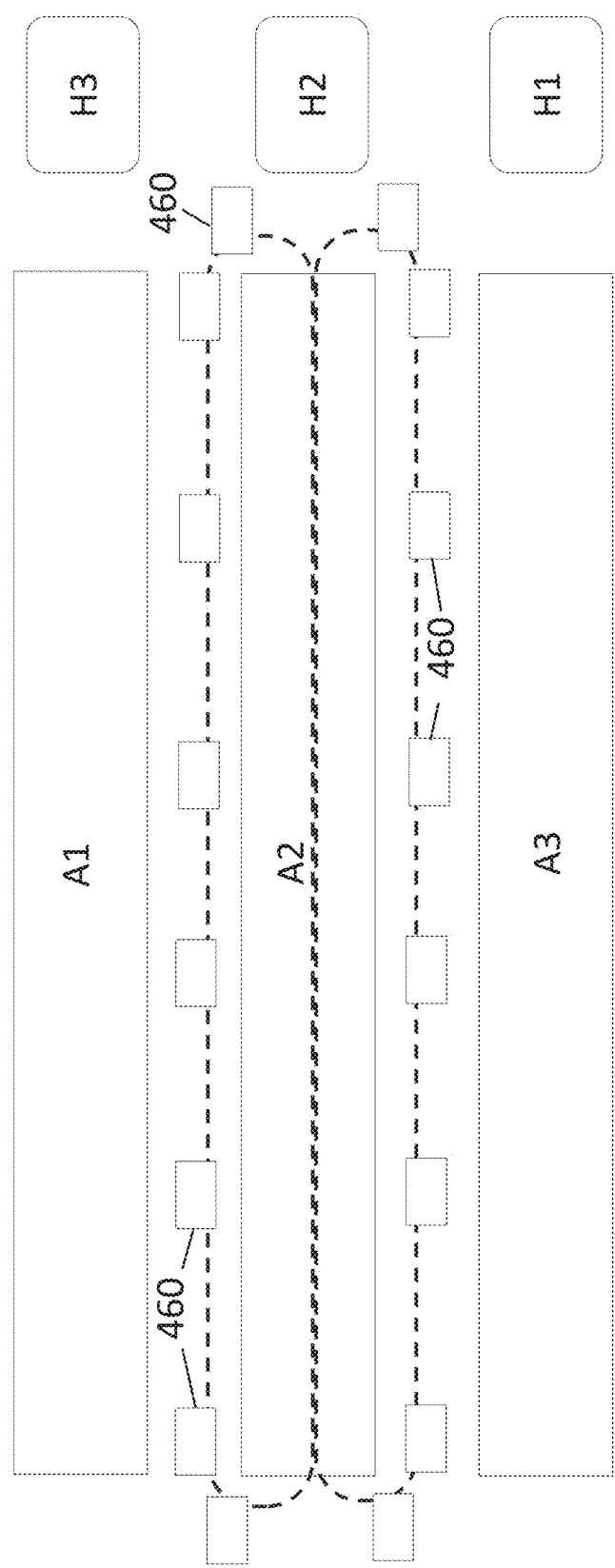
FIG. 49 illustrates shaping and/or blocking of the EMF using block methods including but not limited to Faraday rings or equivalent circuitry that shapes the EMF to a shunt.

Another technique applies faraday rings at specific locations along the antenna to shape the EMF by redirecting it to a shunt or ground. A plurality of spaced-apart faraday rings 460 are shown in cross-section in FIG. 49. Under this embodiment, the faraday rings or equivalent EMF shape circuitry may be located at the ends, or along a length of the antenna to reduce the signal at an adjacent sensor, without degrading the signal at the targeted read head sensor.

Figure 50:
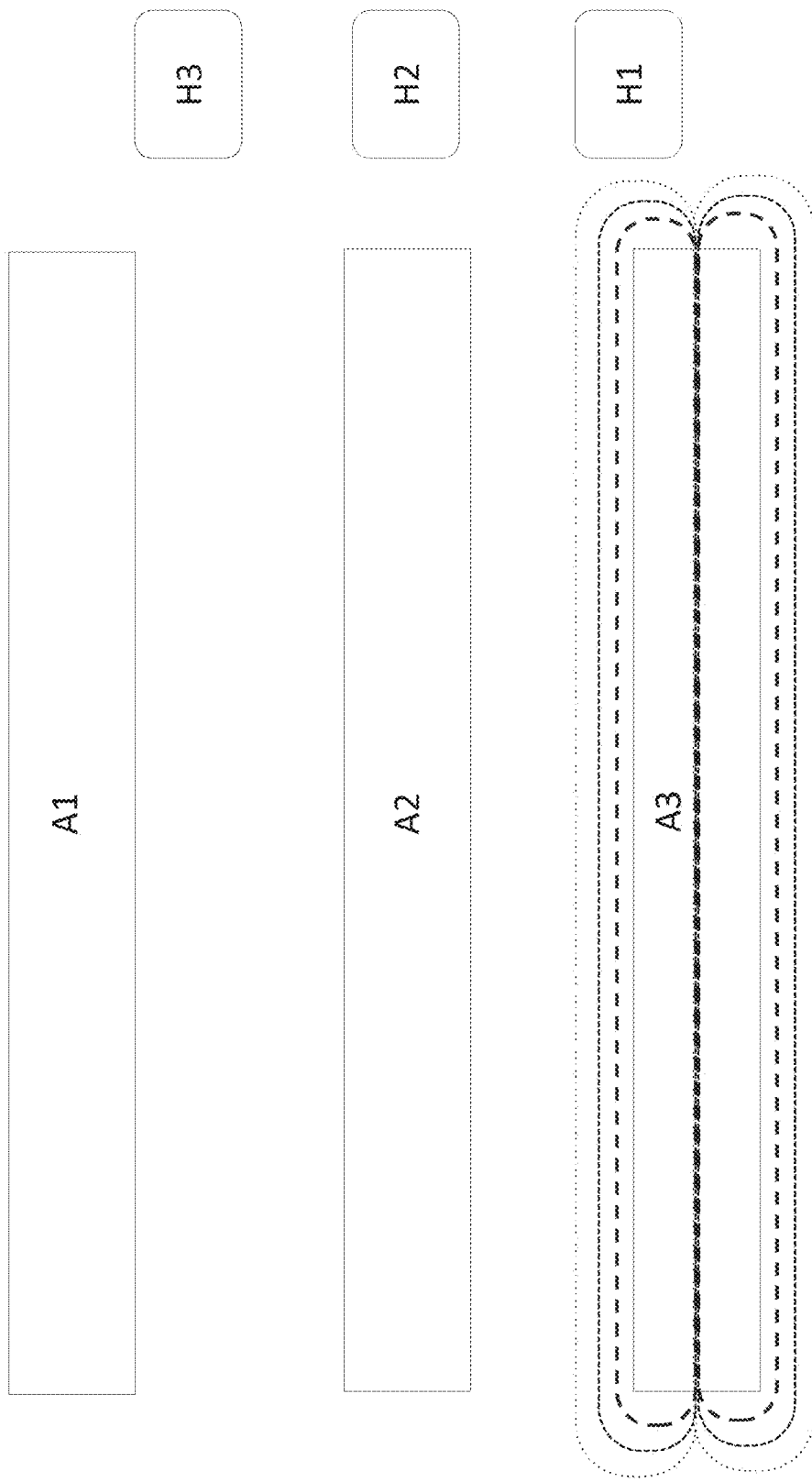
FIG. 50 illustrates reducing noise caused by bleed over from adjacent antennas by positioning antennas A1 and A3 further from antenna A2 so that the EMF flux amplitude is reduced across adjacent read heads H2 and H3 on the card reader.

In yet another embodiment, the antennas A1, A2, and A3 may be positioned in an offset orientation relative to the read heads H1 and H3, as shown in FIG. 50.

Multi-Track Transmission

Figure 51:
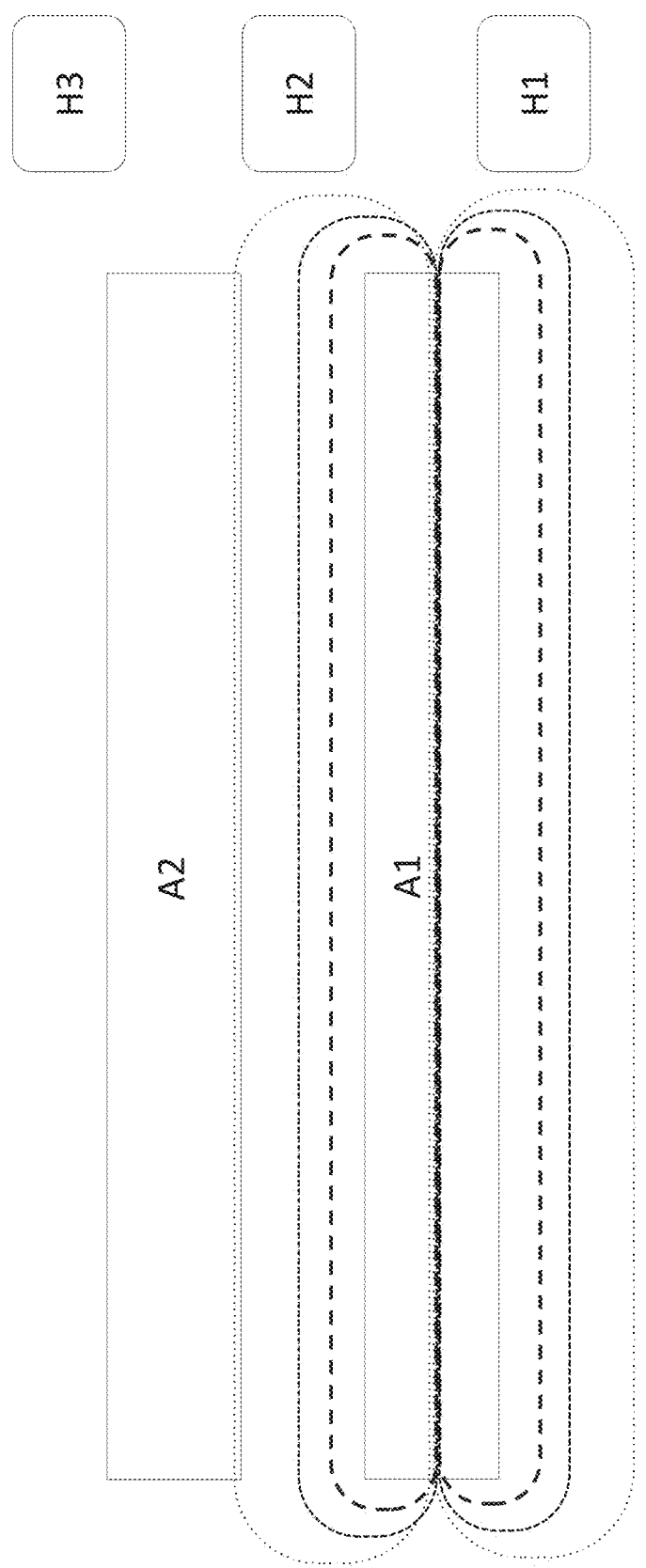
FIG. 51 illustrates the EMF radiating two adjacent read heads from one or more antennas positioned near at least a portion of a read head.
Figure 52:
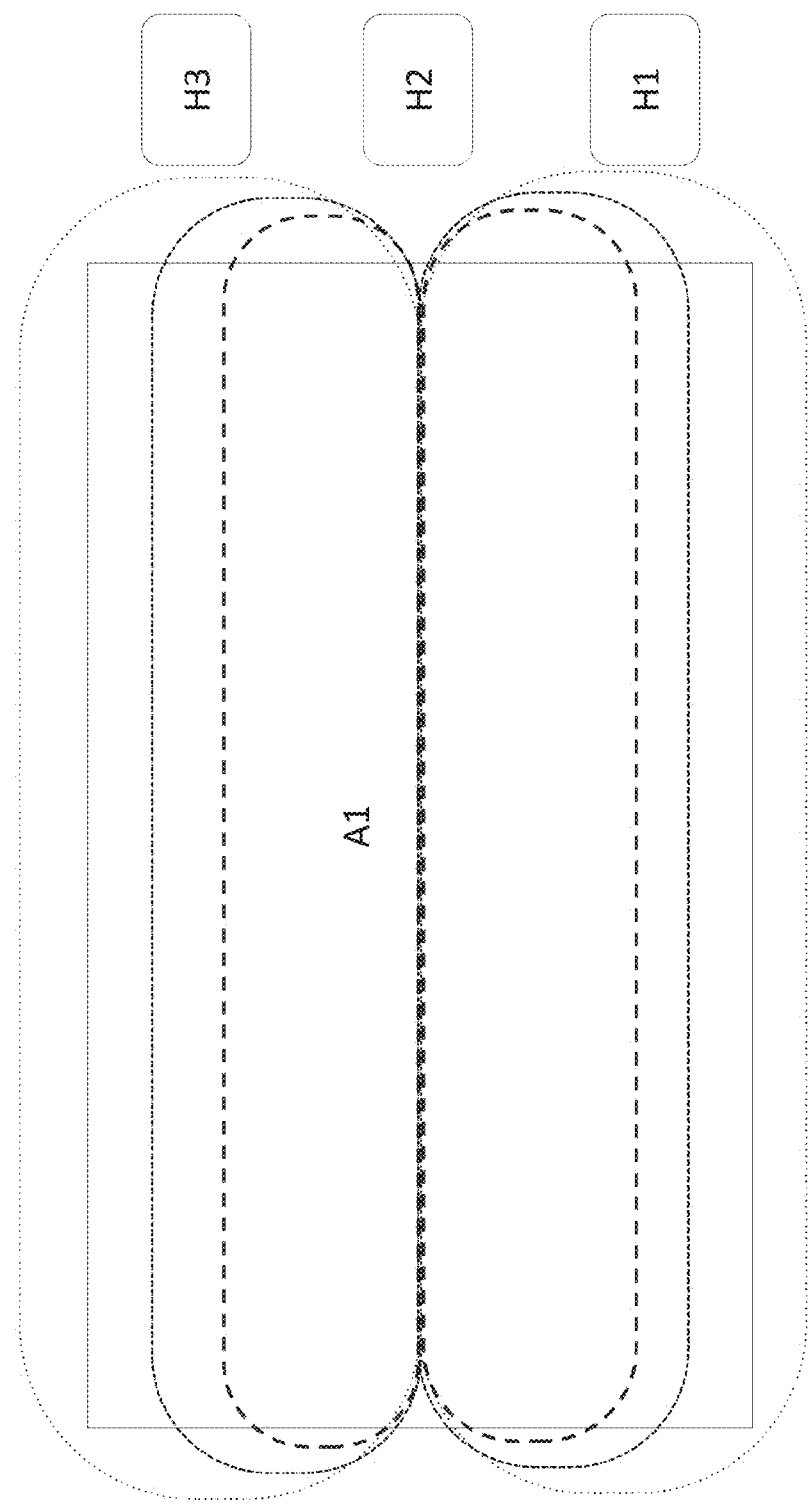
FIG. 52 illustrates a single multi-purpose antenna radiating all three read heads.

Conversely, one embodiment may have one or more antennas positioned between or covering a portion of read heads such as illustrated in FIG. 51. Under such embodiments, the two adjacent read heads receive transmissions from antennas positioned between read heads. This antenna positioning reduces cost by reducing the number of antenna elements required while ensuring the signal is received by card readers that have a limited number of read heads. In yet another embodiment, one antenna may be sized to ensure the signal is transmitted over a portion of one or more or all track locations of a typical ISO payment or identity card such that one or more read heads may receive the transmission as shown in FIG. 52.

Optimizing Antenna Output—Current and Bit Width

For optimum performance as an electromagnet, the amplitude and pulse width of the signal radiated from the antenna should mimic the amplitude and pulse width that a magnetic card reader expects to receive from a conventional magnetic stripe card. A card reader expects to see distinct transitions at the leading and/or trailing edges of each bit, i.e., as the bits change polarity. It is desirable for the antenna to be either in transient or in steady state (e.g. not changing) so the card reader is not confused by the transmissions from the antenna.

Optimum performance is relative to bit rate, bit width, and other properties of the antenna or antenna module. The antenna resists instantaneous changes in current until steady state is reached, at which maximum current flows through the antenna. For this invention, the multi-purpose antenna is optimized to achieve the maximum rate of change possible for a specific bit rate. In one embodiment, bit rate is calculated by the amount of data collected from a track from a typical magnetic stripe card and the range of swipe speed typical card readers can accept. In some embodiments, the antenna is designed to optimize the range of bit rates typically accepted by a majority of card readers. In yet other embodiments, the bit rate may be calculated based on detection of the speed of a swipe by a user.

Variable Bit Rate

In typical use of magnetic stripe cards, the amplitude and bit rate of magnetic stripe cards varies with the user's swipe speed. Unfortunately, the bit rate and sensitivity varies from reader to reader. Some readers accept swipe speeds as high as 50 in/sec swipe speed and as low as 2 in/sec.

One aspect of this invention is the ability to vary bit rate. Under this "variable bit rate magnetic transmission" embodiment, the speed of the transitions emitting from the antenna may be controlled by the microprocessor. Thus, for some embodiments, the bit rate transmitted by the antenna may be dynamically changed to provide bit rates from typical user swipes including but not limited to 2 in/sec to 50 in/sec. Variable bit rate magnetic transmission enables the signal to be accepted by a wider number of card readers. In some embodiment, the bit rate may be changed per swipe or transmission, and/or responsive to user direction and/or swipe speed.

Variable Amplitude

Like bit rate, the amplitude of the signal can be varied independently of or based on the varying bit rate so that the same antenna may function properly with a wider range of magnetic card readers. Typical read heads will produce an output of 2 mv (slow swipe) to 50 mv (fast swipe). The transmission from the antenna must be of sufficient amplitude for readers of varying sensitivities to both reliably receive and interpret the signal.

Variable Power Method

One way to increase or decrease signal amplitude is to vary the power. Power can be varied by connecting two or more GPIO pins from a microprocessor to the same antenna element. Under such "variable power" embodiments, the ability of a magnetic card reader to receive a signal depends on the sensitivity of the reader. Just blasting a signal at maximum power could saturate the amplifiers in one reader, while another reader may require such large signal amplitude. By varying the power per transmission per each burst at an interval (for multi-burst wireless applications) or per swipe (for card based applications), a wider range of card readers can receive a transmitted signal from the same multi-purpose antenna. Under this embodiment, power of the transmission of the signal can be dynamically changed to produce voltage ranges typical of card readers including ranges of 2 mv (slow swipe) to 50 mv (fast swipe).

Variable Power Wireless Magnetic Stripe Method

According to a non-limiting example configuration, a resistor may be placed at the output of GPIO pin of a processing component while software controls which pin is active to provide multiple power levels: GPIO+resistance number one, GPIO+resistance number two, and both GPIO pins together. Of course, this method is scalable to more power levels by simply adding more GPIO pins. This "variable power magnetic stripe transmission" not only allows a wide range of variability in sensitivity of magnetic card readers, but it also facilitates a new method of "wireless magnetic stripe", where the multi-purpose antenna may successfully transfer data while physically within a reader slot as well as external to the card slot on the reader, achieving a system that supports swiping and wireless on the same antenna or antenna module.

Single-Sided Charge/Release Magnetic Stripe Electromagnetic Transmission

Figure 53:
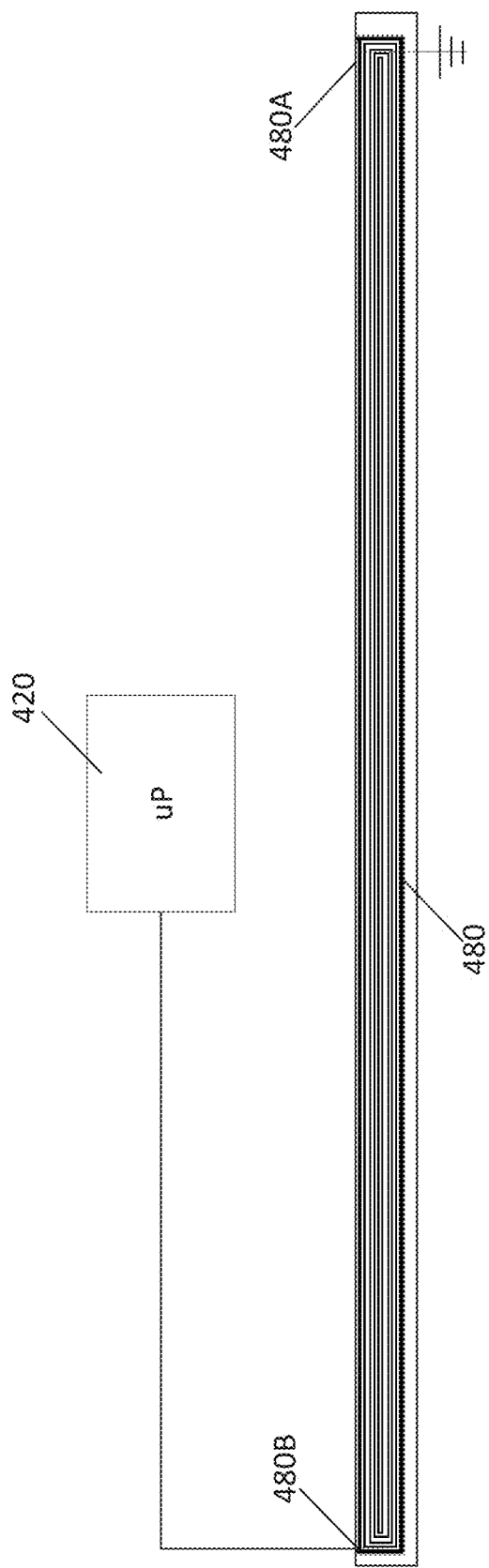
FIG. 53 illustrates single sided charge and release magnetic stripe electromagnetic transmission method.

Power transmission, as well as power consumption, may be further reduced using another method called "single sided charge and release magnetic stripe electromagnetic transmission" as shown in FIG. 53. Under this embodiment, one side 480A of a multi-purpose antenna 480 is connected to ground either through port pins on a microprocessor (MCU) or directly, while another side 480B of the antenna is energized by one or more port pins on the MCU.

Figure 54:
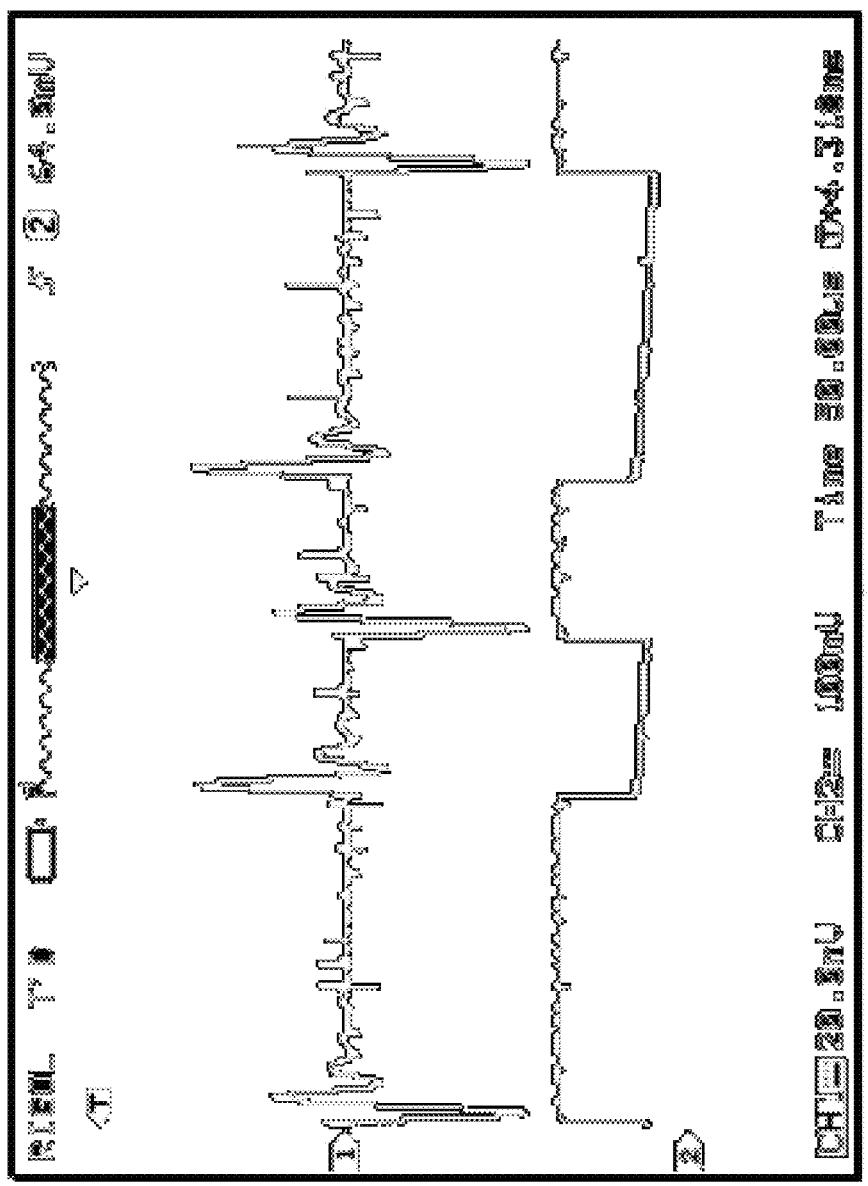
FIG. 54 illustrates the source and response from the single sided charge and release magnetic stripe electromagnetic transmission method as detected by the read head of a card reader.

As shown in FIG. 54, each rising edge is associated with a negative-going waveform. As the antenna is energized, a read head from a magnetic stripe in close proximity to the antenna receives the magnetic energy causing the polarity to go negative as shown in a top trace of FIG. 54. The antenna structure is kept energized maintaining current flow until the opposite polarity is needed, which is achieved by simply turning off the antenna, turning off current flow and setting the GPIO pins to high impedance (input). This causes the field that had been present to collapse, resulting in an opposite change in magnetic field strength. The magnetic card reader in close proximity to the antenna detects the change in polarity as shown as a rising edge in the top trace and interprets the information just as if the opposite polarity was actually energized. This method of energizing only one polarity and keeping that polarity on until the opposite polarity is required, and simply turning off the antenna to achieve that transition reduces power consumption for transmission of a magnetic stripe EMF by up to 50%, as determined by the number of ones and zeros that are present in a given bit stream.

Polarity Symmetry

A common issue with magnetic stripe transmission is that the two polarities are not always symmetric. Ratios of 2:1 and 3:2 can be typical for north and south magnetic pulses when using coil-based electromagnetic transmitters. A key advantage of the single-sided charge and release method as described herein is that it achieves a near 1:1 ratio of rate of magnetic field changes in both directions. This provides a very balanced symmetry between changes in polarities detected by a close-proximity magnetic card reader, since the amplitude of each polarity transition is more tightly controlled than with other methods that require drivers and other external components to amplify and shape the electromagnetic pulses.

Fewer Input/Output States

One common technique for generating two different magnetic polarity pulses utilizes expensive hardware such as but not limited to H-bridge electronics to attempt to balance or shape the resultant electromagnetic field. Similarly, methods such as those previously described use push/pull techniques and require 4 I/O states to switch at precisely the same exact time. This single-sided charge and release transmission method does not rely on that polarity flip, and thereby reduces the complexity of controlling more timing of the states, as well as processing time to yield yet more savings in power consumption.

Close-Proximity Sensor Detection Antennas

One technique to improve reliability of a magnetic card reader in reading transitions is to adjust the bit rate based responsive to swipe speed. Swipe speed may be calculated by taking the time difference between initial read head detection and loss of read head detection by close-proximity sensors. Several configurations of the multi-purpose antenna described herein may be used for close-proximity detection, including using separate antennas for sensing as for communications and remote battery recharging. For the embodiment involving an ISO standard card dimension, a multi-purpose antenna may be placed at one or both ends of a wake-up/communications/recharging antenna to detect the presence of a read head of a magnetic card reader. This configuration enables low power detection regardless of the direction the card is swiped.

Close-Proximity Sensor Detection

In many applications, such as wearable, mobile, and portable applications, it may be desired to achieve the lowest power consumption possible without sacrificing performance. To achieve lower power consumption, a microprocessor, MCU or equivalent processing component may be held in a deep sleep state while awaiting some activation signal, then increase its power to perform a function, then fall back asleep. This technique of a low power sleep mode, followed by higher power operation, followed by a low power sleep modes is often called "ping-ponging" between power states. For close-proximity applications, activation may consist of the presence of a close-proximity sensor and/or "reader", such as an NFC, BLE, EMV and/or magnetic stripe card reader, triggered by detecting a signal, such as an RF signal, or in some embodiments, metal within the readers.

Ultra Low-Power Close-Proximity Sensor Detection

Figure 55:
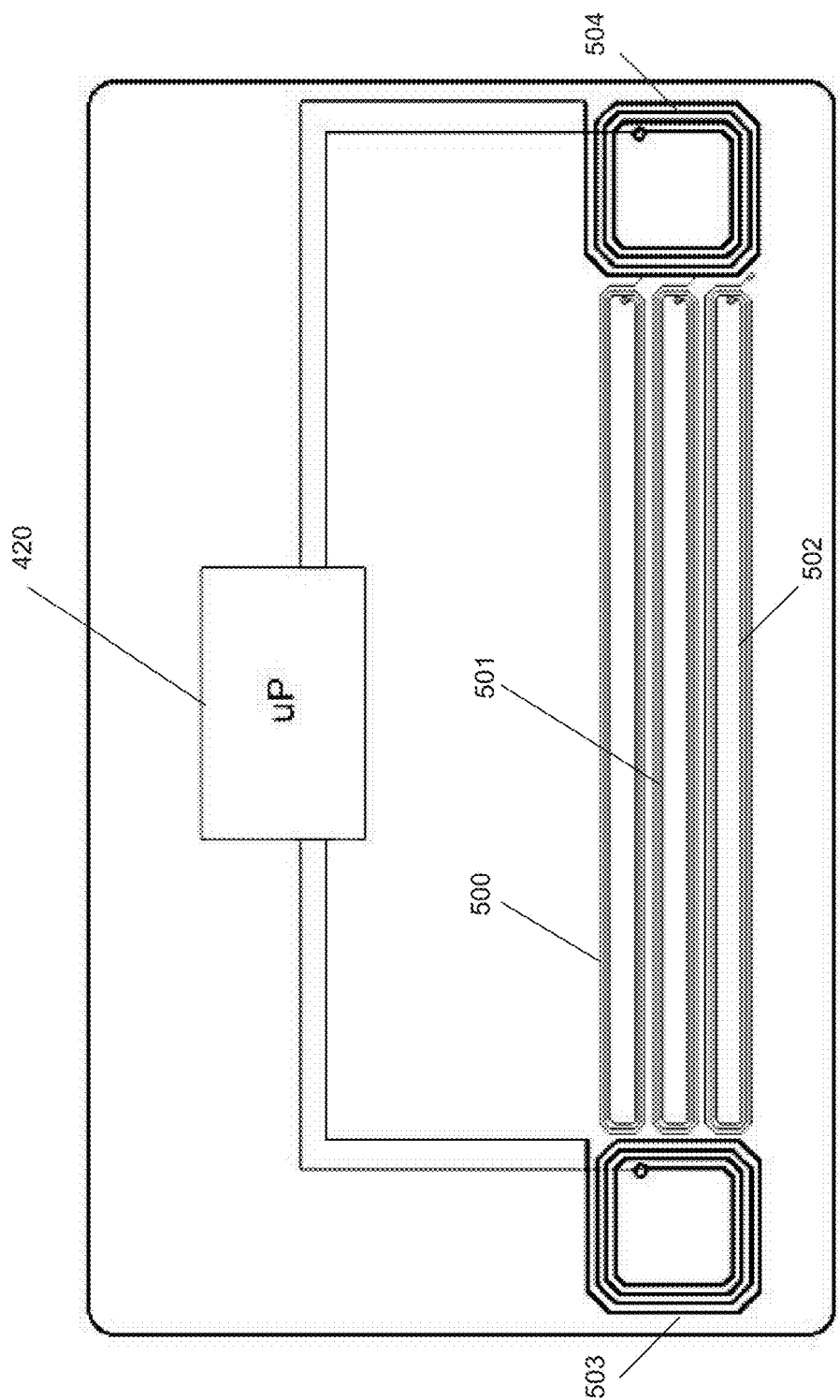
FIG. 55 illustrates multi-purpose antennas used as proximity detectors by connecting directly to a microprocessor or equivalent controller.
Figure 56:
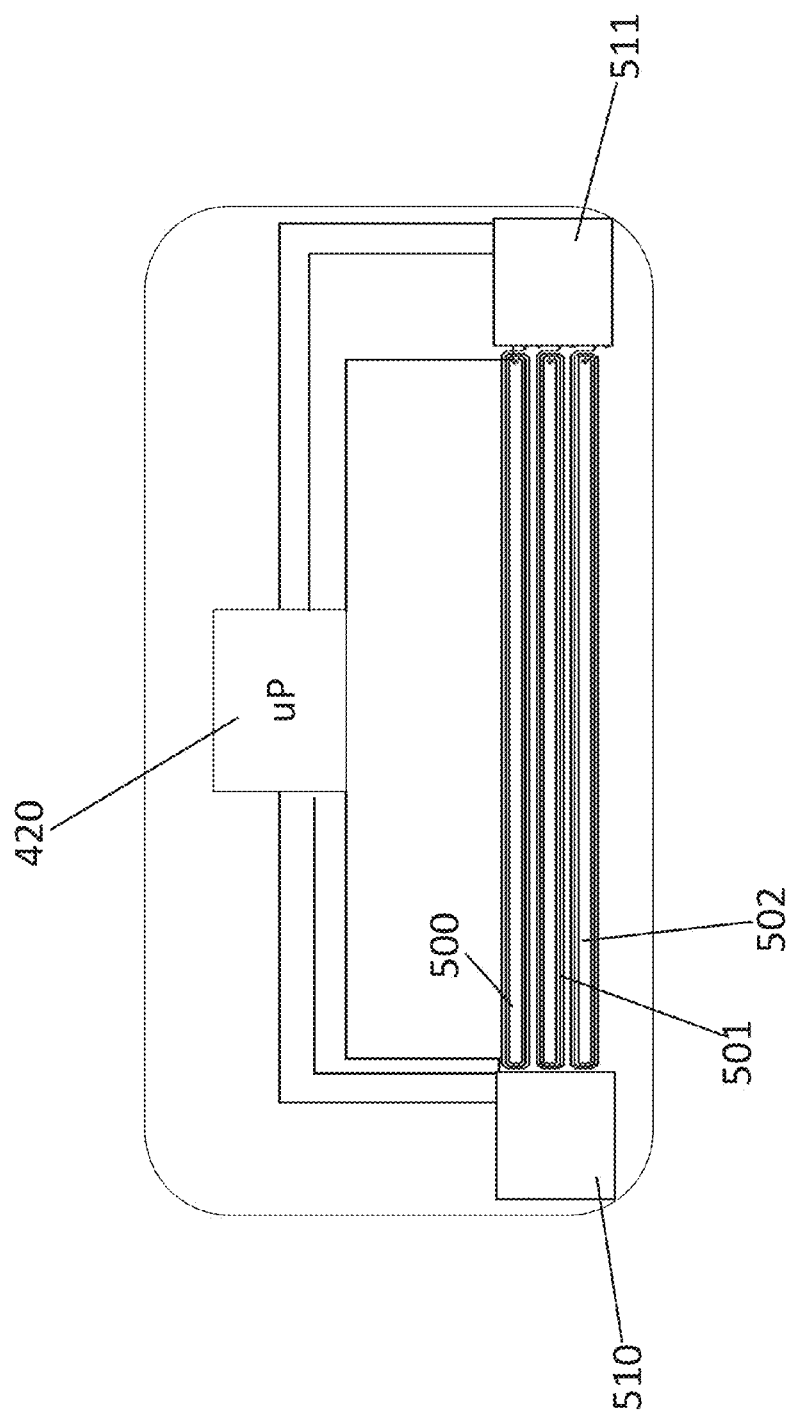
FIG. 56 illustrates conductive and/or capacitive pads used as proximity detectors by connecting directly to a microprocessor or equivalent controller.

In some embodiments, the antenna module may comprise one or more multi-purpose antennas 500, 501, 502, 503, and 504 connected to the microprocessor, MCU, and/or equivalent 420 as illustrated in FIG. 55. In some embodiments, one or more antennas or antenna segments may be used as sensors to detect items including but not limited to human touch or metal, such as but not limited to one or more reach heads within a magnetic card reader. In lieu of utilizing one or more antennas 500, 501, and 502 as a sensor, one or more conductive pads 510 and 511 can be connected to a uP (microprocessor or processing component) as illustrated in FIG. 56. In these embodiments, the MCU 420 may control conductive pads comprising resistive or capacitive sensors directly using GPIO port pins.

Another approach controls an LC tank circuit from a low-power microprocessor, MCU, or equivalent. Lower power may be achieved under these embodiments by utilizing resources within embedded microprocessor, MCU, and/or equivalent chipset to perform the excitation, measurement, thresholding, and low power wake-up using GPIO pins that can be controlled at a very low current draw. This method enables ultra low power performance (<2 uA or less) while reliably detecting the presence of a close-proximity sensor and/or magnetic card reader.

Calculation of Swipe Speed

In one embodiment, swipe speed may be derived by calculating when the read head is and then later when it is not detected or sensed by the proximity detector. Other embodiments may utilize one or more copper pads and/or multipurpose antennas at one or both ends of the multi-purpose antenna to serve as proximity detectors. Under this embodiment, swipe speed may be detected by taking the difference between detection of two or more pads and/or antennas as the read heads are detected by each of the pads or antennas during the swiping process.

Alternatively, another embodiment may detect swipe speed from a single pad or antenna located at either end, above or below the multi-purpose antenna that emits the magnetic pulses. Under this embodiment, speed is calculated by calculating the time difference between detection then "non-detection" of a read head on the same pad or antenna.

Accelerometer as a Proximity Detector and Calculation of Swipe Speed

Another embodiment may utilize a motion detector such as but not limited to an accelerometer, a gyro or another movement measurement component. A miniature accelerometer or motion detector may be used for a variety of other purposes, such as but not limited to a pointer, mouse, gaming controller, or other user-device interactions.

One embodiment may use the accelerometer for gesture control. Another embodiment may use a proximity detector as a proximity detector. One embodiment utilizes an accelerometer that is small enough to be used within a smart card or mobile and/or wearable device, such as but not limited to watches, watch bands, and jewelry items such as rings, bracelets and necklaces.

Since only one axis is needed to detect the swiping action, the swipe may be accurately detected, and speed, orientation and direction of the swipe may be derived. Under this embodiment, the gesture of moving in one specific direction with very little variance as to direction may be calculated to indicate a card swipe motion. This embodiment detects motion within a range of an axis and at a specific rate of movement. If the rate and direction of motion are within specified thresholds for direction, distance and duration of movement, the motion is considered to be a swipe.

In some embodiments, an accelerometer or equivalent motion detection device may be used in combination with one or more proximity sensors to detect and calculate not only a swipe condition, but also the presence and location of a read head as a card is swiped.

Average Swipe Speed Calculation

Since most people swipe a card at a fairly consistent rate, the bit rate can be adjusted to an individual's "average swipe speed" and/or "swipe speed range" under certain embodiments. Average swipe speed for an individual may be calculated over time as the sensors calculate swipe speed of a user in some embodiments, the swipe speed may be "trained" by calculating the maximum, minimum, and/or average swipe speed as a user performs successive swipes. The transmission of the bits (pulses) may then be controlled based on the average swipe speed calculated from previous swipes. In some embodiments, swipe speed may be retrained or re-determined over time as a user swipes the card. The bit rate and/or power may then be modified based on the newly determined swipe speed.

Tokenization Transmission

Another method to secure data transmission over a multi-purpose antenna is to utilize tokenization. In this embodiment, actual data from a payment account is never transmitted. Instead, a token is generated by external circuitry and transmitted over the antenna. In the same way, data can be encrypted so that transmission over the multi-purpose antenna is not compromised. This "tokenization transmission" method improves security of antenna transmissions.

Security

Security may be improved by providing data to one or more antennas and/or antenna modules encrypted, or in some embodiments, aliased by changing the characters to associate with other characters, via OTP (one-time-passcodes), tokens and/or combinations of each. Under these embodiments, data may be encrypted or changed to an alias, OTP, or token by a microprocessor or equivalent processing component, or in some embodiments, by another secure component such as but not limited to a secure microprocessor or secure element, either within the antenna module or external to the module. For payment embodiments, the encrypted data or alias, OTP, or token transmitted by the antenna is received by a magnetic card reader and routed to the appropriate processor via the first 6 digits of the card number, so that the data is secure with the payment authorization processor. In some embodiments, this token may include some hashing with one or more biometric keys to form "personalized tokenization" method that secures the payment to an actual individual. In other embodiments, the token may include biometric (something you are), device identifier (something you have), and/or a word, PIN, pattern or gesture (something you know).

In some embodiments, one or more user-activated devices control the microprocessor to cause transmission of the alternating magnetic field. In such embodiments, a user may authentication on a separate device that then communicate with the microprocessor to perform biometric or behavior recognition of a user of the system to authenticate the user, wherein upon after successful authentication of the user the microprocessor performs a transaction.

In yet other embodiments, biometric or behavior recognition of a user may be performed locally to the device containing the antenna or antenna module that then executes a transaction upon authentication. In one embodiment, a microphone causes transmission. In another embodiment, a voice signal provided to the microphone serves as a biometric for use in determining whether a user of the system is an authorized user of the system.

Delayed Timing of Transmission

A chief issue with utilizing multi-purpose antennas described herein is the non-uniformity of the electromagnetic field at the ends of the antenna. In order to compensate for severe attenuation or "nulls" along the antenna structure, the timing of the transmission may be controlled. Under some embodiments, the timing of the start of the transmission may be adjusted by software on a microprocessor, MCU, or equivalent processing component in such a way that the antenna is energized only when the read head is over the effective part of the antenna, thereby maximizing data transfer and reducing errors. Timing may be further adjusted under this embodiment so that the burst starts at the beginning of the "good part" of an antenna, while adjusting the bit rate to ensure full transmission of data occurs regardless of the speed of the swipe.

Variable Timing Delay

Figure 57:
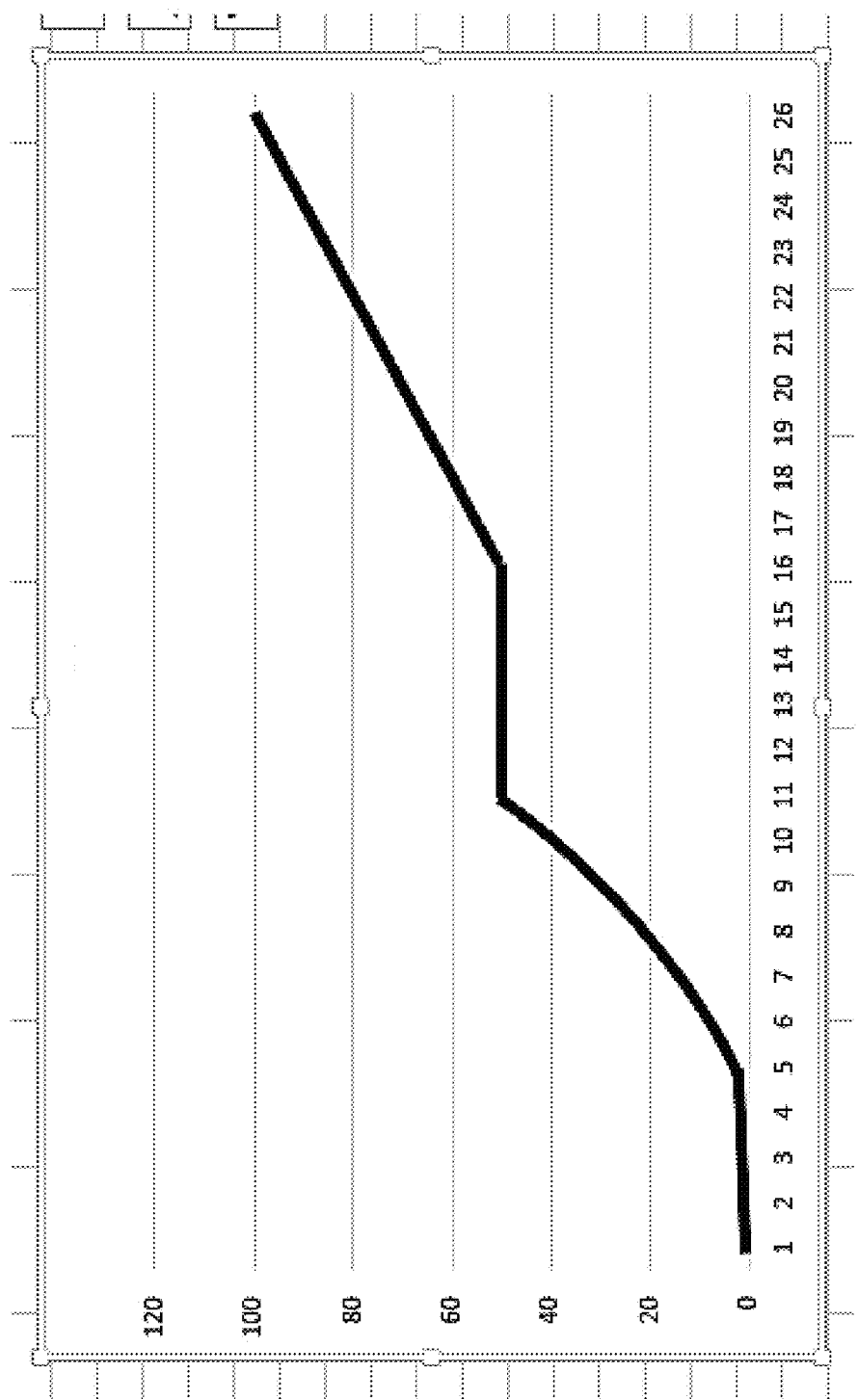
FIG. 57 displays a variable timing delay chart non-limiting example.

One embodiment delays the transmission based on how long the proximity pads have been active. FIG. 57 depicts a curve that operates better than just half the time. The Y-axis is the delay time in milliseconds and the X-axis is active time/10. Thus for this non-limiting example, proximity pads active for 80 ms require a delay of 20 ms to effectively utilize the beginning of the antenna.

Optimal Antenna Length

Although the antenna is designed with sufficient length to support multiple swipe speeds, one advantage of this solution is that regardless of swipe speed, transmission can be controlled to start at a specific point on the antenna, within the accuracy of the swipe velocity measurement. Thus, with this "delayed timing of transmission" method, a wider range of swipe speeds across a wide number of readers can be accommodated.

Lower Power, More Precise Bit Controlled Timing

Controlling the timing of each bit precisely within a low power implementation is challenging. One approach to improve both the precision of pulse transmission timing and lower power consumption is to pre-calculate the bit stream. Under this embodiment, the information scanned from a magnetic strip card need not be saved purely as an account number and associated information such as a name or CVV/CVS. Rather, the information can be immediately transformed into bits that are saved into a table. These tables relieve any delays or complexity caused by calculating the information in real-time as the pulses are transmitted over the antenna. Instead, each bit saved within the table is pre-calculated to control the timing of the transmission of each bit or pulse precisely based on the "bit rate" previously discussed. This "bit controlled timing" method improves the reliability of a magnetic card reader to successfully read all the pulses consistency several fold.

Use of Low Power Wireless Mag Stripe without Impacting Other Magnetic Stripe Cards Another advantage of this lower power wireless magnetic stripe method and system is that is does not erase or scramble any data on a typical magnetic stripe card. Magnetic stripe cards such as hotel keys that have magnetic stripes with low coercively are particularly susceptible to EMF fields that could degrade the programming of the magnetic stripe. Under this invention, the power level and bit rate controls, along with the burst nature of the magnetic transmission is such that the magnetic stripe on the card is not be affected.

Detection of DIP Type Magnetic Card Readers

Another limitation with many previous approaches to magnetic stripe transmission is that they do not work well with DIP (Document Insertion Processor) or front-loading style magnetic card readers that are popular today at most gas stations and with automatic readers which are popular at ATM locations. DIP readers require a card to be inserted into and removed from the card reader with the magnetic stripe in a certain orientation. Since this invention can control the timing of when to energize the antenna for transmission, one embodiment of this invention utilizes one or more proximity detectors on either side of the antenna to detect a DIP style magnetic reader. According to this embodiment, if one sensor is detected within a specific time range to indicate a potential "valid" swipe while the other sensor is not detected, the card is assumed to be in a DIP type reader, and not "swiped" through a swipe reader. Likewise, if another sensor on the other side of the antenna detects a read head within a specific range of time and/or intensity, the reader is considered to be a swipe-type reader. Similarly, if both readers are detected within a specified time interval and/or intensity, an ATM reader has been identified.

Delayed Wireless Burst Method

Wireless transmission of magnetic stripe data has limitations with DIP style readers as well. Since DIP style readers require a card to be inserted into and removed from a DIP reader, a multi-purpose antenna may not activate the reader in wireless applications. To resolve this issue, one embodiment utilizes another card to activate the DIP reader while the wireless multi-purpose antenna transmits data. Since the DIP reader activates upon removal of the card, the multi-purpose antenna can transmit as the card is being removed, enabling the card reader to receive the pulses transmitted from the antenna. In some embodiments, the card and wireless transmission are synchronized with one another to coordinate the time when the antenna transmits with the action of removing the card. In this way, a user may wirelessly transmit data to a DIP style reader by inserting and removing a plastic card while the antenna transmits data.

Dynamic Multi-Swipe Techniques

Since this invention can control both the power level and the bit rate of transmission, either the power or the bit rate of the transmission, and/or combinations of both, may be varied per swipe, in some embodiments. This "dynamic multi-swipe" method of varying the power and/or bit rate of the transmission over multiple swipes increases the number of readers that can read the transmission by supporting a wider range of sensitivity and swipe speeds that vary between magnetic card readers.

User Directed Manual and Multi-Burst Methods

In another embodiment, a button, proximity sensor, and/or touch screen is disposed on a mobile or wearable device to activate payment and/or energize the antenna when the user wishes to make a payment, or in some embodiments, when a user wishes to transfer data and/or open a door. Under this "user directed payment" technique, the antenna only transmits data upon a user manually pressing a button, proximity sensor, and/or touch screen. In another similar embodiment, the antenna transmits at some time interval after the user directs the payment, and continues to burst for one or more bursts per a specified time interval until a user stops the transmission, or as in some embodiments, only until another time interval or specified number of bursts have passed. In yet another embodiment, the user has to press two or more capacitive sensors simultaneously to transmit one or multiple bursts of data, to reduce false alarms. In yet another embodiment, the sensors may be multi-purpose, supporting serial or parallel communications, battery charging, wake-up from passive or sleep modes, and the like.

Variations of the "multi-burst" method include transmitting with varying parameters, including timing of transmission, delays, power, bit or pulse rate, bit or pulse order, bit or pulse width, bit or pulse direction, data, operational frequency, location, location, orientation and/or combinations, collectively referenced as "transmission parameters" or just "parameters" hereafter. These parameters may be changed per swipe, per transmission, per successive transmission, or per unsuccessful swipe or unsuccessful transmission, or in some embodiments, transmitted repetitively, consecutively and/or over some time interval with some delay between transmissions to improve the reliability of a wide range of card readers to correctly receive all data.

For the non-limiting example of a multi-purpose antenna transmitting data from a loyalty card, then transmitting data from a payment card, a "multi-card, multi-burst" method could alternate between different cards per transmission, and/or automatically alternating multi-burst fashion with a delay between each transmission.

No Swipe Magnetic Stripe Method

In another embodiment, the timing of the burst is delayed until after the card is stationary in the middle of the card reader. Under this embodiment, one or more antennas and/or one or more proximity sensors on either side of the one or more antennas detect the read head as the card is slid into and stationary in the middle of the card reader before energizing the antenna. In this "No Swipe Mag Stripe" transmission method, a user may simply stop the card halfway in the slot of the magnetic card reader, and then transmit one or more bursts with one or more of the transmission parameters describe heretofore.

Manual Trigger

In some embodiments, activation of the multipurpose antenna may optionally be triggered using a manual method of a user pressing some device, such as but not limited to a button or equivalent device. Devices that can be used as triggers include but are not limited to one or more membrane switches, resistive sensors, capacitive sensors, or equivalent sensors. Under these embodiments, an antenna begins transmitting and receiving only as a user performs some action to activate communication. As with other embodiments, one or more antennas may continue to transmit sequentially and/or at some interval for a specified number of intervals and/or time. Likewise, as with other embodiments, one or more antennas may alternate data and/or transmission parameters to improve the number and range of magnetic stripe card readers that can receive the transmission from a multi-purpose antenna.

Multi-Channel Acknowledgement/Authentication

In yet another embodiment, the point of sale (POS) system transmits back to the device an acknowledgement and upon reception of that acknowledgement, the antenna stops transmitting. This acknowledgement may be received on another frequency, or within a frequency band and received on the transmitting multi-purpose antenna. Likewise, authentication and/or acknowledgement between two devices may occur over one or a combination of channels between one or more antennas. In such embodiments, the separate channels can be multiple frequencies, or in some embodiments, electromagnetic pulses and on or more frequencies. This "multi-channel payment" method improves security for authentication as well as for payments.

False Swipe Detection

Aspects of this invention enable methods to detect a false swipe. For embodiments that utilize an accelerometer, a false swipe is detected as any motion that is outside the thresholds that define an axis of movement for a specified distance achieved over a specified time interval.

Embodiments that utilize a pad or antennas as a proximity detector rely on the ability of a sensor to detect a head on a magnetic card reader and its relative position over the antenna. Under these embodiments, a false swipe may be detected when the detection from the proximity sensor reports values that are outside a possible threshold of a read head. Another method to detect false swipes relates to the time duration that a sensor detects a reader with that duration less than or greater than maximum or minimum thresholds that are possible within a range of tenable swipe speeds. In other embodiments, if two or more proximity sensors do not detect the read head within a specified timeframe, the swipe is considered invalid. In yet another embodiment, if two or more proximity sensors report a detection within thresholds simultaneously, it is deemed an invalid swipe.

Multi-Track Magnetic Stripe Transmission

Another limitation to magnetic stripe transmission technologies relates to transmitting data such that a magnetic card reader will read multiple tracks. Unfortunately, some software point-of-sale (POS) applications do not accept a single track of data, requiring instead both tracks to be present before the data is accepted. The issue of simultaneously transmitting multiple tracks raises possible interference issues related to a signal from one antenna crosses over to a read head of another track.

In some circumstances, this interference appears as noise to the read head, causing the reader to send an error message. One approach is to send this data sequentially over the multi-purpose antenna in hopes that the reader will accept each track of data, one after the other. This "sequential multi-card transmission" embodiment can be successful if the software point-of-sale (POS) applications accept data from each track read by the reader in a sequential manner.

Delayed Multi-Track Transmission Method

Another approach to achieving reception of multiple track data on magnetic card readers transmitted from a multi-purpose antenna is to delay the transmission of one track relative to another. This embodiment utilizes a timing sequence that can be controlled by a microprocessor, MCU or other polarity-generating device to offset one track from another in time. This "delayed multi-track transmission" method reduces interference between tracks so that a read head for a specific track will read only or sync on the information transmitted to it from the closest antenna, while suppressing any signal received from a transmission from antenna positioned on an adjacent track.

Timer Mode of Operation

In some embodiments, timeout between card-related events may be increased to accommodate a longer duration to support applications such as handing a card to a waiter or waitress. In one "Timed transmission" embodiment, a user may program the timeout before the data on the microprocessor is erased or "zeroized" to render memory unrecoverable in case of loss or theft. The card can be used to perform a transaction just as long as the timer has not reached the time-out interval, where the card may then be rendered inoperable. In a related embodiment, the first swipe may be trained for a specific user's swipe speed, while the second swipe is slower or fast to support an unknown user's swipe speed.

Passive Energy Harvesting Remote Wake-Up Method

A method to wake-up a circuit and/or embedded microprocessor and/or microcontroller unit (MCU) from a passive or deep sleep state can be supported by utilizing one or more antennas tuned to specific frequencies to receive signals for a wakeup device. For example, one or more multi-planar, multi-purpose antennas may be tuned to frequencies such as but not limited to RFID frequencies such as 125 kHz, 13.56 MHz, 915 MHz, and 2.4 GHz and the like. In this configuration, if the antenna harvests (or receives) enough energy at a desired frequency, a voltage can be generated that can drive the gate of a low power field energy transistor (FET), and thus effectively wake-up the circuit/microprocessor/MCU from a passive, non-powered state.

This energy harvesting remote wake-up method can be applied to any antenna design including multi-planar, multi-purpose antenna designs and methods. Likewise, this method can be applied to virtually any frequency to enable a device with an antenna to wake-up by receiving a signal at a specified frequency or within a frequency band.

Low-Power Wake-Up Method Via Coupled Antennas

Like the passive energy harvesting wake-up method described above, a pair of magnetically coupled antennas, one on a smart wallet and one on a powered card as non-limiting examples described above, can be used to achieve low-power wake-up. The receiving device can be in a completely powered-down state, yet still awakened by a signal transmitted over the magnetic link. This system could be implemented with components such as but not limited to a latching circuit comprising dual MOSFETS.

The presence of a power signal facilitates the switching circuit to connect the battery to the rest of the system, thereby awakening a microprocessor and other circuitry that then controls the operation of another circuit. Once the system is powered up, the latching circuit stays on until another external control disables the latch. For example, a microprocessor could turn the entire system back off using a general purpose 10 (input/output) pin.

Communications Method Detection

In similar fashion to a wake-up, frequencies and/or modulation types can be detected in some embodiments of the invention. A frequency counter circuit can determine the frequency of the signal received. Likewise, the signal can be analyzed to determine its modulation scheme. A microprocessor, MCU or equivalent circuit can then choose the frequency and modulation to communicate using the antenna based on the nature of the received signal.

Remote Battery Charging

In yet other embodiments, multiple sets of antennas can be coupled at short range to allow the transfer of power. This method takes advantage of the ability of both transmit and receiving antennas to be tuned to specific common resonant frequencies. The tuning of the multi-purpose antennas can be achieved through varactor diodes to allow the antennas to be re-configured for other purposes when not being used for power transfer.

Under some embodiments, the multi-planar, multi-purpose antenna(s) may also be used to detect and route charging power to battery recharging circuitry. A microprocessor, MCU, or equivalent chipset may receive data via one or more multi-planar, multi-purpose antenna(s) and/or via another communications path and determine to accept recharging power from a remote device. Both transmit and receive antennas can be tuned to the same resonant frequency using the tuning circuitry. As power is transmitted, one or more receiving antennas can be coupled to one or more transmitting antennas to receive the transmitted signal and route power to a recharge circuit which then recharges the battery. The signal driving the transmit antennas may be for example, but not limited to, a biphasic square wave or sinusoid. If DC power is required, a bridge rectifier can be used to output a DC signal to a recharge circuit that then charges batteries.

Pinch Power

Another manual method to trigger transmission of data by the antenna is to utilize "pinch power", a method to turn on and off powered cards, such as dynamic payment cards, by placing electrical conductive material on both sides of the card. Most methods turn powered cards on and off utilizing either a button such as membrane switch, or use a "flip method". These methods require the user to actively "do something" to activate it, such as push a button in a certain area of the card or flip the card. An advantage of this "pinch power" method is that it utilizes no such user activity. The card simply works as the user naturally picks up the card.

Figure 58B:
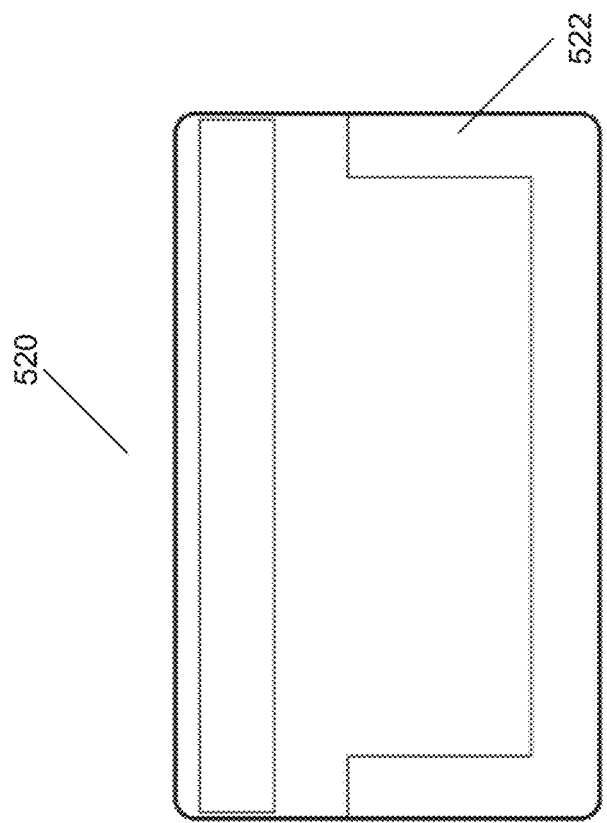
FIGS. 58A and 58B illustrate possible placement of conductive materials on two different surfaces of a powered card to facilitate the pinch power method.
Figure 58A:
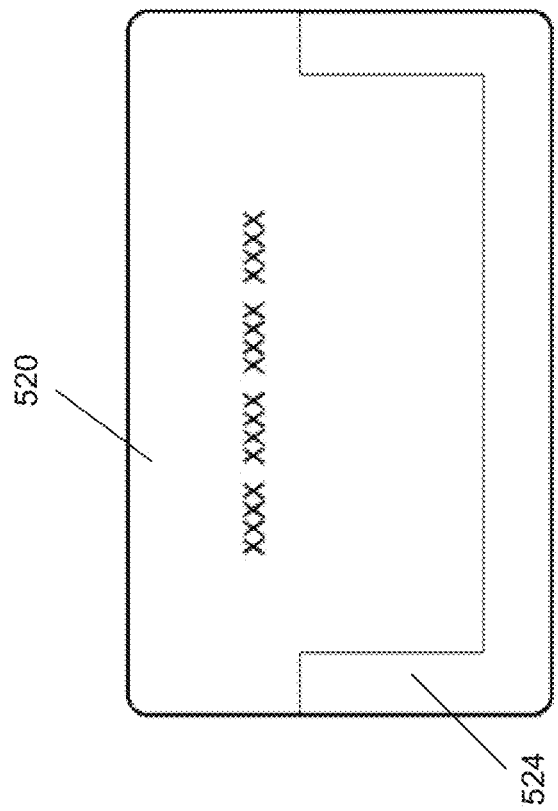
Figure 59:
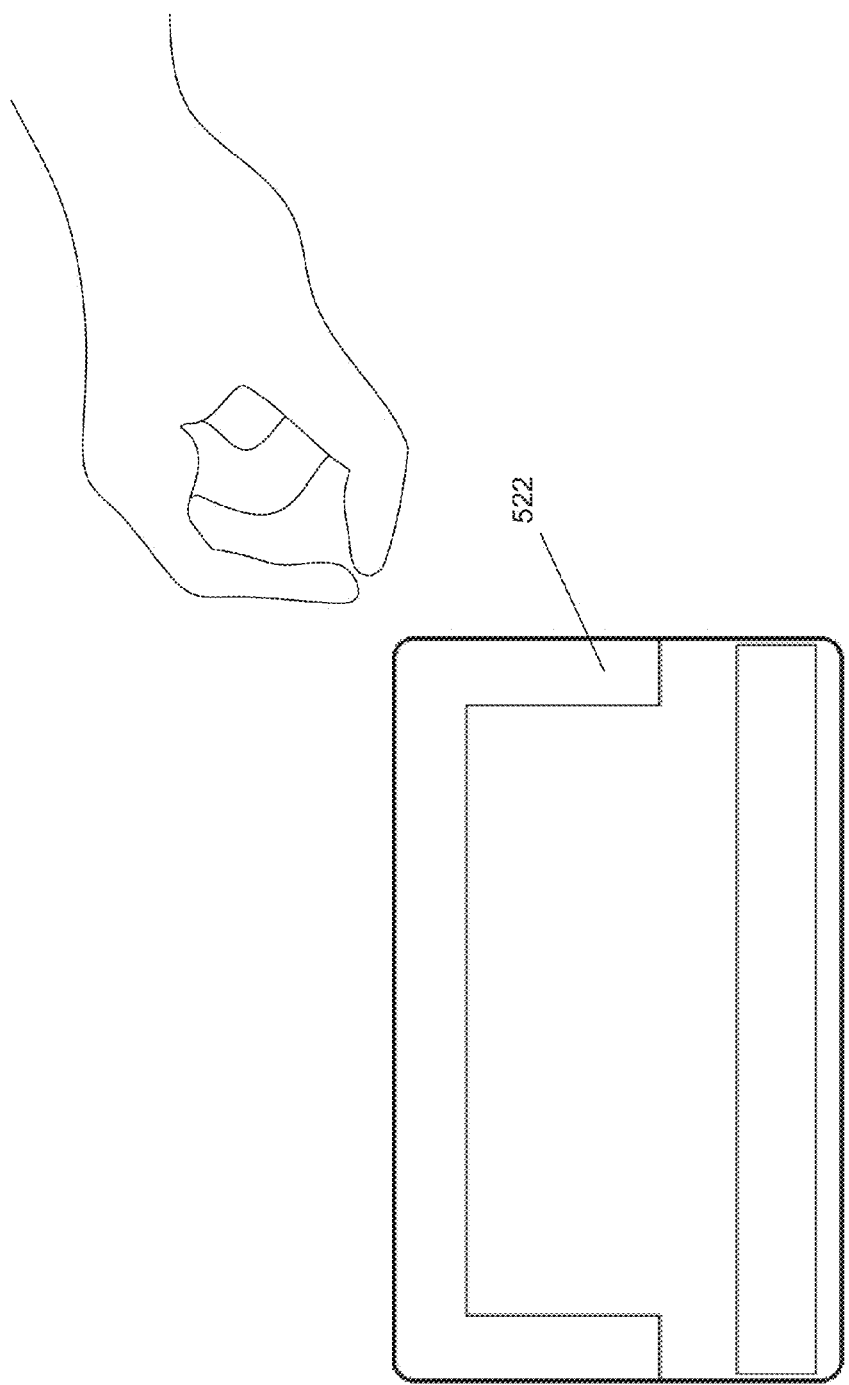
FIG. 59 illustrates a pinch from 2 fingers, one touching a conductive material along the front of a card and the other touching a conductive material along the back of a card, thereby activating a powered card.

Pinch Power allows the device to power on by latching the power and can be turned off by the processor when the card is no longer being used or a timeout occurs. Pinch power is constructed by applying two planes of conductive material to opposite sides of the card. FIGS. 58A and 58B (front surface and rear surface) illustrate a card 520 with a first conductive region 522 on a first side and a second conductive region 524 on a second opposing side. When grasping the card as shown in FIG. 59, a conductive path is completed by the user's fingers between the conductive regions 522 and 524 (not shown on FIG. 59, but shown in FIG. 58B that activate the Pinch Power latching circuit.

Conductive regions can be formed either by exposing a conductive material that connects to the inlay, or by using a conductive spray or equivalent conductive material as part of the lamination of the card that in turn touches electrical "posts" or conductive areas that are exposed under the conductive regions. Examples include but are not limited to exposed copper or equivalent material that connects to the inlay much like smart cards, such as contact EMV. One such conductive spray that can be used provides a conductive translucent coating for use on the card PVC to provide connection to the exposed copper (or equivalent conductive material) on both sides of the card.

This "pinch power" embodiment solves two problems with powered cards:

How to turn a powered card on and off.

How to keep a powered card from turning on when placed in areas that could activate a "switch" mechanism (a mechanical switch for example), in a wallet or a pocket, and thus needlessly drain the battery.

Host MCU

Figure 60:
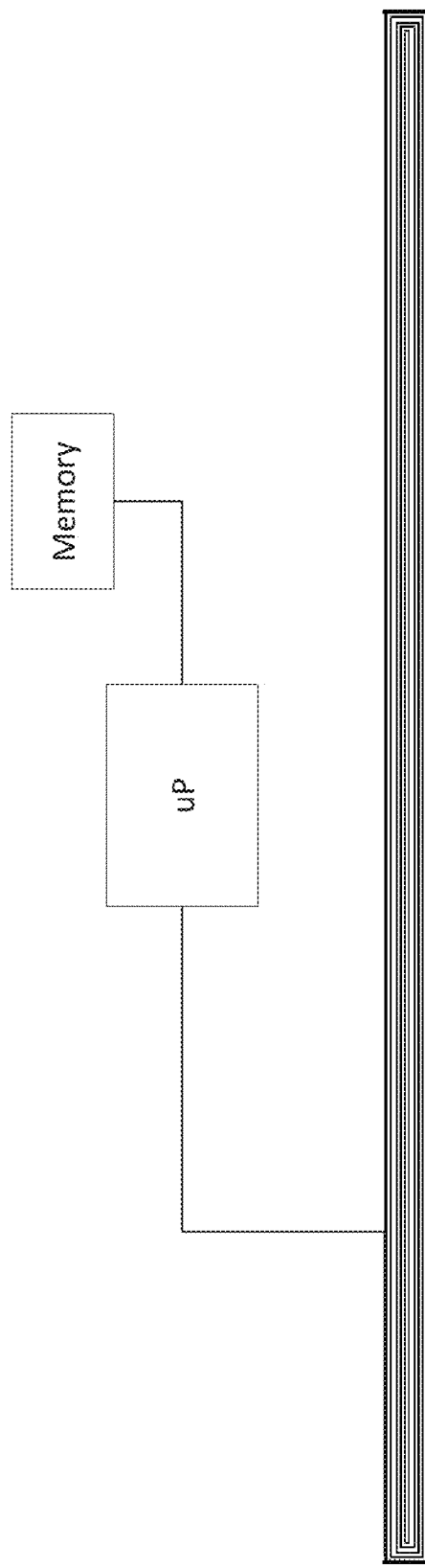
FIG. 60 illustrates memory attached to MCU to send data from internal or external memory to a multi-purpose antenna.
Figure 61:
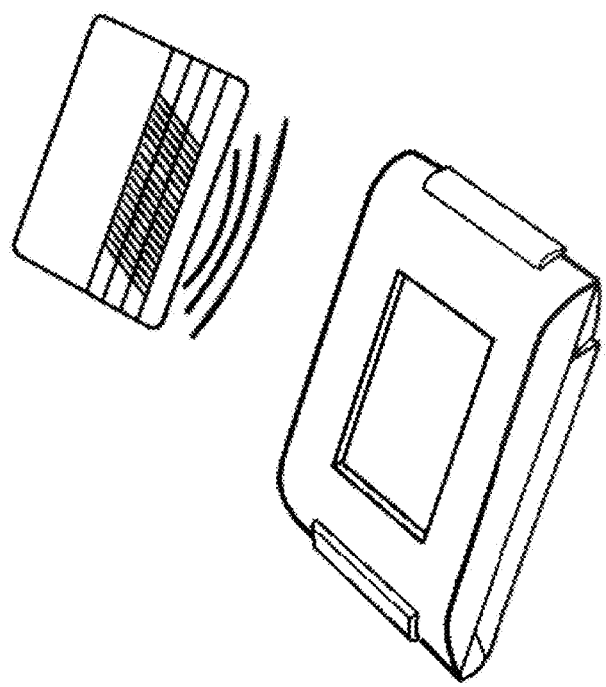
FIG. 61 illustrates a non-limiting example of an external device sending data to a multi-purpose antenna and/or antenna module on another separate device.

In some embodiments, one or more antennas may receive data and be controlled directly from a host microprocessor (MCU) or secure MCU or equivalent processing component as shown in FIG. 60. In some configurations, this MCU may also control and/or support other circuitry including but not limited to a sensors, wake-up circuitry, transceivers/receivers and/or transmitters, power management and/or power source charging, and/or switching circuitry to switch between features as shown in FIG. 1. In some configurations, an antenna receives its data from memory attached to the MCU and provided by the MCU connected directly to the antenna for transmission as shown in FIG. 60. This memory may be FRAM or other secure memory in some configurations. In other embodiments, one or more antenna modules may receive data from another external device, microprocessor or other processing component as shown in FIG. 61, and be controlled through an MCU resident within the antenna module.

In one non-limiting example one MCU provides data to another MCU via RF, inductive or magnetic communications, such as but not limited to Bluetooth, Bluetooth Low Energy (BLE), WiFi, NFC, and/or inductive or magnetic communications.

In other embodiments, an antenna module may receive data from a server or the cloud via RF communications, or in some embodiments, via another device or MCU.

Embodiments are described with reference to the attached figures, wherein like reference numerals are used throughout the figures to designate similar or equivalent elements. The figures are not drawn to scale and they are provided merely to illustrate aspects disclosed herein. Several disclosed aspects are described herein with reference to example applications for illustration only. It should be understood that numerous specific details, relationships, and methods are set forth to provide a full understanding of the embodiments disclosed herein. One having ordinary skill in the relevant art will readily recognize that the disclosed embodiments can be practiced without one or more of the specific details or with other methods. In other instances, well-known structures or operations are not shown in detail to avoid obscuring aspects disclosed herein.

Disclosed embodiments are not limited by the illustrated ordering of acts or events, as some acts may occur in different orders and/or concurrently with other acts or events. Furthermore, not all illustrated acts or events are required to implement a methodology in accordance with the embodiments. All examples and exemplary alternatives set forth in the application are merely for illustration and are intended as non-limiting examples and alternatives.

What is claimed is:

1. A system for providing information to a magnetic card reader, the system comprising:
    an antenna having two terminal ends;
    a microprocessor for applying an information signal differentially to the antenna by feeding the information signal simultaneously to the two terminal ends of the antenna, the informational signal representing information stored in a memory segment of the microprocessor or in a memory connected to the microprocessor; and
    the antenna transmitting an alternating magnetic field representing the information, the alternating magnetic field responsive to the information signal and received by the magnetic card reader.

2. The system of claim 1 wherein the microprocessor applies the information signal directly to the antenna with no intervening driver or active components.

3. The system of claim 1 the microprocessor comprising general purpose input output (GPIO) pins selectively configured to operate as analog, digital, or RF input pins or output pins.

4. The system of claim 1 the antenna comprising a plurality of antennas and a continuous core extending through each one of the plurality of antennas, or comprising a plurality of cores with one of the plurality of antennas disposed on one of the plurality of cores.

5. The system of claim 1 the microprocessor comprising a plurality of outputs pins each connected to the antenna, wherein a state of each output pin is controlled by the microprocessor, and wherein the microprocessor activates one or more output pins responsive to a desired power of the information signal.

6. The system of claim 1 disposed within an item, the item further comprising a portable item, a mobile item, a wearable item, or a card.

7. The system of claim 6 the portable item or the mobile item comprising a phone.

8. The system of claim 6 wherein the antenna transmits the alternating magnetic field responsive to a swiping action of the item through a slot of the magnetic card reader, responsive to insertion of the item into the slot, responsive to the item at rest within the slot, or responsive to the item positioned external to the magnetic card reader.

9. The system of claim 1 further comprising a card, the antenna and the microprocessor disposed on or in the card, the card further comprising an electrically conductive region on each of opposing surfaces of the card, the electrically conductive regions positioned such that when a user grasps the card contact is made to each electrically conductive region and responsive thereto the microprocessor is activated.

10. The system of claim 1 for providing information to an NFC (Near Field Communication) reader or to an EMV (Europay MasterCard Visa) reader, the system further comprising a sensor for detecting presence of the magnetic card reader, or presence of an NFC reader, or presence of an EMV reader, wherein the microprocessor performs a transaction via a detected reader, the detected reader comprising the magnetic card reader, the NFC reader, or the EMV reader.

11. The system of claim 10 responsive to the sensor detecting presence of the magnetic card reader, or presence of the NFC (Near Field Communication) reader, or presence of the EMV (Europay MasterCard Visa) reader, the microprocessor awakens from a low power state.

12. The system of claim 1 further comprising transmission of the alternating magnetic field responsive to a user's gesture as detected by a motion sensor.

13. The system of claim 1 wherein the alternating magnetic field comprises microprocessor-selected field parameters, the field parameters comprising any one more of timing, delays, power, pulse width, bit rate, bit order, bit direction, data, operational frequency, location or orientation of a source of the alternating magnetic field relative to the magnetic card reader.

14. The system of claim 1 further comprising at least one passive component connected to the antenna, wherein the microprocessor activates the at least one passive component.

15. The system of claim 1 further comprising a resistor selectively disposed in a circuit path to the antenna to lower a current supplied to the antenna.

16. The system of claim 1 wherein the antenna comprises antenna windings configured to generate a radiated field pattern defining a field horn at the two terminal ends of the antenna.

17. The system of claim 1 further comprising a core and the antenna comprising windings disposed about the core.

18. The system of claim 1 the antenna for receiving a wake-up signal from a separate device for waking up the microprocessor from a passive or a low-power state.

19. The system of claim 1 the antenna for receiving power from a power source for charging a battery, the battery supplying power to the microprocessor.

20. The system of claim 1 wherein the antenna comprises one or more conductive traces on opposing surfaces of a dielectric substrate, the conductive traces connected by a conductive via through the dielectric substrate.

21. The system of claim 20 wherein the one or more conductive traces are oriented at an acute angle or perpendicular to opposing parallel edges of the dielectric substrate.

22. The system of claim 1 wherein the antenna comprises a plurality of antennas disposed on a substrate, and wherein the microprocessor selects one of the plurality of antennas responsive to a desired frequency.

23. The system of claim 1 the antenna further comprising a plurality of winding segments disposed around a common core each one of the plurality of winding segments for operation at a different frequency, wherein one of the plurality of winding segments is selected by the microprocessor for transmitting the alternating magnetic field.

24. The system of claim 1 the antenna comprising a plurality of antennas having different resonant frequencies and connected to different output terminals of the microprocessor, the microprocessor for selecting one of the plurality of antennas for transmitting.

25. The system of claim 1 wherein the microprocessor stores the information as bit values and forms pulses from stored bit values as controlled by a microprocessor clock, the pulses comprising the information signal.

26. The system of claim 1 wherein the information signal comprises pulses, and the microprocessor controls timing of the pulses to critically damp the antenna.

27. The system of claim 1 further comprising filter components, EMF (electromagnetic field) blocking material, or one or more Faraday rings proximate the antenna.

28. The system of claim 1 wherein the antenna comprises first and second antennas disposed on a substrate in proximate relation, the first antenna for transmitting the magnetic field and the second antenna for detecting presence of a magnetic read head of the magnetic card reader.

29. The system of claim 1 wherein the information signal comprises pulses, and any one or more of pulse parameters, comprising power, pulse rate, pulse width, pulse direction, pulse order, delay between pulses, pulse timing, and pulse magnitude is responsive to a swipe speed of the antenna along a magnetic read head of the magnetic card reader.

30. The system of claim 1 further comprising one or more components for determining one or both of swipe speed and characteristics of the magnetic card reader, one or more parameters of the alternating magnetic field responsive to the swipe speed or to the characteristics of the magnetic card reader, the parameters comprising operative tracks of the magnetic card reader and operational frequency of the magnetic card reader.

31. The system of claim 1 the antenna and the microprocessor disposed on a card, and wherein a user swipes the card through the magnetic card reader, the system further comprising a movement detection component for detecting a swipe action and a swipe speed.

32. The system of claim 31 wherein the movement detection component comprises an accelerometer.

33. The system of claim 1 further comprising a magnetic head detection component.

34. The system of claim 1 wherein the microprocessor controls a start time of the information signal responsive to a location of a magnetic read head relative to a location of the antenna, the magnetic read head an element of the magnetic card reader.

35. The system of claim 1 further comprising one or more sensors proximate the antenna for detecting presence of a document insertion processor (DIP) card reader.

36. The system of claim 1 the antenna and the microprocessor disposed on a card, and wherein a user swipes the card through the magnetic read head, parameters of the information signal are modified responsive to a number of unsuccessful swipes or transmissions, or a number of swipes or transmissions by the user.

37. The system of claim 1 wherein the information signal comprises pulses that represent a token derived from the information or that represent an encrypted form of the information.

38. The system of claim 1 wherein the magnetic card reader comprises a plurality of magnetic read heads and the antenna is located and dimensioned such that the alternating magnetic field is received by one or more of the plurality of magnetic read heads.

39. The system of claim 1 the antenna and the microprocessor disposed on a card, and wherein a user swipes the card through the magnetic card reader, the antenna positioned on the card such that the antenna traverses at least a portion of a magnetic track reader within the magnetic card reader.

40. The system of claim 1 the antenna for receiving a location signal based on a location of the antenna relative to a location of the magnetic card reader, the microprocessor for processing the location signal to determine a location of the antenna and responsive to the location for transmitting the alternating magnetic fields.

41. The system of claim 1 wherein the magnetic card reader comprises a first and a second magnetic read head and the alternating magnetic field comprises a first and a second alternating magnetic field, and wherein the antenna transmits the first alternating magnetic field for receiving by one or both of the first and second magnetic read heads and the antenna then transmits the second alternating magnetic field for receiving by one or both of the first and second magnetic read heads.

42. The system of claim 1 further comprising a timer, wherein a user sets a time-out time and after the timer has reached the time-out time the microprocessor erases data from the memory segment or from the memory connected to the microprocessor.

43. They system of claim 1 further comprising a timer, wherein a user sets a time-out time and after the timer has reached the time-out time the system is no longer operable.

44. The system of claim 1 the microprocessor performing biometric or behavior recognition of a user of the system to authenticate the user, wherein upon after successful authentication of the user the microprocessor supplies the information signal to the antenna.

45. The system of claim 44 wherein authentication of the user is executed by a computer or a point of sale terminal to which the magnetic card reader is responsive.

46. The system of claim 1 wherein the system is capable of performing a plurality of transactions in conjunction with the magnetic card reader, a biometric or a behavior metric provided by a user is associated with one of the plurality of transactions, the system further comprising a sensor for receiving the biometric or the behavior metric and for permitting the system to conduct a transaction from among the plurality of transactions that is associated with the biometric or the behavior metric.

47. The system of claim 1 wherein the microprocessor comprises general purpose input/output (GPIO) pins connected to the antenna, wherein activation of one or more of the general purpose input/output pins controls parameters of the alternating magnetic field, the parameters comprising timing of transmission, delays, power, pulse width, bit rate, bit order, bit direction, data, operational frequency, location, orientation and/or combinations of the alternating magnetic field relative to the magnetic card reader.

* * * * *